(12) United States Patent
Ohki et al.

(10) Patent No.: US 8,005,516 B2
(45) Date of Patent: Aug. 23, 2011

(54) MOBILE INFORMATION TERMINAL

(75) Inventors: Kunihiro Ohki, Kyoto (JP); Ryohsuke Fukusada, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 1074 days.

(21) Appl. No.: 11/664,269

(22) PCT Filed: Sep. 30, 2005

(86) PCT No.: PCT/JP2005/018118
§ 371 (c)(1),
(2), (4) Date: Mar. 30, 2007

(87) PCT Pub. No.: WO2006/038554
PCT Pub. Date: Apr. 13, 2006

(65) Prior Publication Data
US 2008/0045279 A1 Feb. 21, 2008

(30) Foreign Application Priority Data
Oct. 1, 2004 (JP) .................... 2004-290288

(51) Int. Cl.
*H04M 1/00* (2006.01)
(52) U.S. Cl. ............ 455/575.1; 455/556.1; 455/575.3; 455/575.4; 455/550.1; 455/566
(58) Field of Classification Search .... 455/575.1–575.4, 455/566–556.1, 550.1
See application file for complete search history.

(56) References Cited

U.S. PATENT DOCUMENTS

| | | | |
|---|---|---|---|
| 5,085,394 A | 2/1992 | Torii | |
| 7,174,195 B2 * | 2/2007 | Nagamine | 455/575.1 |
| 2003/0134669 A1 | 7/2003 | Byun et al. | |
| 2003/0203747 A1 | 10/2003 | Nagamine | |
| 2003/0223576 A1 | 12/2003 | Totani | |
| 2004/0203527 A1 | 10/2004 | Matsumoto | |
| 2005/0007739 A1 | 1/2005 | Hata et al. | |
| 2005/0107137 A1 * | 5/2005 | Byun et al. | 455/575.1 |
| 2005/0250532 A1 * | 11/2005 | Hwang et al. | 455/550.1 |
| 2005/0266898 A1 * | 12/2005 | Ahn et al. | 455/575.1 |
| 2006/0030381 A1 * | 2/2006 | Byun et al. | 455/575.4 |

FOREIGN PATENT DOCUMENTS

| | | |
|---|---|---|
| CN | 1455613 A | 11/2003 |
| DE | 10308903 A1 | 2/2004 |
| EP | 0703401 A1 | 3/1996 |
| EP | 1357726 A1 | 10/2003 |
| FR | 2845547 A1 | 4/2004 |
| JP | 2-104382 U | 8/1990 |
| JP | 5-66715 A | 3/1993 |
| JP | 7-319587 A | 12/1995 |
| JP | 11-266107 A | 9/1999 |

(Continued)

*Primary Examiner* — Phuoc Doan
*Assistant Examiner* — Michael T Vu
(74) *Attorney, Agent, or Firm* — Birch, Stewart, Kolasch & Birch, LLP

(57) ABSTRACT

The mobile information terminal comprises a first casing having an operation unit on the surface, a second casing having a display unit on the surface, and a joint mechanism. This joint mechanism joints the first casing and the second casing in an openable manner, and joints the first casing and the second casing such that the display unit can be shifted in the open state between the transversely long state and the longitudinally long state with respect to the first casing. A hinge pin for jointing the first casing and the second casing in the openable manner is positioned in the closed state above the second casing with respect to the surface of the first casing.

7 Claims, 93 Drawing Sheets

FOREIGN PATENT DOCUMENTS

| | | |
|---|---|---|
| JP | 2001-156893 A | 6/2001 |
| JP | 2001-284934 A | 10/2001 |
| JP | 2002-135380 A | 5/2002 |
| JP | 2003-319043 A | 11/2003 |
| JP | 2003-348205 A | 12/2003 |
| JP | 2004-64716 A | 2/2004 |
| JP | 2004-96302 A | 3/2004 |
| JP | 2004-348650 A | 12/2004 |

* cited by examiner

FIG.25
(a) 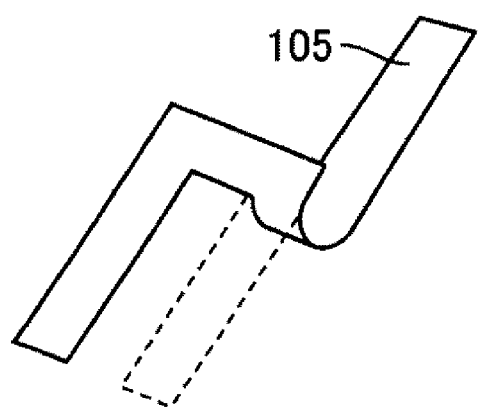
(b) 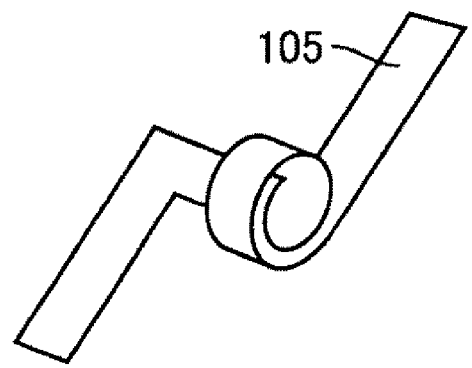

FIG.32
(a)
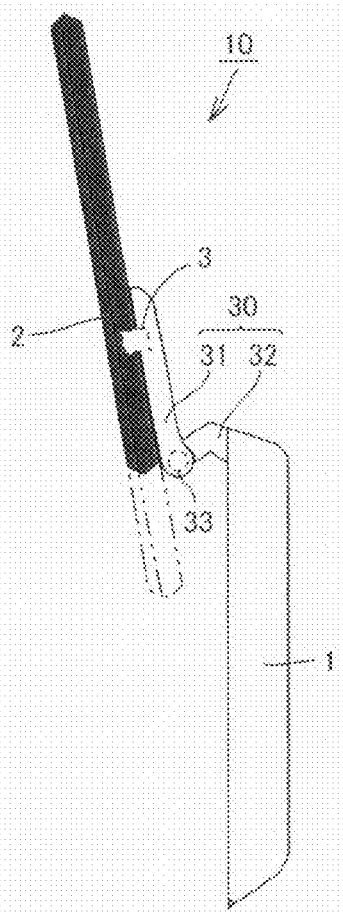
(b)
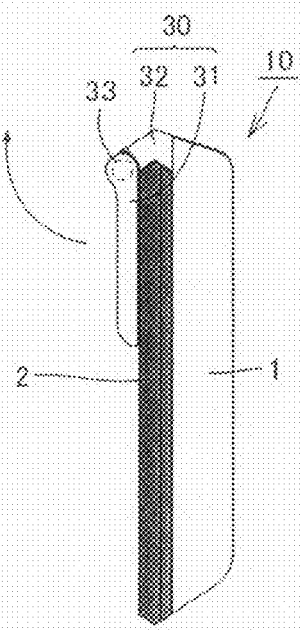

FIG.39
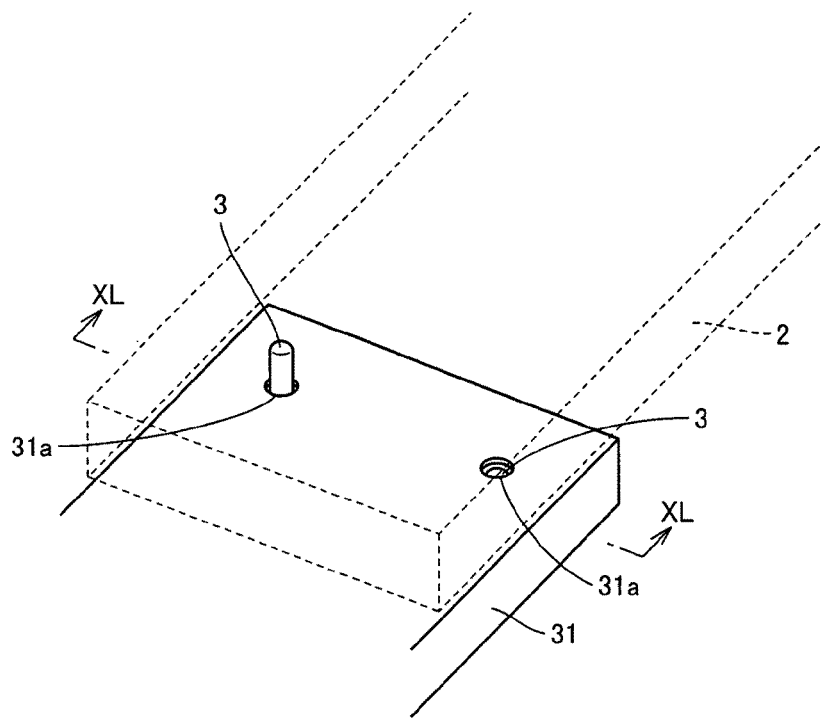
FIG.40
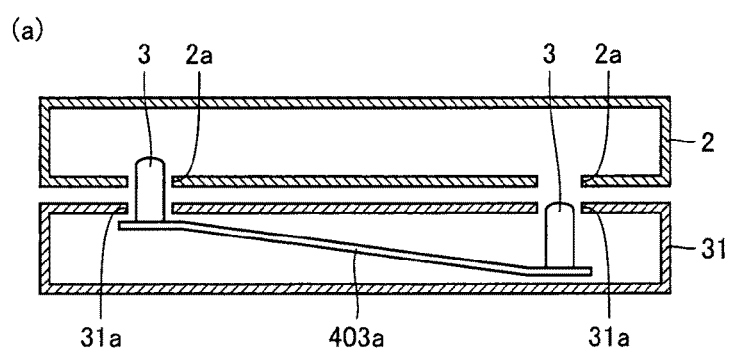
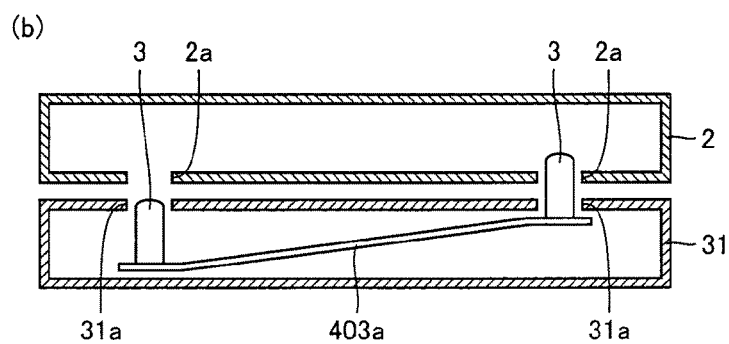

MOBILE INFORMATION TERMINAL

TECHNICAL FIELD

The present invention relates to a mobile information terminal, and more particularly to a mobile information terminal having a display portion changeable from a vertically long display to a horizontally long display.

BACKGROUND ART

The technique for changing a display portion from a vertically long display to a horizontally long display in a conventional mobile information terminal of this type, for example, a mobile phone, is disclosed in, for example, Japanese Patent Laying-Open No. 2003-319043 (Patent Document 1). FIG. 144 is a schematic front view showing a configuration of a mobile phone disclosed in the aforementioned publication. With reference to FIG. 144, this mobile phone 510 has a lower unit 510, an upper unit 502 and a hinge portion 503. Lower unit 501 and upper unit 502 are joined in a foldable manner through hinge portion 503. Lower unit 501 has an operation portion 511 formed of a variety of keys. Upper unit 502 has a display portion unit 502a having a display portion 521 and a support portion unit 502b rotatably and slidably supporting display unit 502a.

This mobile phone 510 is changed from a folded state (not shown) of lower unit 501 and upper unit 502 to an open state (FIG. 144(a)) by rotating upper unit 502 around hinge portion 503 with respect to lower unit 501. In this state, display portion 521 is vertically long display. From this open state (FIG. 144(a)), display portion unit 502a is rotated with respect to support portion unit 502b thereby to bring display portion 521 into the horizontally long display. Furthermore, display portion 502a is slid toward lower unit 501 with respect to support portion unit 502b thereby to bring about the states shown in FIGS. 144(b)-(d).

Patent Document 1: Japanese Patent Laying-Open No. 2003-319043

DISCLOSURE OF THE INVENTION

Problems to be Solved by the Invention

However, in mobile phone 510 disclosed in the aforementioned publication, the body size cannot be further reduced in the state (the states in FIGS. 144(b)-(d)) in which display portion unit 502a is set as horizontally long display.

In addition, the four corners of display portion unit 502a need to be formed in a rounded curved shape so that display portion unit 502a does not interfere with hinge portion 503 when display portion unit 502a is rotated with respect to support portion unit 502b. Therefore, the contour of display portion unit 502a is restricted.

Moreover, required are hinge portion 503 for opening/closing support portion unit 502b with respect to lower unit 501, a rotation mechanism for rotating display portion unit 502a with respect to support portion unit 502b, and a slide mechanism for sliding display portion unit 502a with respect to support portion unit 502b. In short, two rotation mechanisms and one slide mechanism are necessary, which complicates the mechanism.

Further, in this mobile phone 510, in order to change the folded state to the horizontally long display state of display portion 521 shown in FIGS. 144 (b)-(d), first, the open state is set as shown in FIG. 144(a), then display portion unit 502a is rotated from the vertically long display to the horizontally long display, and in addition, display portion unit 502a is slid. Thus, three actions are required.

An object of the present invention is to provide a mobile information terminal which allows a body size to be further reduced with a display portion in a horizontally long display state, has less restrictions on the contour of a casing of the display portion, has a simple mechanism, and requires less actions to change the display portion from a closed state to a horizontally long state.

Moreover, in this mobile phone 510, the display portion cannot be checked in the folded state.

Furthermore, in this mobile phone 510, the display portion can be brought into the horizontally long state, only in the open state.

Another object of the present invention is to provide a mobile information terminal which allows a body size to be further reduced with a display portion in a horizontally long display state, allows the display portion to be checked even in a closed state, and allows the display portion to be checked in the horizontally long state even in the closed state.

Means for Solving the Problems

A mobile information terminal in accordance with a first aspect of the present invention includes a first casing, a second casing, and a joint mechanism. The first casing has an operation portion on a front surface thereof. The second casing has a display portion on a front surface thereof. The joint mechanism couples the first casing and the second casing in an openable/closable manner and couples the first casing and the second casing such that the display portion can make a transition between a horizontally long state and a vertically long state with respect to the first casing in an open state. A rotation shaft for coupling the first casing and the second casing in an openable/closable manner is located above the second casing with respect to the front surface of the first casing in a closed state.

According to the mobile information terminal in accordance with the first aspect of the present invention, the rotation shaft for coupling the first casing and the second casing in the openable/closable manner is located above the second casing with respect to the front surface of the first casing in the closed state, so that this rotation shaft does not interfere with the second casing when the display portion is brought from the vertically long state to the horizontally long state. Therefore, it is unnecessary to form the four corners of the second casing in a curved shape in order to avoid this interference, thereby reducing restrictions on the contour of the second casing.

In addition, since the rotation shaft does not interfere with the second casing, the second casing can be brought closer to the first casing in the open state. Therefore, the body size can be further reduced in a state in which the display portion is set to the horizontally long state, as compared with the conventional example.

Furthermore, the joint mechanism needs only two mechanism portions of a mechanism portion coupling the first casing and the second casing in the openable/closable manner and a mechanism portion allowing the display portion to make a transition between the horizontally long state and the vertically long state. Therefore, the mechanism can be simplified as compared with the conventional example which requires three mechanism portions (two rotation mechanism portions and one slide mechanism portion).

In addition, the display portion can be set to the horizontally long state from the closed state by setting the second casing to the open state with respect to the first casing and thereafter bringing the second casing from the vertically long state to the horizontally long state. Therefore, only two actions are required to bring the display portion into the horizontally long state, thereby reducing the number of actions, as compared with the conventional example which requires three actions.

Preferably, in the aforementioned mobile information terminal, a shape of the front surface of the second casing is a rectangular shape.

As described above, when the display portion is brought from the vertically long state to the horizontally long state, the rotation shaft does not interfere with the second casing, so that the four corners of the second casing do not have to be formed in a curved shape in order to avoid such interference, thereby reducing the restrictions on the contour of the second casing. Therefore, the shape of the front surface of the second casing can be shaped in a rectangular shape.

Preferably, in the aforementioned mobile information terminal, the joint mechanism has a joint member. The joint member is joined to the first casing by a rotation shaft for coupling the first casing and the second casing in an openable/closable manner and joined to the second casing by a rotation shaft coupling such that the display portion can make a transition between a horizontally long state and a vertically long state with respect to the first casing in an open state. The joint member contains a diversity antenna.

Accordingly, the sensitivity of the diversity antenna can readily be adjusted by adjusting the angle of the joint member with respect to the first casing.

A mobile information terminal in accordance with a second aspect of the present invention includes a first casing, a second casing, and a joint mechanism. The first casing has an operation portion on a front surface thereof. The second casing has a display portion on a front surface thereof. The joint mechanism couples the first casing and the second casing in an openable/closable manner and couples such that the display portion can make a transition between a horizontally long state and a vertically long state with respect to the first casing in an open state. The second casing is configured such that one side of the second casing can be brought into abutment with the front surface of the first casing without covering the operation portion, when the display portion is in a horizontally long state in an open state.

According to the mobile information terminal in accordance with the second aspect of the present invention, when the display portion is brought into the horizontally long state in the open state, one side of the second casing can be brought into abutment with the front surface of the first casing without the second casing covering the operation portion. Therefore, the display portion in the horizontally long state can be seen and the operation portion can be operated with the second casing securely held.

In addition, since one side of the second casing can be brought into abutment with the front surface of the first casing, the body size can be further reduced when the display portion is set in the horizontally long state.

A mobile information terminal in accordance with a third aspect of the present invention includes a first casing, a second casing, a joint mechanism, and a second display portion. The first casing has an operation portion on a front surface thereof. The second casing has a first display portion on a front surface thereof. The joint mechanism couples the first casing and the second casing in an openable/closable manner and couples such that the first display portion can make a transition between a horizontally long state and a vertically long state with respect to the first casing in an open state. The second display portion is provided to the joint mechanism.

According to the mobile information terminal in accordance with the third aspect of the present invention, the second display portion is provided to the joint mechanism, so that the second display portion can be visually recognized even in the closed state.

A mobile information terminal in accordance with a fourth aspect of the present invention includes a first casing, a second casing, and a joint mechanism. The first casing has an operation portion on a front surface thereof. The second casing has a display portion on a front surface thereof. The joint mechanism joins the first casing and the second casing. The joint mechanism has a first joint portion rotatably attached to the first casing and a second joint portion rotatably attached to the first joint portion and slidably attached to the second casing. According to the mobile information terminal in accordance with the fourth aspect of the present invention, the first joint portion is rotatably attached to the first casing, so that the second casing can be slidably rotated with respect to the first casing. Accordingly, a transition can be made between the closed state in which the second casing completely covers the operation portion of the first casing, the vertically long display state in which the second casing is rotated by 180° from that state with respect to the first casing to expose the operation portion from the second casing, and the horizontally long display state in which the second casing is rotated by 90° from the closed state with respect to the first casing to expose the operation portion from the second casing.

In addition, the second joint portion is rotated with respect to the first joint portion so that the display portion of the second casing is turned to expose a face that is visually recognizable for the operator or a face that is not visually recognizable. When the display portion is turned to expose the visually recognizable face, an operation can be performed with visual recognition of the display portion. Accordingly, it is possible to close in the state in which the display portion is turned to expose the visually recognizable face, and the display portion can be visually recognized even in the closed state. On the other hand, when closed with the display portion turned to expose the face that is not visually recognizable, the display portion can be protected in the closed state.

In addition, by sliding the second casing with respect to the second joint portion, the second casing can be moved toward the center of the first casing, for example, in the horizontally long display state in which the display portion is turned to expose the visually recognizable face. Accordingly, the display portion can be arranged in left-right symmetry with respect to the center line of the first casing, so that the operator can view television or the like on the display portion comfortably. Moreover, the body size can be further reduced when the display portion is set in the horizontally long state.

In addition, since the second casing can be moved toward the center of the first casing in the vertically long display state in which the display portion is turned to expose the visually recognizable face, the body size can be further reduced when the display portion is set in the vertically long state.

A mobile information terminal in accordance with a fifth aspect of the present invention includes a first casing, a second casing, and a joint mechanism. The first casing has a first portion having an operation portion on a front surface thereof and a second portion joined to the first portion in a bendable manner. The second casing has a display portion on a front surface thereof. The joint mechanism couples the second casing to the second portion such that the second casing can make a transition between a closed state in which the front surfaces of both of the first portion and the second portion are covered and an open state in which the operation portion is exposed, by sliding the second casing with respect to the first casing, and such that the display portion can make a transition between a horizontally long state and a vertically long state by rotating the second casing with respect to the first casing.

According to the mobile information terminal in accordance with the fifth aspect of the present invention, the joint mechanism allows the second casing to slide with respect to the first casing so that the operation portion can be covered with the second casing or exposed from the second casing. In the state in which the operation portion is covered with the second casing, the display portion provided on the second casing can be visually recognized from the outside in the compact closed state of the body. On the other hand, in the state in which the operation portion is exposed from the second casing, the operation portion can be operated with the display portion visually recognized in the vertically long state.

In addition, the joint mechanism allows the second casing to rotate with respect to the first casing, so that the display portion can make a transition from the vertically long state to the horizontally long state. In this state, the operation portion can be operated with the display portion visually recognized in the horizontally long state.

Moreover, the joint mechanism is coupled to the second portion of the first casing, so that the body size can be further reduced when the display portion is set in the horizontally long state.

In addition, bending at the second portion with respect to the first portion allows the display portion of the second casing coupled to the second portion to be visually recognized in an inclined state with respect to the front surface of the first casing. Accordingly, television or the like can be viewed on the display portion comfortably with the back surface of the first portion placed on a table.

A mobile information terminal in accordance with a sixth aspect of the present invention includes a first casing, a second casing and a joint mechanism. The first casing has an operation portion on a front surface thereof. The second casing has a display portion on a front surface thereof. The joint mechanism couples the first casing and the second casing in an openable/closable manner between a closed state and an open state and coupling the first casing and the second casing such that the display portion can make a transition between a horizontally long state and a vertically long state with respect to the first casing in the open state. The mobile information terminal is configured such that a transition from the closed state to the vertically long state and a transition from the vertically long state to the horizontally long state can be completed in two actions.

According to the mobile information terminal in accordance with the sixth aspect of the present invention, a transition from the closed state to the vertically long state and a transition from the vertically long state to the horizontally long state can be completed by two actions, thereby reducing the number of actions as compared with the conventional example which requires three actions.

mobile information terminal in accordance with a seventh aspect of the present invention includes a first casing, a second casing and a joint mechanism. The first casing has an operation portion on a front surface thereof. The second casing has a display portion on a front surface thereof. The joint mechanism couples the first casing and the second casing in an openable/closable manner and coupling the first casing and the second casing such that the display portion can make a transition between a horizontally long state and a vertically long state with respect to the first casing in an open state. The mobile information terminal is configured such that a transition from the vertically long state to the horizontally long state can be realized by one rotation mechanism including a rotation shaft arranged at a position shifted from a center line of the first and second casings.

According to the mobile information terminal in accordance with the seventh aspect of the present invention, a transition from the vertically long state to the horizontally long state can be realized by one rotation mechanism, thereby simplifying the mechanism as compared with the conventional example.

A mobile information terminal in accordance with an eighth aspect of the present invention includes a first casing, a second casing and a joint mechanism. The first casing has an operation portion on a front surface thereof. The second casing has a display portion on a front surface thereof. The joint mechanism joins the first casing and the second casing such that the second casing relatively slidably rotates with respect to the first casing. The second casing has a rectangular shape, and a rotation center of the joint mechanism is arranged on a phantom line which passes through a point away from a corner portion of the second casing along a longer side thereof by a distance x obtained by an equation $x=(b-a)/2$, where a length of a shorter side of the second casing is a and a length of a longer side of the second casing is b, and which intersects the longer side at an angle of 45°.

According to the mobile information terminal in accordance with the eighth aspect of the present invention, the rotation center of the joint mechanism is arranged as described above, thereby reducing the body size in the horizontally long state, as compared with the conventional example.

Preferably, the mobile information terminal as described above further includes a pair of speakers arranged to sandwich the display portion on the front surface of the second casing.

This allows switching of a pair of speakers and supports stereophonic sounds.

A mobile information terminal in accordance with a ninth aspect of the present invention includes a first casing, a second casing and a joint mechanism. The first casing has an operation portion on a front surface thereof. The second casing has a display portion on a front surface thereof. The joint mechanism couples the first casing and the second casing in an openable/closable manner and couples the first casing and the second casing such that the display portion can make a transition between a horizontally long state and a vertically long state with respect to the first casing in an open state. The joint mechanism has a cam hole and a pin configured to allow a transition from the vertically long state to the horizontally long state by rotation in either left or right direction at a same angle.

According to the mobile information terminal in accordance with the ninth aspect of the present invention, a transition to the horizontally long state can be made by rotation in either left or right direction at a same angle, from the vertically long state, thereby to be adapted to double swing.

A mobile information terminal in accordance with a tenth aspect of the present invention includes a first casing, a second casing and a joint mechanism. The first casing has an operation portion on a front surface thereof. The second casing has a display portion on a front surface thereof. The joint mechanism couples the first casing and the second casing in an openable/closable manner and couples the first casing and the second casing such that the display portion can make a transition between a horizontally long state and a vertically long state with respect to the first casing in an open state. The joint mechanism has two rotation shafts configured to allow a transition from the vertically long state to the horizontally long state by rotation in either left or right direction at a same angle and joined to each other like a seesaw.

According to the mobile information terminal in accordance with the tenth aspect of the present invention, a transition to the horizontally long state can be made by rotation in either left or right direction at a same angle, from the vertically long state, thereby to be adapted to double swing.

EFFECTS OF THE INVENTION

As described above, according to the mobile information terminal in accordance with the present invention, the body size can be further reduced in a state in which the display portion is set to the horizontally long state, restrictions on the contour of the casing of the display portion can be reduced, the mechanism can be simplified, and less actions are required to bring the display portion into the horizontally long state from the closed state.

BRIEF DESCRIPTION OF THE DRAWINGS

FIG. 25 is a perspective view illustrating a configuration of a flat cable.

FIG. 32 shows a right side view (a) in the open, vertically long state and a right side view (b) in the closed state showing a configuration of the mobile information terminal in the first embodiment of the present invention.

FIG. 39 is a perspective view illustrating a case where the configuration adapted to double swing is formed of two rotation shafts joined like a seesaw.

FIG. 40 is a schematic cross sectional view along line XL-XL in FIG. 39.

FIG. 120 is a perspective view showing a configuration of a specific example of a mobile information terminal in a fifth embodiment of the present invention in the open, vertically long state.

FIG. 121 is a front view showing a configuration of a specific example of the mobile information terminal in the fifth embodiment of the present invention in the open, vertically long state.

FIG. 122 is a rear view showing a configuration of a specific example of the mobile information terminal in the fifth embodiment of the present invention in the open, vertically long state.

FIG. 123 is a right side view showing a configuration of a specific example of the mobile information terminal in the fifth embodiment of the present invention in the open, vertically long state.

FIG. 124 is a left side view showing a configuration of a specific example of the mobile information terminal in the fifth embodiment of the present invention in the open, vertically long state.

FIG. 125 is a plan view showing a configuration of a specific example of the mobile information terminal in the fifth embodiment of the present invention in the open, vertically long state.

FIG. 126 is a bottom view showing a configuration of a specific example of the mobile information terminal in the fifth embodiment of the present invention in the open, vertically long state.

FIG. 127 is a schematic cross sectional view along line CXXVII-CXXVII in FIG. 121.

FIG. 128 is a perspective view showing the closed state (a state in which display portion 21 is not exposed outside) of the mobile information terminal in the fifth embodiment of the present invention.

FIG. 129 is a front view showing the closed state (a state in which display portion 21 is not exposed outside) of the mobile information terminal in the fifth embodiment of the present invention.

FIG. 130 is a right side view showing a closed state (a state in which display portion 21 is not exposed outside) of the mobile information terminal in the fifth embodiment of the present invention.

FIG. 131 is a perspective view showing a configuration of a specific example of the mobile information terminal in the fifth embodiment of the present invention in the open, horizontally long state.

Figure 132:
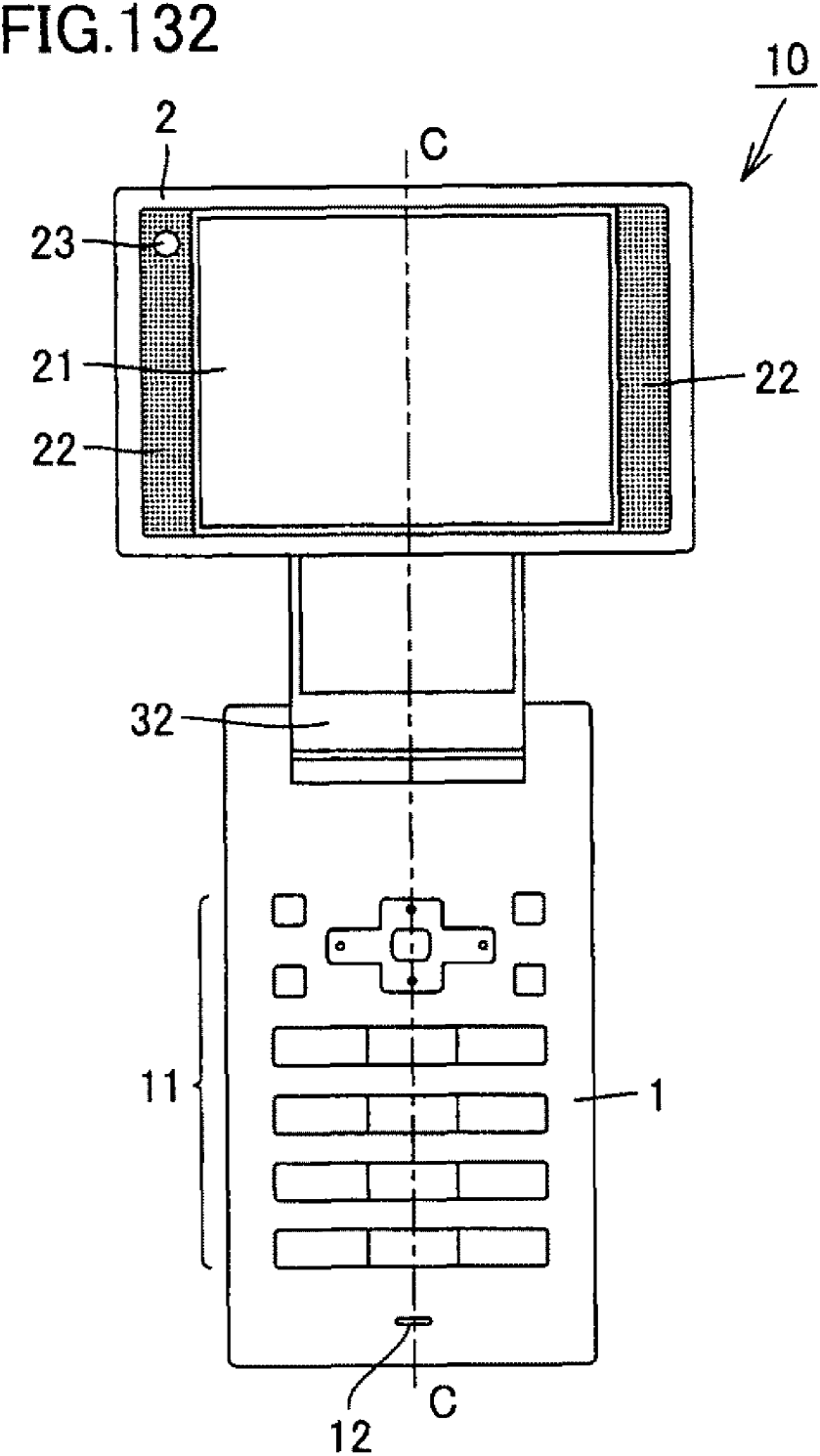

FIG. 132 is a front view showing a configuration of a specific example of the mobile information terminal in the fifth embodiment of the present invention in the open, horizontally long state.

Figure 133:
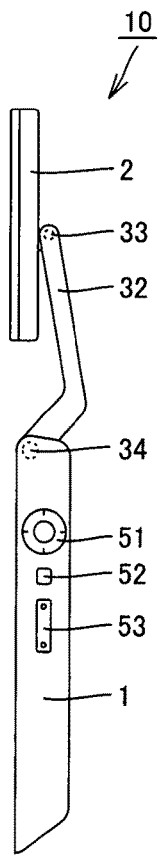

FIG. 133 is a right side view showing a configuration of a specific example of the mobile information terminal in the fifth embodiment of the present invention in the open, horizontally long state.

Figure 134:
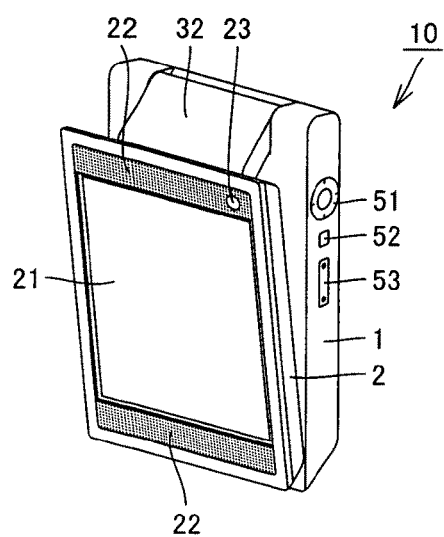

FIG. 134 is a perspective view showing a closed state (a state in which display portion 21 is exposed outside) of the mobile information terminal in the fifth embodiment of the present invention.

Figure 135:
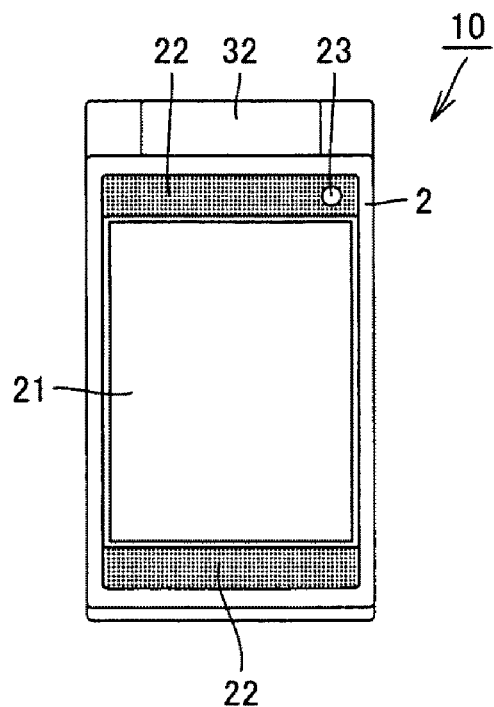

FIG. 135 is a front view showing the closed state (a state in which display portion 21 is exposed outside) of the mobile information terminal in the fifth embodiment of the present invention.

Figure 136:
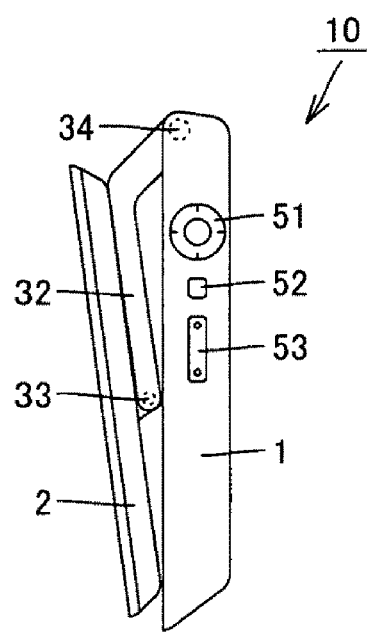

FIG. 136 is a right side view showing the closed state (a state in which display portion 21 is exposed outside) of the mobile information terminal in the fifth embodiment of the present invention.

Figure 137:
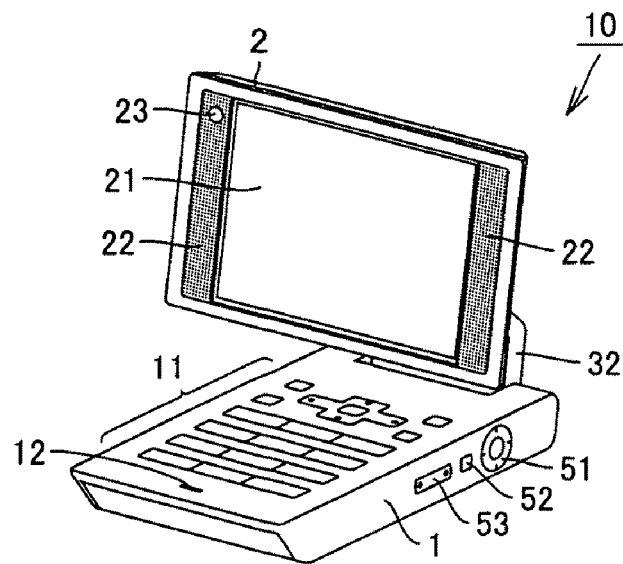

FIG. 137 is a perspective view showing that the mobile information terminal in the fifth embodiment of the present invention is placed on a table or the like in the open, horizontally long state.

Figure 138:
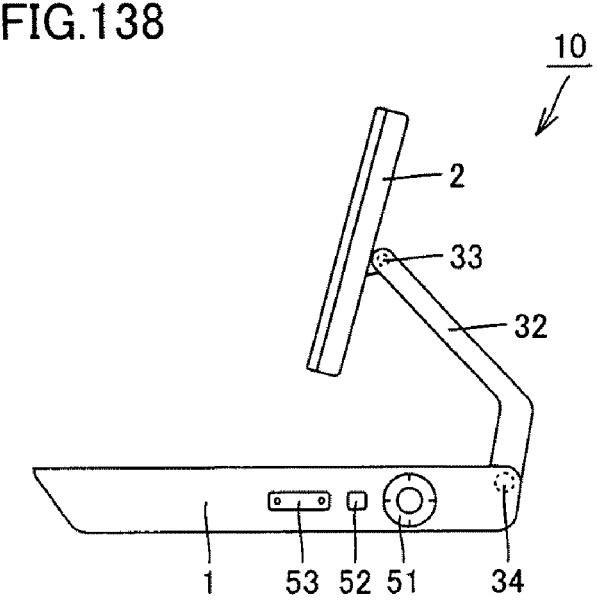

FIG. 138 is a right side view showing that the mobile information terminal in the fifth embodiment of the present invention is placed on a table or the like in the open, horizontally long state.

Figure 139:
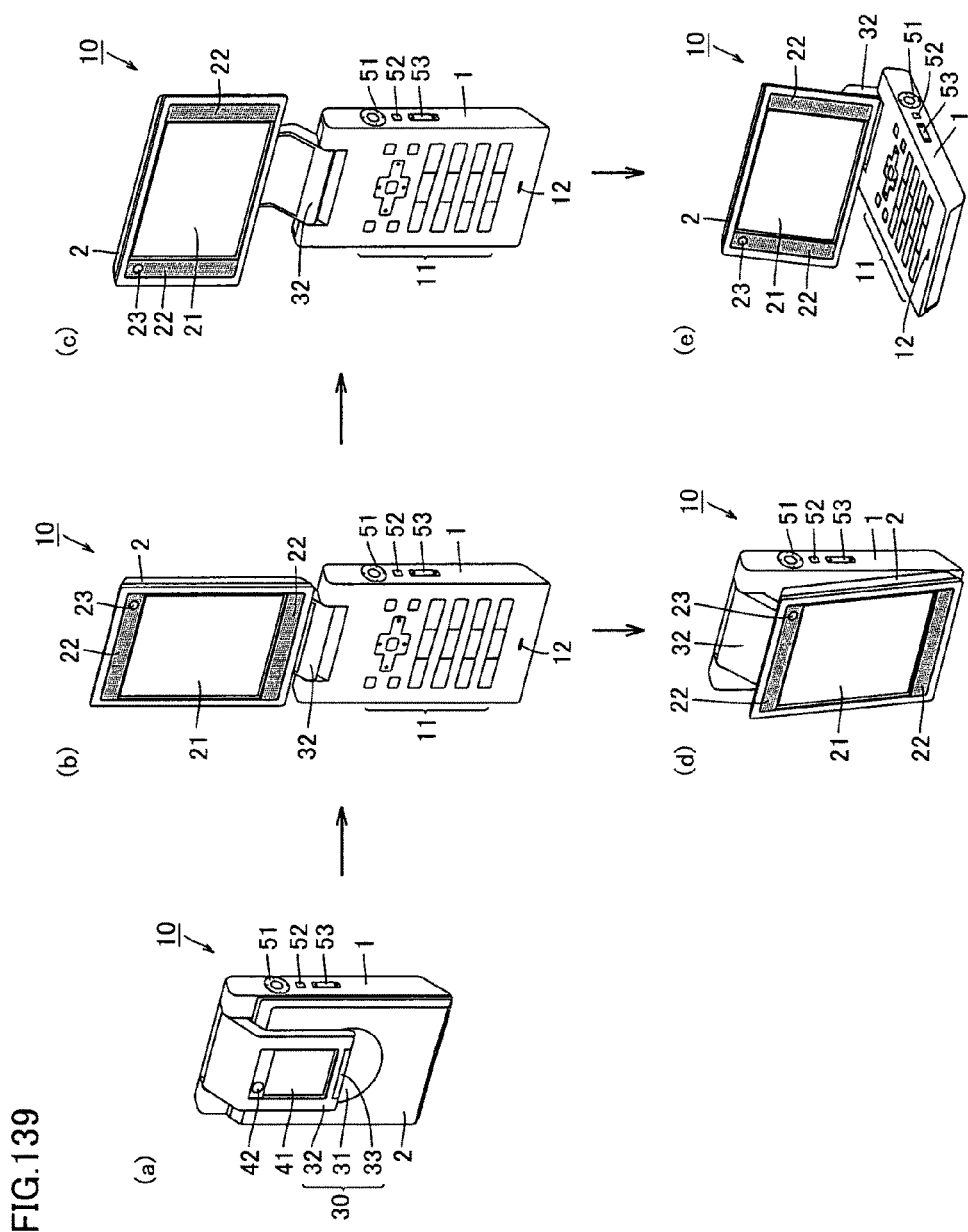

FIG. 139 is a perspective view illustrating an opening/closing operation of the mobile information terminal in the fifth embodiment of the present invention.

Figure 140:
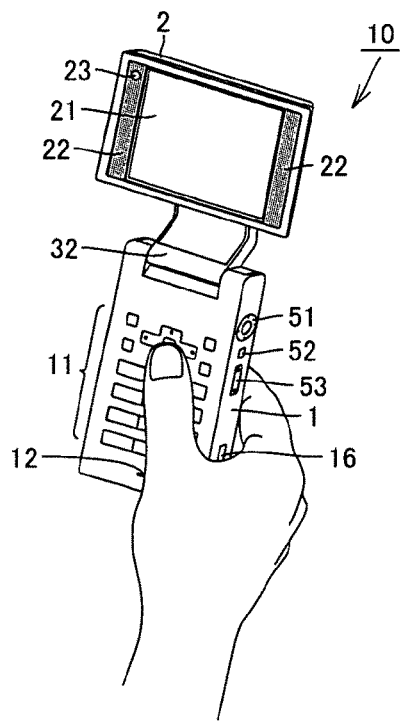

FIG. 140 is a perspective view illustrating a usage manner of the mobile information terminal in the fifth embodiment of the present invention in the open, horizontally long state.

Figure 141:
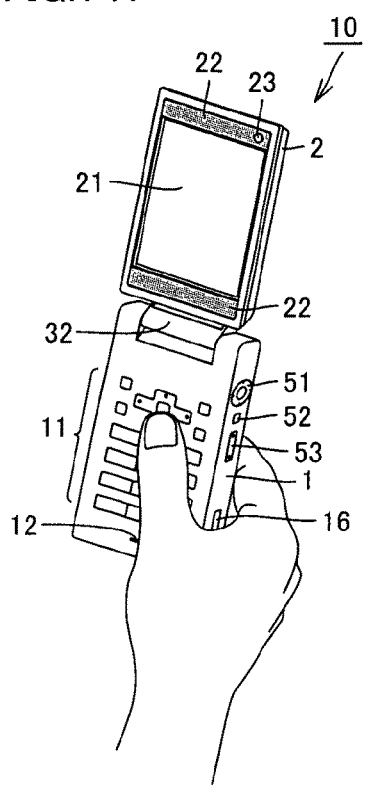

FIG. 141 is a perspective view illustrating a usage manner of the mobile information terminal in the fifth embodiment of the present invention in the open, vertically long state.

Figure 142:
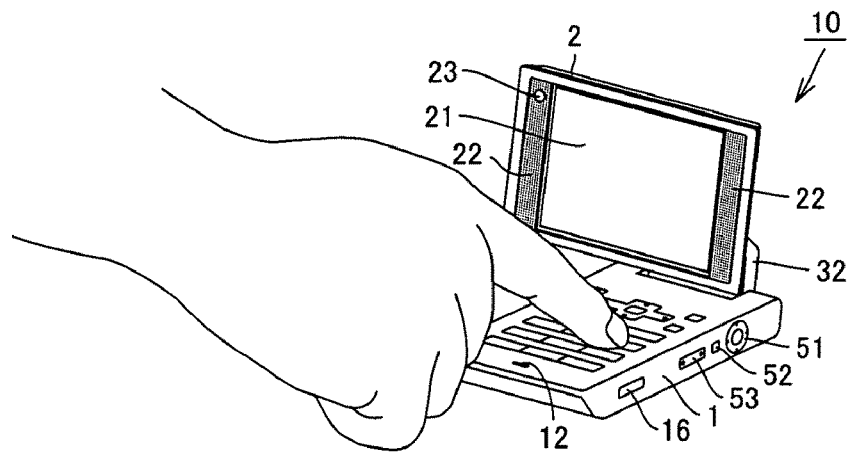

FIG. 142 is a perspective view illustrating a usage manner of the mobile information terminal in the fifth embodiment of the present invention in the open, horizontally long state.

Figure 143:
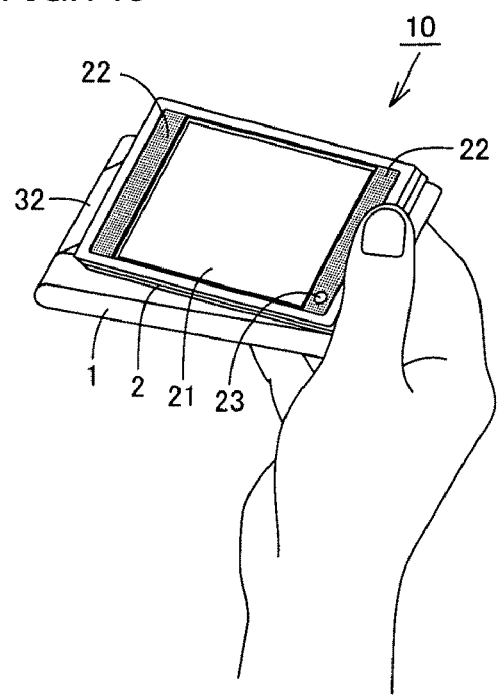

FIG. 143 is a perspective view illustrating a usage manner of the mobile information terminal in the fifth embodiment of the present invention in the closed state with display portion 21 exposed.

Figure 144:
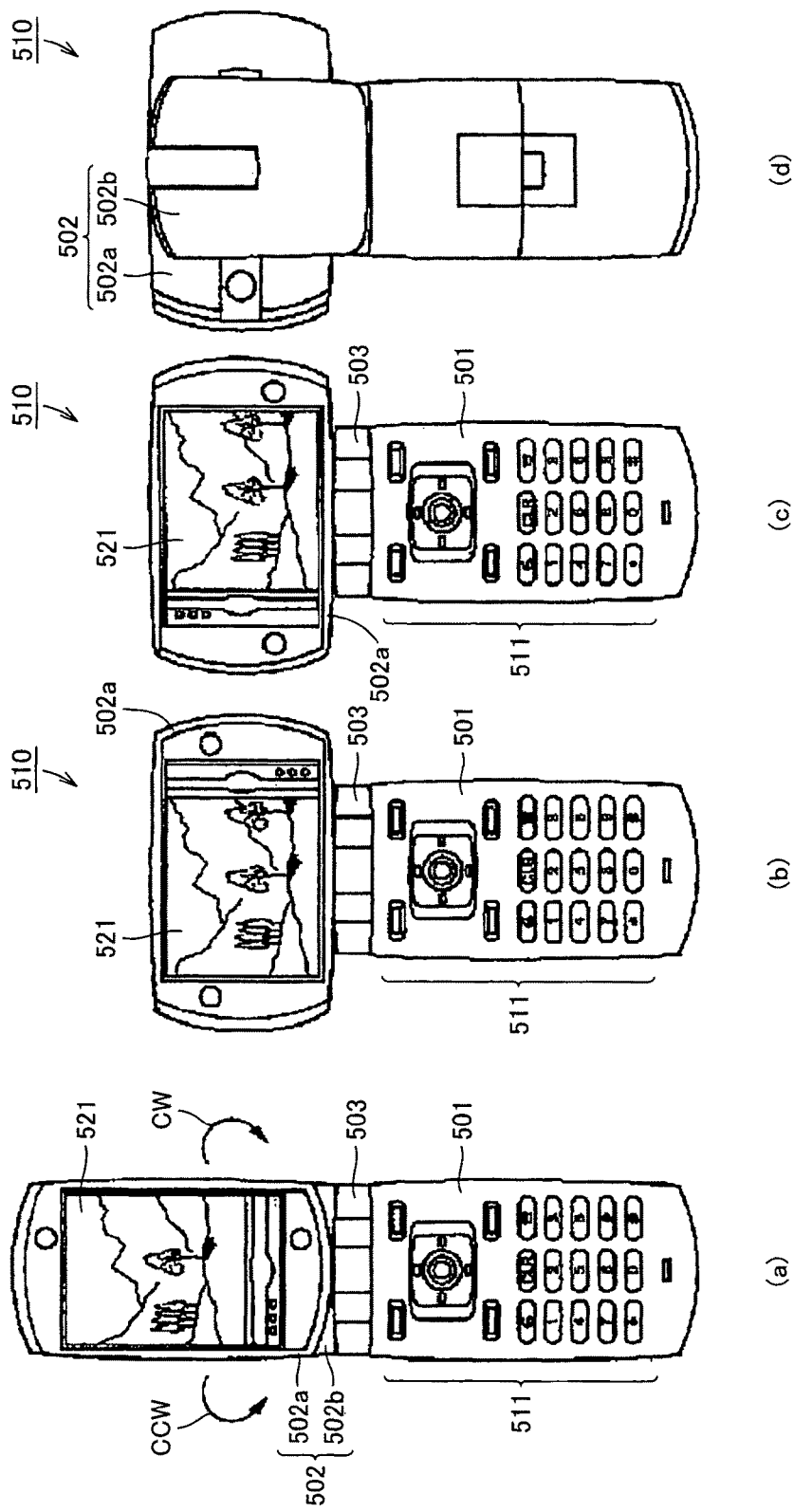

FIG. 144 is a schematic front view showing a configuration of a mobile phone disclosed in Japanese Patent Laying-Open No. 2003-319043.

DESCRIPTION OF THE REFERENCE SIGNS 1 first casing, 1a first portion, 1b second portion, 1c rotation shaft, 2a, 2b, 2c cam hole, 2d bottom plate, 2 second casing, 3a, 3b pin, 3 rotation shaft, 10 mobile information terminal, 11 operation portion, 12 microphone, 13 groove for storing a stand, 14 camera, 15 flash lamp, 16 shutter button, 17 infrared light emitting portion, 18 stand, 21 display portion, 22, 22a-22d speaker, 23 camera, 24 operation portion, 25 rail groove, 30 hinge portion, 31a hole, 31, 32 joint member, 32a, 32b protrusion portion, 33a rotation hinge fixing-side plate, 33b rotation hinge movable-side plate, 33, 34 rotation shaft, 41 sub-display portion, 42 flash lamp, 50 antenna, 51 key, 52 function key, 61 antenna, 101a key-side top cabinet, 101b key-side bottom cabinet, 101c board, 101e wire, 102*a* top cabinet, 102*b* bottom cabinet, 102*c* board, 105 flat cable, 106 wire, 131*a* strut inner cabinet, 131*b* strut outer cabinet, 201, 201*a*, 201*b* cam hole, 202*a*, 202*b* pin, 202*c*, 202*d* flange portion, 210, 220 sector-shaped member, 211 rail groove, 212, 213 hole, 221 pin, 301 antenna, 302 VHF/UHF tuner circuit, 303 video IF/audio IF signal processing circuit, 304 audio demodulation circuit, 305 video chroma synchronization signal processing circuit, 306 frame memory circuit, 307 antenna, 308 1SEG tuner circuit, 309 OFDM digital demodulation circuit, 310 TS demultiplexing processing circuit, 311 broadcast browser circuit, 312 video demodulation circuit, 313 audio demodulation circuit, 314 antenna, 315 RF processing circuit, 316 Base band processing circuit, 317 application processor circuit, 318 LCD controller circuit, 319 LCD circuit, 320 DA converter circuit, 321 amplifier/audio output circuit, 350 detection portion, 403*a* joint member.

BEST MODES FOR CARRYING OUT THE INVENTION

In the following, embodiments of the present invention will be described based on the drawings.

First Embodiment

First, the principle of operation of the present embodiment will be described.

Figure 1:
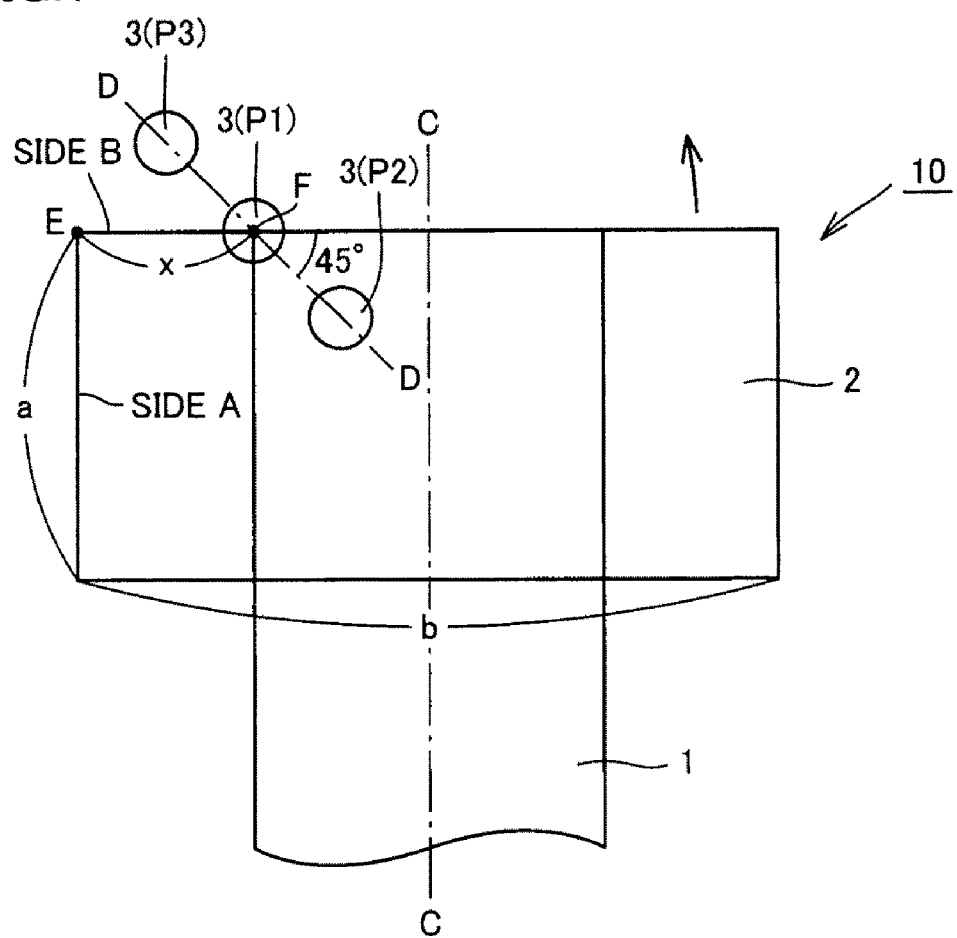
FIG. 1 is a front view showing an open, horizontally long state of a mobile information terminal in a first embodiment of the present invention.

Referring to FIG. 1, a mobile information terminal 10 in the present embodiment has a first casting 1, a second casing 2, and a joint mechanism.

First casing 1 has an operation portion (not shown) on the front surface. Second casing 2 has a display portion (not shown) on the front surface. The joint mechanism allows first casing 1 and second casing 2 to be coupled in an openable/closable manner and also allows the display portion of second casing 2 to make a transition between a horizontally long state (FIG. 1) and a vertically long state (FIG. 2) with respect to first casing 1 in an open state.

Figure 2:
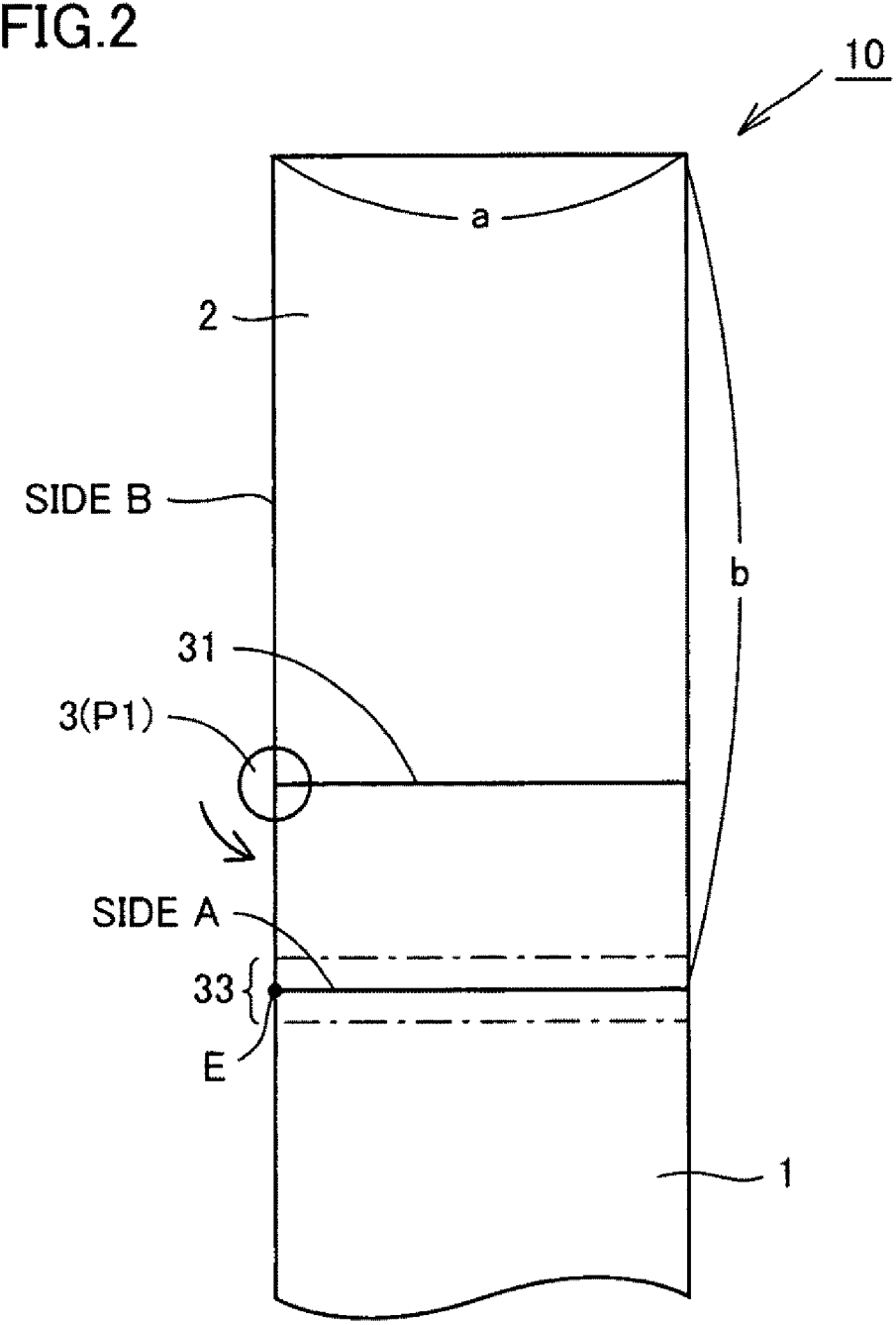
FIG. 2 is a front view showing an open, vertically long state when a rotation center of the mobile information terminal in the first embodiment of the present invention is at a point P1.

The transition between the horizontally long state (FIG. 1) and the vertically long state (FIG. 2) can be realized by a rotation shaft 3 of the joint mechanism. In other words, second casing 2 rotates around this rotation shaft 3 to come into the horizontally long state (FIG. 1) or the vertically long state (FIG. 2). Here, both in the horizontally long state and in the vertically long state (FIG. 2), the display portion provided to second casing 2 has left-right symmetry with respect to a center line C-C of first casing 1.

Rotation shaft 3 is arranged at a position (off-center position) shifted from the center line C-C of first casing 1.

For example, if second casing 2 has a rectangular shape where the length of the shorter side A of second casing 2 is a, and the longer side B is b, rotation shaft 3 is arranged on a point (for example any of points P1-P3) on a phantom line D-D which passes through a point F on the longer side B away from a corner portion E of second casing 2 (an intersection point between shorter side A and longer side B) by a distance of x obtained by an equation $x=(b-a)/2$ and intersects longer side B at an angle of 45°.

Figure 3:
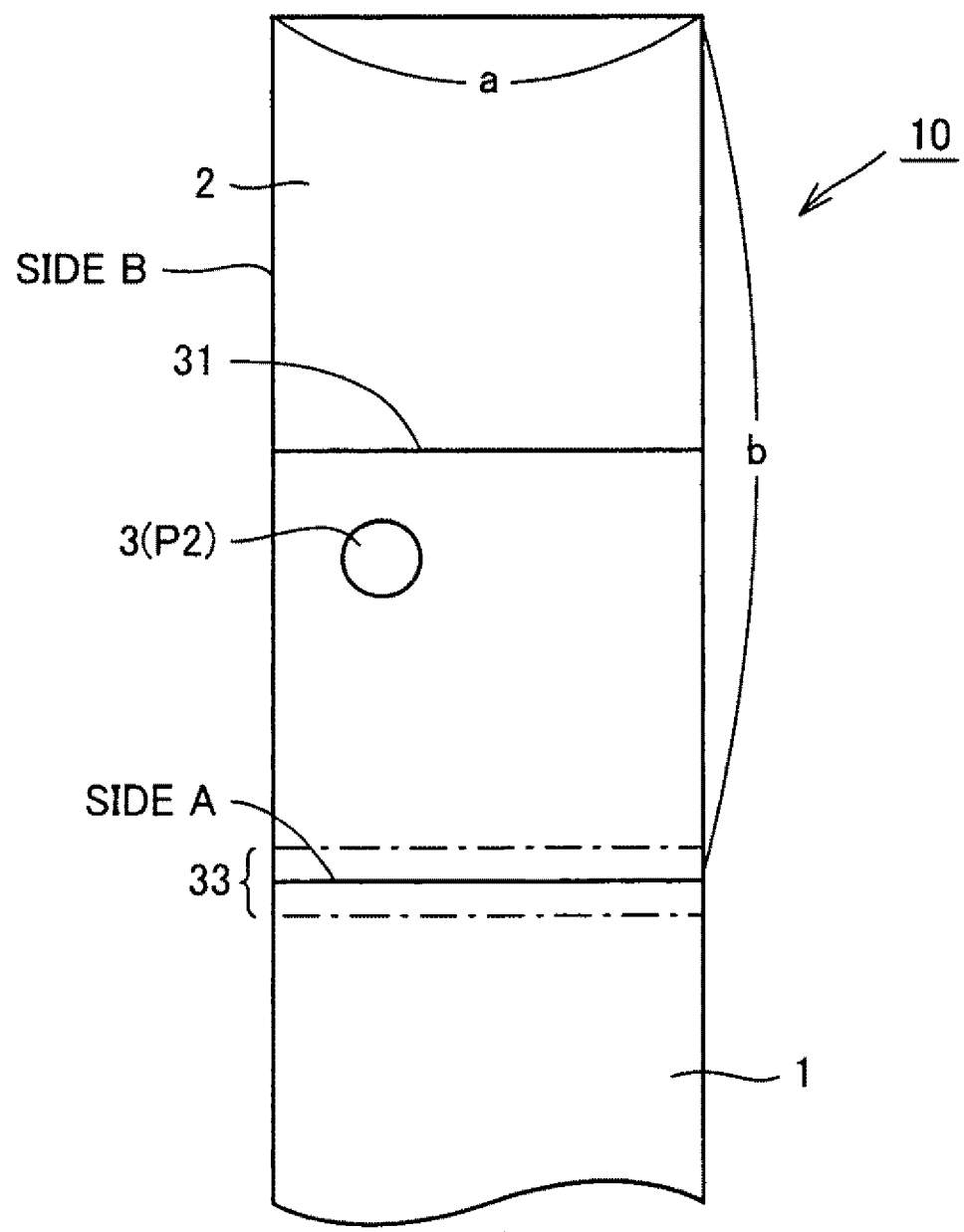
FIG. 3 is a front view showing the open, vertically long state when the rotation center of the mobile information terminal in the first embodiment of the present invention is at a point P2.

When rotation shaft 3 is arranged on point P1 on longer side B of second casing 2 in FIG. 1, second casing 2 is in the vertically long state as shown in FIG. 2. When rotation shaft 3 is arranged on point P2 on the inner side of second casing 2 from longer side B of second casing 2 in FIG. 1, second casing 2 is in the vertically long state as shown in FIG. 3. When rotation shaft 3 is arranged on point P3 on the outer side of second casing 2 from longer side B of second casing 2 in FIG. 1, second casing 2 is in the vertically long state as shown in FIG. 4.

Figure 4:
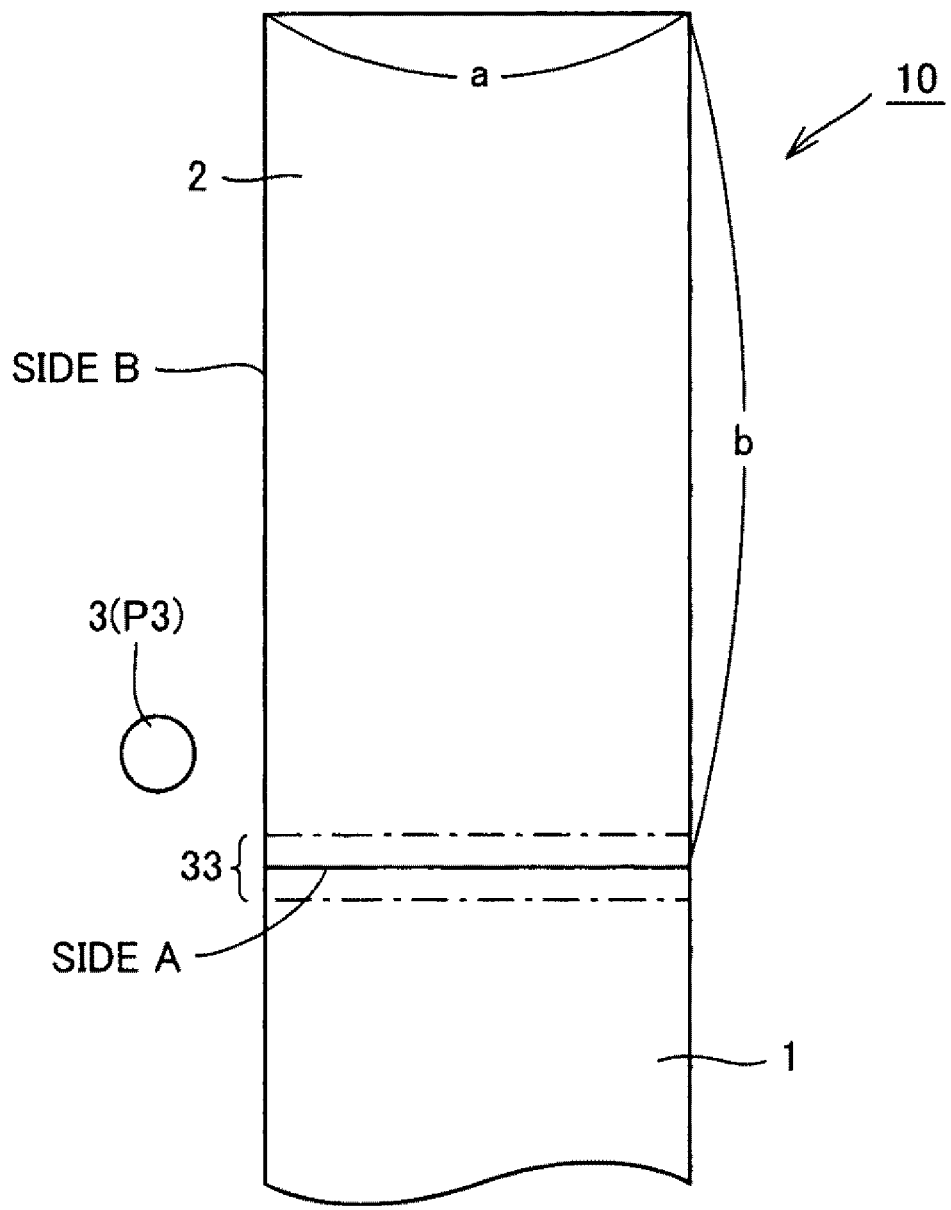
FIG. 4 is a front view showing the open, vertically long state when the rotation center of the mobile information terminal in the first embodiment of the present invention is at a point P3.

Referring now to FIG. 2-FIG. 4, a joint member 31 supporting rotation shaft 3 is provided separately from first casing 1, and joint member 31 is joined to first casing 1 by rotation shaft 33 rotatably with respect to first casing 1, so that first casing 1 and second casing 2 can be coupled to each other in an openable/closable manner. The state in which first casing 1 and second casing 2 are opened is shown in each of FIG. 2-FIG. 4. On the other hand, when first casing 1 and second casing 2 are in a folded and closed state, the front surface of first casing 1 and the front surface of second casing 2 are opposed to each other, the entire operation portion provided on the front surface of first casing 1 is covered with second casing 2, and the display portion provided on the front surface of second casing 2 is not visually recognized from the outside of mobile information terminal 10 and protected.

Rotation shaft 33 coupling first casing 1 and second casing 2 in an openable/closable manner is preferably located in the vicinity of that edge of second casing 2 which faces first casing 1 when second casing 2 is in the vertically long state. In the horizontally long state in which second casing 2 is open as shown in FIG. 1, the front shape of mobile information terminal 10 is preferably shaped like a letter T.

Here, the aforementioned phantom line D-D intersects either the opposite side to side A or the opposite side to side B and slants with respect to side B so that it intersects an extension line from side A.

An opening/closing operation of the mobile information terminal in the present embodiment will now be described.

First, in the closed state (not shown), as described above, second casing 2 covers the entire operation portion of first casing 1. From this state, both joint member 31 and second casing 2 are rotated with respect to first casing 1 around rotation shaft 33, so that second casing 2 comes into the open, vertically long state as shown in each of FIG. 2-FIG. 4. In this open state, both the operation portion and the display portion are exposed outside. From this state, second casing 2 is slidably rotated, for example, clockwise in the figure, with respect to both first casing 1 and joint member 31 around rotation shaft 3. Second casing 2 is thus gradually displaced with respect to both first casing 1 and joint member 31. By rotating second casing 2 with respect to first casing 1 by 90°, second casing 2 is brought into the horizontally long state in left-right symmetry with respect to center line C-C of first casing 1, and mobile information terminal 10 is brought into the open state with the contour in the shape of a letter "T." Also in this state, both the operation portion and the display portion are exposed outside.

On the other hand, the operation from the open state to the closed state is performed by reversing the above-noted operation.

It is noted that "slidably rotate" in this description means that second casing 2 is rotated with respect to the first casing in the plane parallel to the opposing faces of first casing 1 and second casing 2 (namely, the front surface of first casing 1 and the back surface of second casing 2).

Further, although the case where second casing 2 is rotated 90° with respect to first casing 1 has been described, it may be rotated 90° or greater. In this case, it is preferably configured to achieve positioning in the closed state and in the open state. The positioning may be achieved, for example, with the following configuration: a concave portion is provided to the rotation part, and a convex-shaped member (for example, a spherical body) is biased by a spring and fitted into the concave portion in the closed state and in the open state.

A specific example of the present embodiment will now be described.

Referring to FIG. 5-FIG. 12, mobile information terminal 10 in this embodiment has first casing 1, second casing 2 and a joint mechanism.

Figure 5:
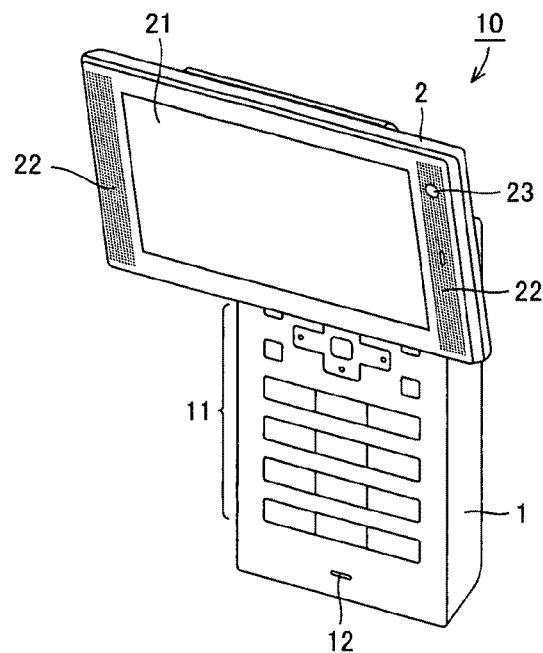
FIG. 5 is a perspective view showing a configuration of a specific example of the mobile information terminal in the first embodiment of the present invention in the open, horizontally long state.
Figure 6:
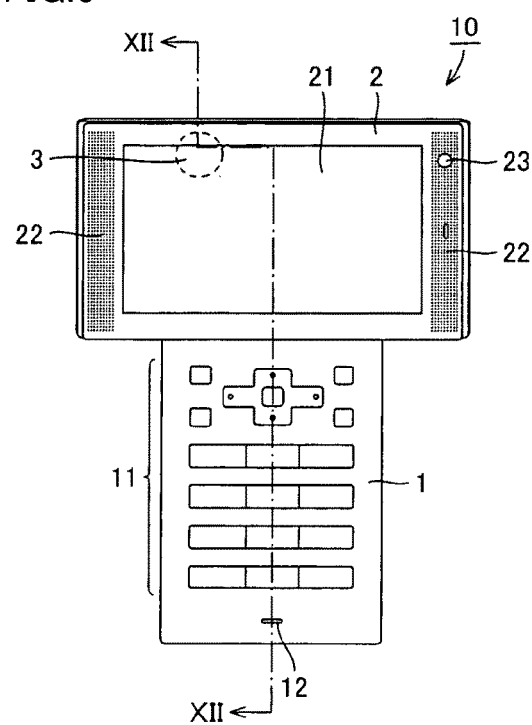
FIG. 6 is a front view showing a configuration of a specific example of the mobile information terminal in the first embodiment of the present invention in the open, horizontally long state.

Mainly referring to FIG. 5 and FIG. 6, arranged on the front surface of first casing 1 are an operation portion 11 comprised of a ten-key pad, a function key for performing a shutter operation or the like, a menu selection key for performing a menu selection or the like, a character switch key for switching characters, and the like, and a microphone 12 for telephone call. Arranged on the front surface of second casing 2 are a display portion 21 having for example a liquid crystal display, a speaker 22 arranged on longitudinally opposite sides of display portion 21, and a camera 23. Display portion 21 may be used as a finder of camera 23.

Figure 7:
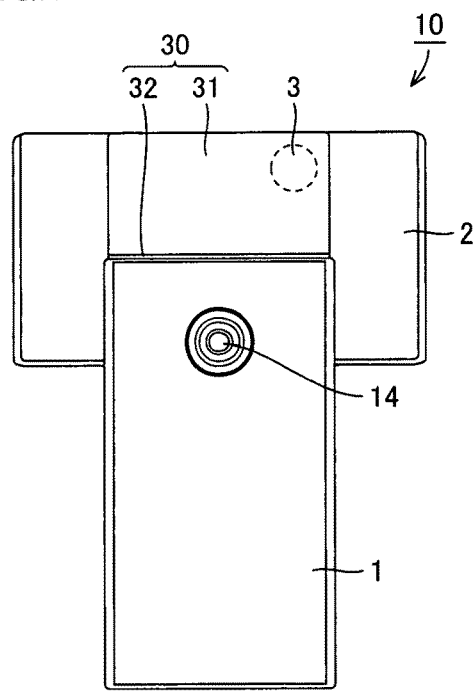
FIG. 7 is a rear view showing a configuration of a specific example of the mobile information terminal in the first embodiment of the present invention in the open, horizontally long state.
Figure 17:
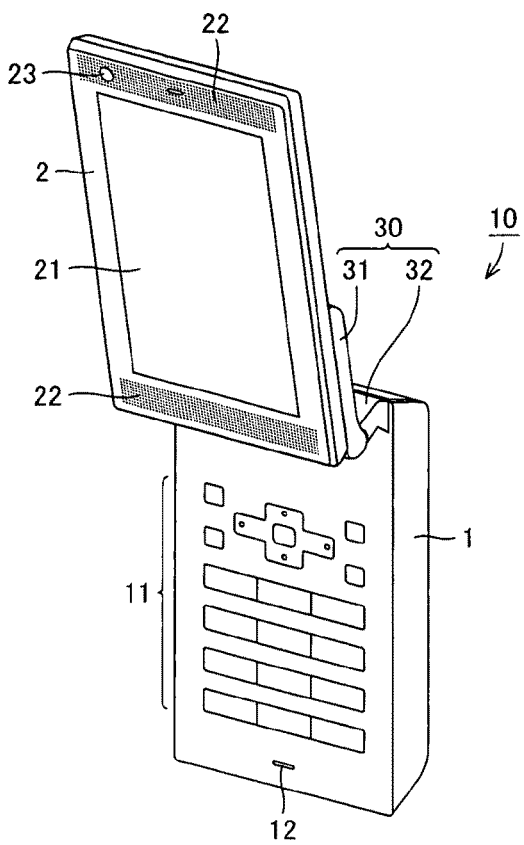
FIG. 17 is a perspective view showing that a second casing of the mobile information terminal in the first embodiment of the present invention is in the open, vertically long state.
Figure 18:
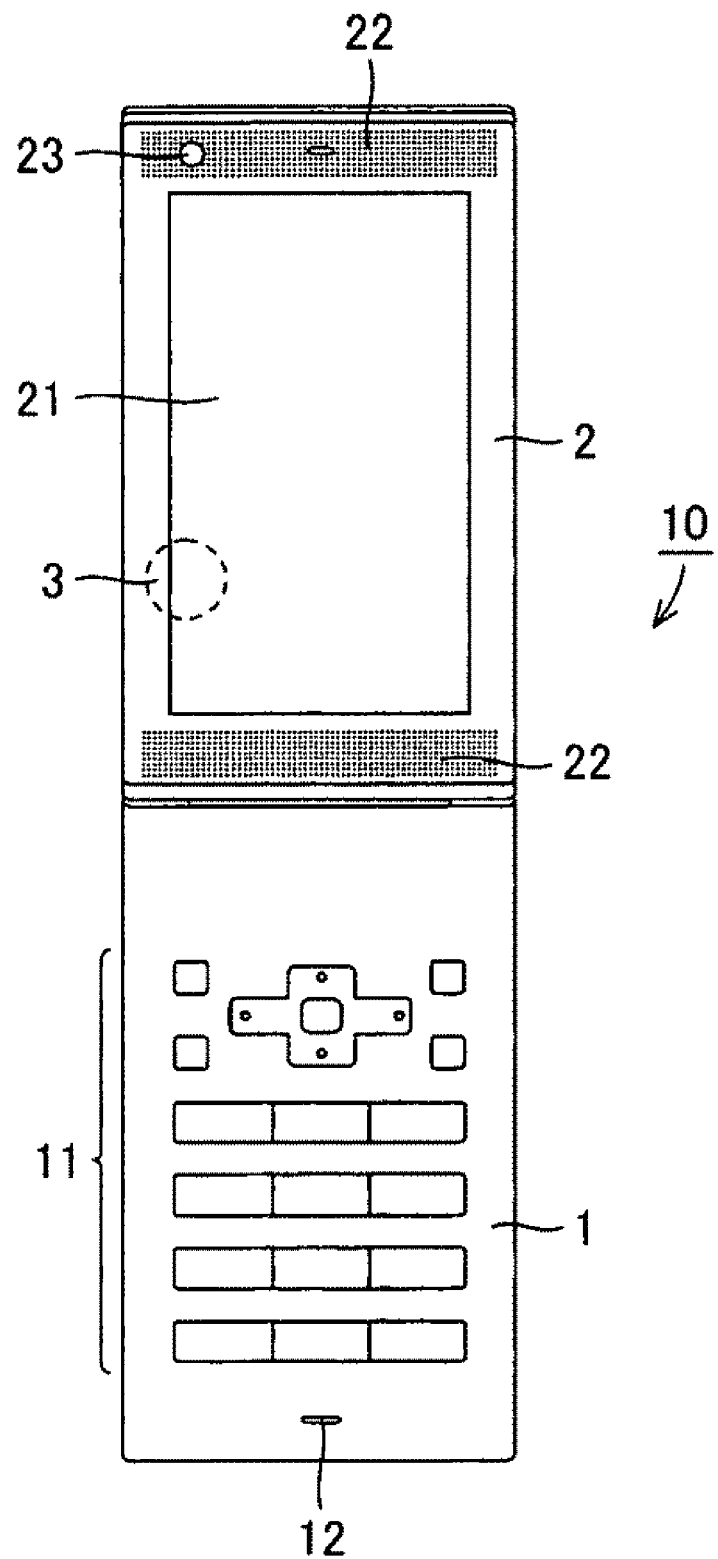
FIG. 18 is a front view showing that the second casing of the mobile information terminal in the first embodiment of the present invention is in the open, vertically long state.
Figure 19:
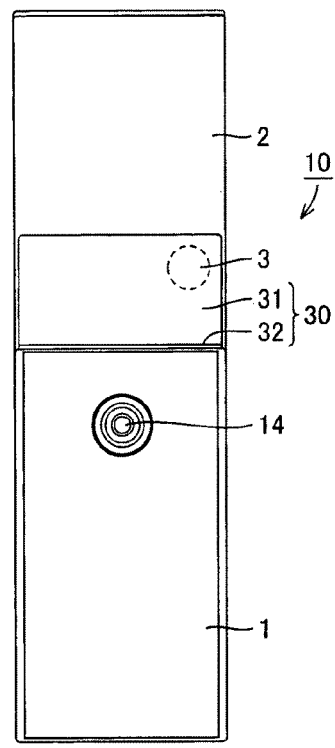
FIG. 19 is a rear view showing that the second casing of the mobile information terminal in the first embodiment of the present invention is in the open, vertically long state.
Figure 20:
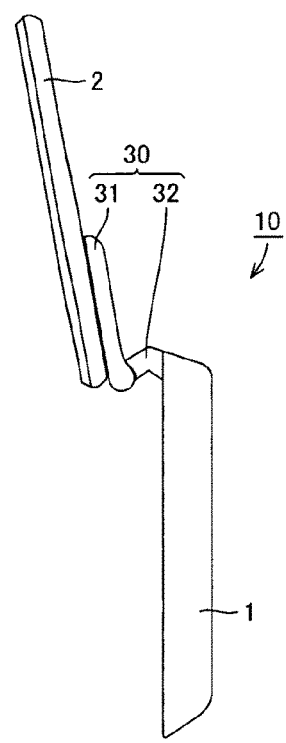
FIG. 20 is a right side view showing that the second casing of the mobile information terminal in the first embodiment of the present invention is in the open, vertically long state.

Mainly referring to FIG. 7, a camera 14 is arranged on the back surface of first casing 1. In this case, display portion 21 may be used as a finder of camera 14. Cameras (an image pickup device, for example, CCD) 14, 23 may also be rotated according to the rotation of display portion 21 so that an image picked up by cameras 14, 23 (an image displayed on display portion 21) can be displayed in a normal state whether display portion 21 is a portrait type (the state in FIG. 5) or a landscape type (the state in FIG. 17). A flash lamp (not shown) may be arranged in vicinity of camera 14.

Figure 8:
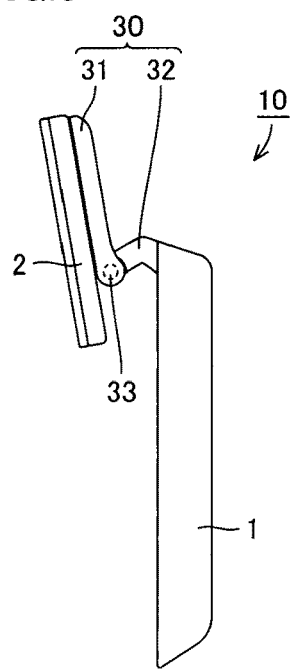
FIG. 8 is a right side view showing a configuration of a specific example of the mobile information terminal in the first embodiment of the present invention in the open, horizontally long state.
Figure 9:
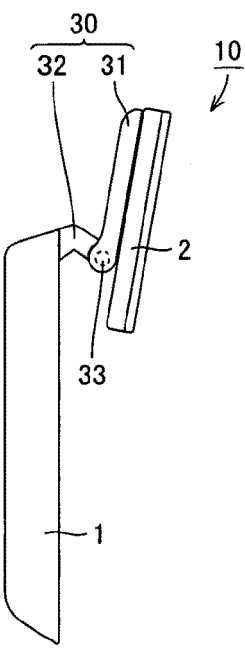
FIG. 9 is a left side view showing a configuration of a specific example of the mobile information terminal in the first embodiment of the present invention in the open, horizontally long state.
Figure 10:
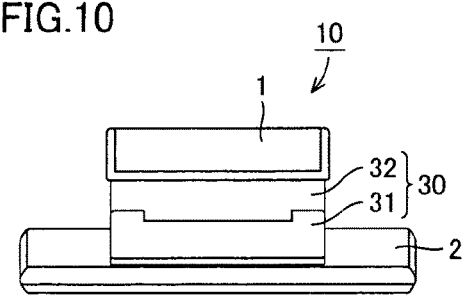
FIG. 10 is a plan view showing a configuration of a specific example of the mobile information terminal in the first embodiment of the present invention in the open, horizontally long state.
Figure 11:
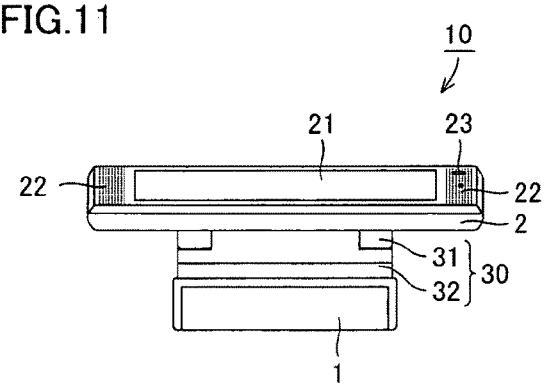
FIG. 11 is a bottom view showing a configuration of a specific example of the mobile information terminal in the first embodiment of the present invention in the open, horizontally long state.

Mainly referring to FIG. 8 and FIG. 9, a slot for inserting/removing an external memory such as a memory card into/from first casing 1 may be arranged on a side surface (one of the right side surface and the left side surface) of first casing 1. In this case, for example, when an image of camera 14 or camera 23 is stored in an external memory, a flag may also be input which allows recognition of the storage (recording) state of an image depending on whether camera 14 or camera 23 is used in the portrait type or in the landscape type (the usage in the portrait type or the landscape type is sensed by an acceleration sensor), whereby a reproduction image can be obtained in a normal state at the time of reproduction. Then, a television broadcast may be recorded in an external memory. In addition, another external memory having a television broadcast or music recorded therein may be inserted into the slot so that the image or sound recorded in another external memory is reproduced in the mobile phone.

Figure 12:
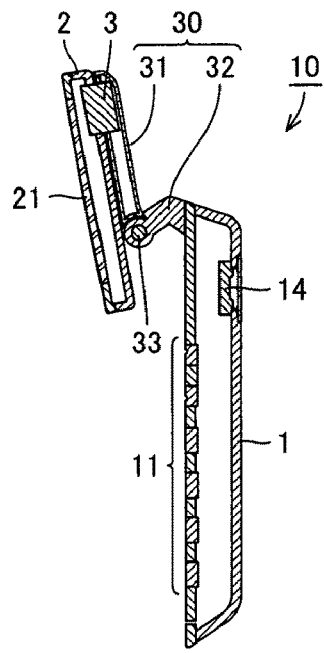
FIG. 12 is a schematic cross sectional view along line XII-MI in FIG. 6.
Figure 13:
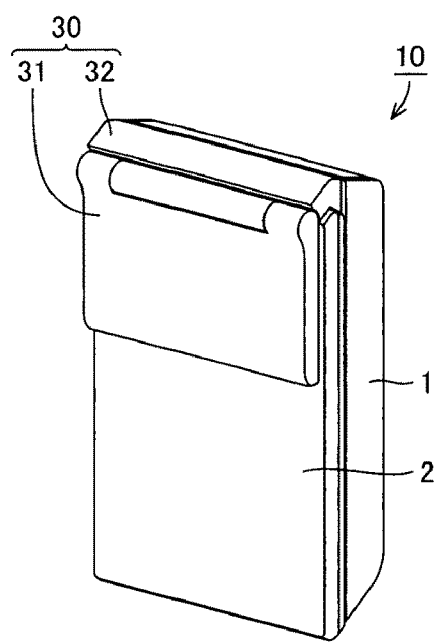
FIG. 13 is a perspective view showing a closed state of the mobile information terminal in the first embodiment of the present invention.
Figure 14:
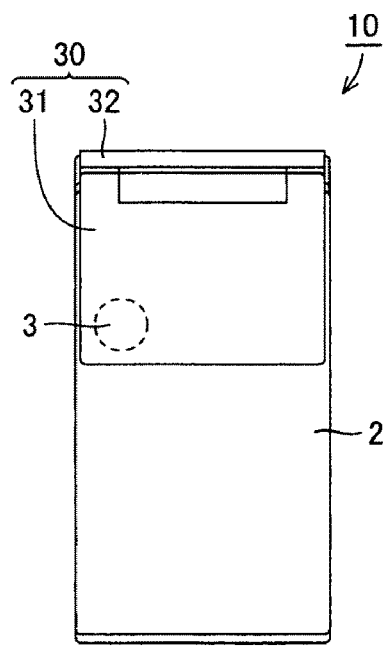
FIG. 14 is a front view showing the closed state of the mobile information terminal in the first embodiment of the present invention.
Figure 15:
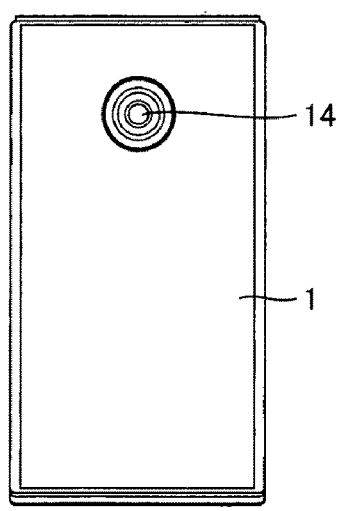
FIG. 15 is a rear view showing the closed state of the mobile information terminal in the first embodiment of the present invention.

Mainly referring to FIG. 12, the joint mechanism has rotation shaft 3 and a hinge portion 30. Hinge portion 30 is comprised of two joint members 31, 32 which are rotatably joined to each other by rotation shaft 33. Second casing 2 is joined to joint member 31 by rotation shaft 3 in a slidably rotatable manner. Joint member 32 is fixed to the end portion (the upper side in the figure) of the front surface of first casing 1.

Mainly referring to FIG. 6 and FIG. 12, the above-noted joint mechanism joins joint member 31 and second casing 2 such that second casing 2 is relatively slidably rotated with respect to joint member 31 by means of rotation shaft 3, and it also joins joint member 31 and joint member 32 such that joint member 31 is relatively rotated with respect to joint member 32 by means of rotation shaft 33. Rotation shaft 3 is arranged at a position shifted from the center line of first casing 1, for example, arranged at point P2 on the inner side of second casing 2 from the longer side B of second casing 2 as shown in FIG. 1 and FIG. 3. Accordingly, mobile information terminal 10 in the present embodiment can be operated to make a transition to each of the closed state, the vertically long state in which second casing 2 is open, and the horizontally long state in which second casing 2 is open, as illustrated in FIG. 1-FIG. 4.

Referring to FIG. 13-FIG. 16, in the closed state, the front surface of first casing 1 and the front surface of second casing 2 are opposed to each other, operation portion 11 provided on the front surface of first casing 1 is entirely covered with second casing 2, and display portion 21 provided on the front surface of second casing 2 is entirely covered with first casing 1. Accordingly, display portion 21 is not visually recognized from the outside of mobile information terminal 10 and protected. An operating error of operation portion 11 can also be prevented.

Figure 16:
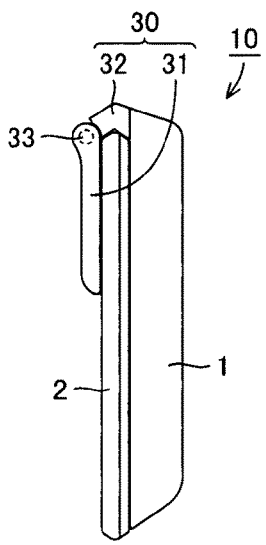
FIG. 16 is a right side view showing the closed state of the mobile information terminal in the first embodiment of the present invention.

Mainly referring to FIG. 16, in the closed state, rotation shaft 33 for coupling first casing 1 and second casing 2 in an openable/closable manner is located above second casing 2 with respect to the front surface of first casing 1.

Referring to FIG. 17-FIG. 20, in the open, vertically long state, both operation portion 11 and display portion 21 are exposed outside. Second casing 2 has left-right symmetry with respect to the center line of first casing 1.

Figure 21:
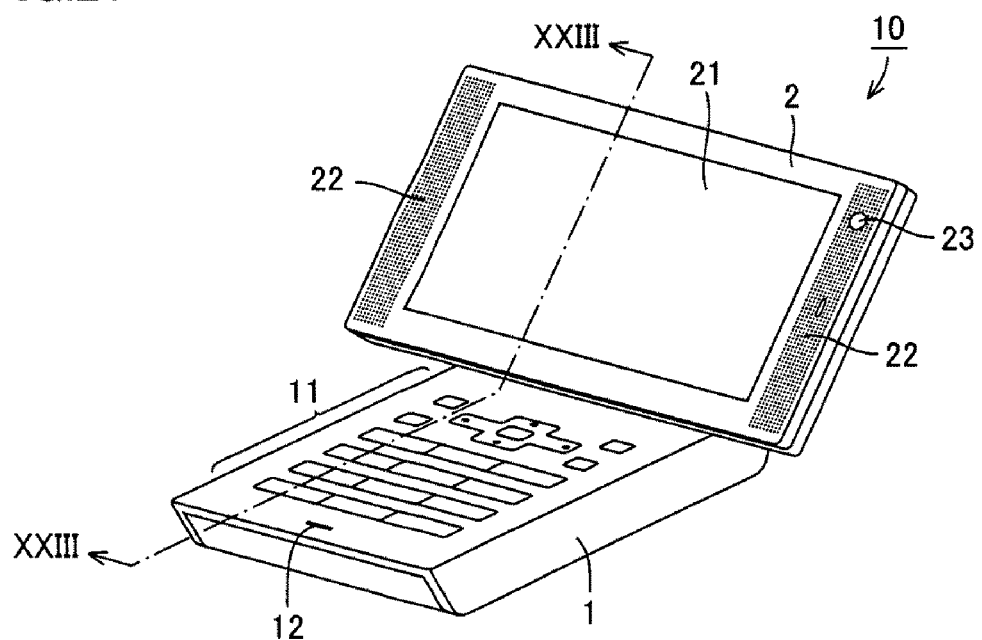
FIG. 21 is a perspective view showing that the mobile information terminal in the first embodiment of the present invention is placed on a table or the like in the open, horizontally long state.
Figure 22:
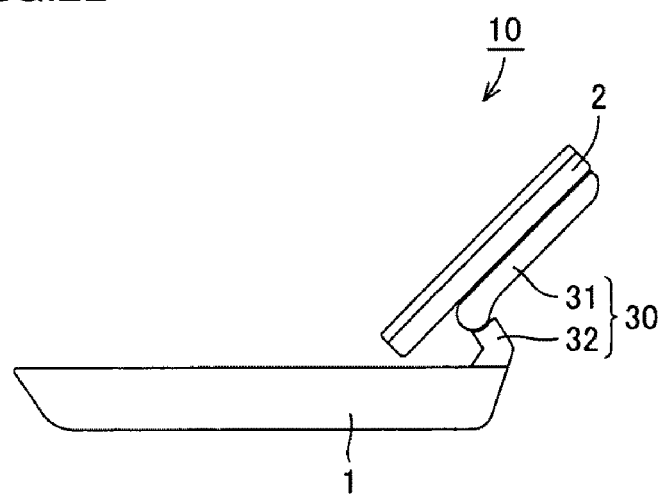
FIG. 22 is a right side view showing that the mobile information terminal in the first embodiment of the present invention is placed on a table or the like in the open, horizontally long state.

Referring to FIG. 21 and FIG. 22, when mobile information terminal 10 in the present embodiment is placed on a table or the like in the open, horizontally long state, the back surface of first casing 1 is in contact with the surface of the table or the like, and second casing 2 is inclined with respect to the surface of first casing 1. Therefore, the operator can easily see display portion 21 of second casing 2 even in the state in which mobile information terminal 10 is placed on a table or the like. The angle of inclination of second casing 2 is adjustable by adjusting a joint angle between joint members 31 and 32. Thus, display portion 21 can be inclined to be more easily viewable for the operator. In addition, the lower end portion (the lower side in the figure) of the inclined second casing 2 may be brought into abutment with the front surface of first casing 1. Accordingly, the inclined state of the second casing can securely be held.

Now, an internal structure of mobile information terminal 10 in the present embodiment, a specific structure of rotation shaft 3, a component of each part, and the like will be described.

Figure 23:
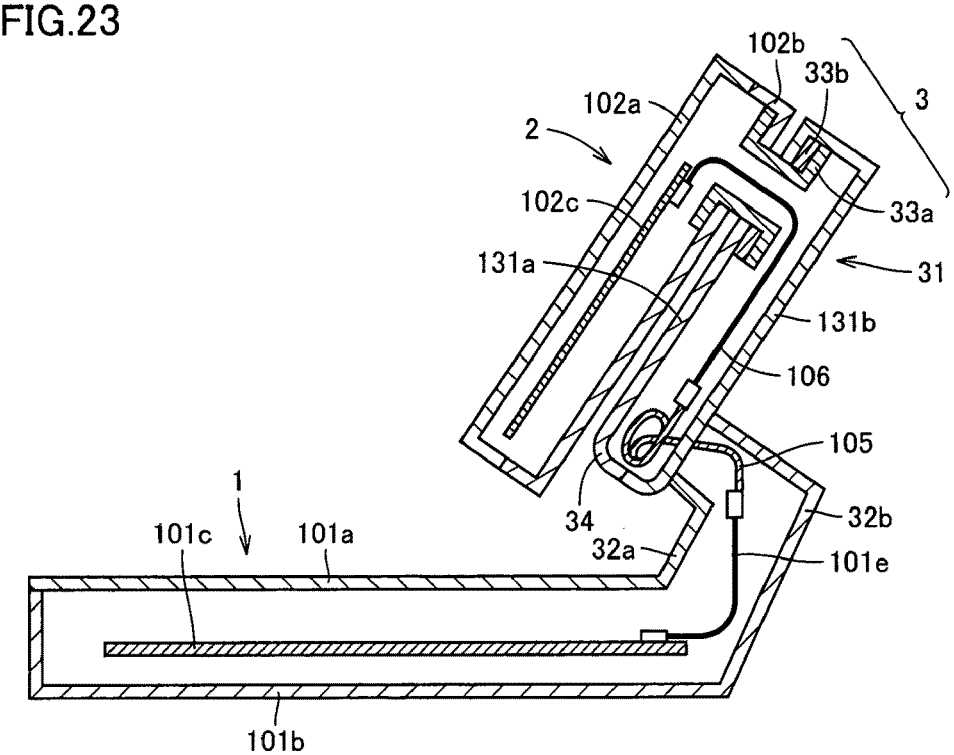
FIG. 23 is a schematic cross sectional view along line XXIII-XXIII in FIG. 21.
Figure 24:
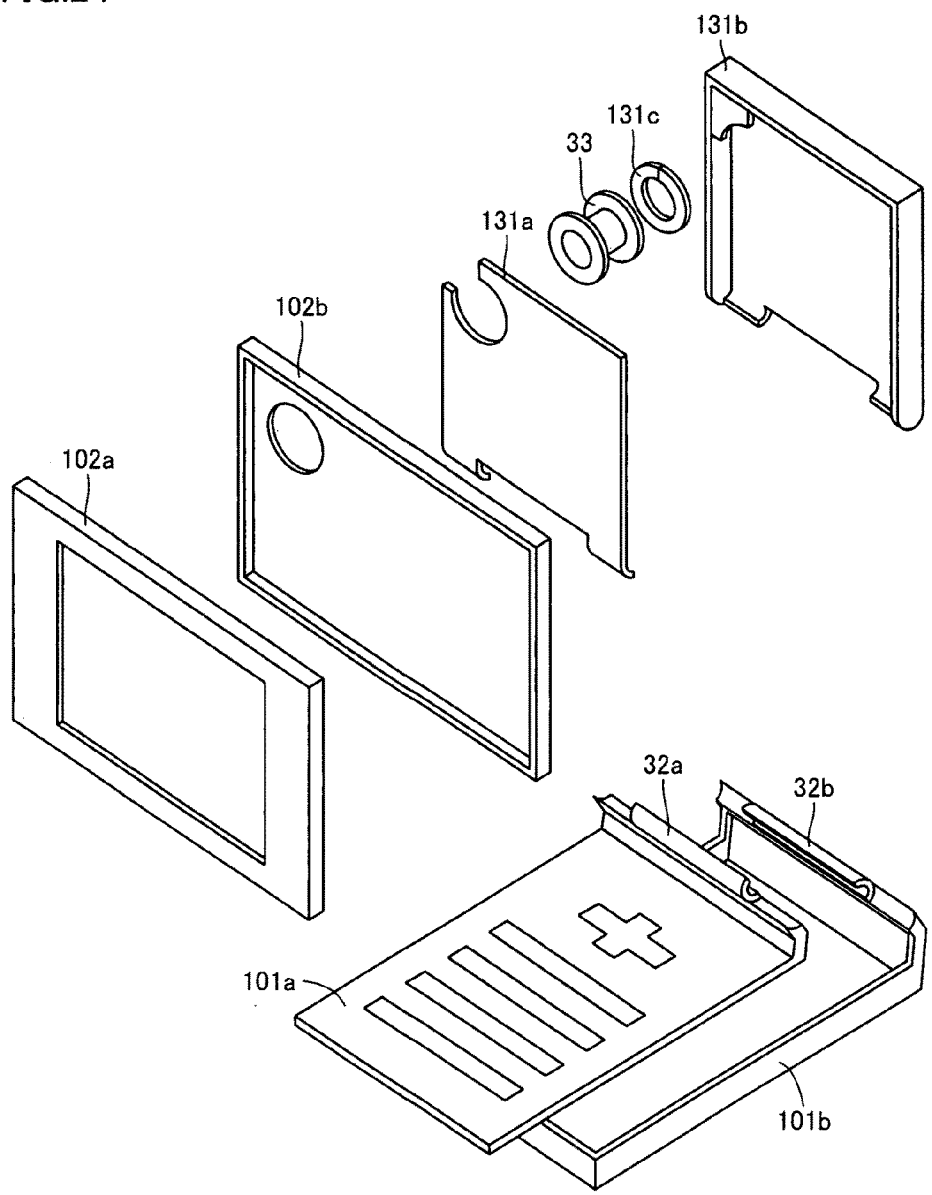
FIG. 24 is an exploded perspective view of the mobile information terminal in the first embodiment of the present invention.

Referring to FIG. 23 and FIG. 24, first casing 1 is comprised of a combination of a key-side top cabinet 101a, a key-side bottom cabinet 101b and has a board 101c electrically connected to operation portion 11, microphone 12 and the like, inside therein. Second casing 2 is comprised of a combination of an LCD (Liquid Crystal display) top cabinet 102a and an LCD bottom cabinet 102b and has a board 102c electrically connected to LCD serving as display portion 21, inside therein.

Joint member 31 of the joint mechanism is comprised of a combination of a strut inner cabinet 131a and a strut outer cabinet 131b. Joint member 32 of the joint mechanism is comprised of a combination of a protrusion portion 32a protruding from key-side top cabinet 101a and a protrusion portion 32b protruding from key-side bottom cabinet 101b. Rotation shaft 3 is comprised of a combination of a rotation hinge fixing-side plate 33a fixed to LCD bottom cabinet 102b and a rotation hinge movable-side plate 33b fixed to strut inner cabinet 131a.

Board 101c in first casing 1 and board 102c in second casing 2 are electrically connected to each other by a wire 101e, a flat cable 105 and a wire 106. Flat cable 105 is arranged inside the rotation mechanism portion of joint members 31 and 32, for example, by winding a U-shaped cable as shown in FIG. 25(a), as shown in FIG. 25(b). Wire 101e electrically connects board 101c and flat cable 105 to each other, and wire 106 electrically connects board 102c and flat cable 105 to each other.

The electrical connection between the electric devices in this manner enables power supply to display portion 21, speaker 22, cameras 14, 23 from a battery or the like, and communication of an electrical signal between the respective electric devices of first casing 1 and second casing 2.

Now, an opening/closing operation of mobile information terminal 10 in this embodiment will be described.

Figure 26:
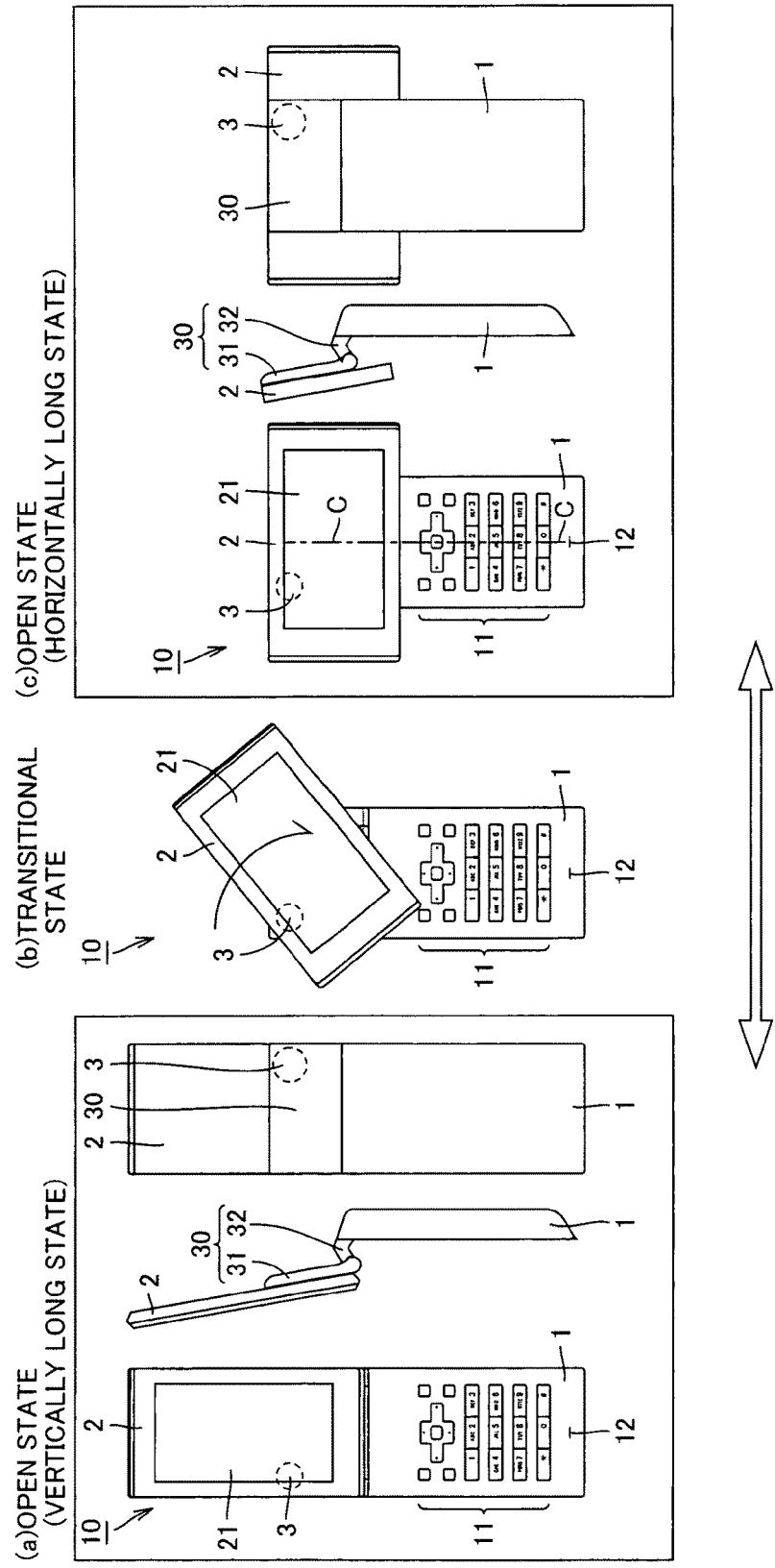
FIG. 26 is a front view illustrating an opening/closing operation of the mobile information terminal in the first embodiment of the present invention.

FIG. 26 is a front view illustrating an opening/closing operation of the mobile information terminal in the first embodiment of the present invention. FIG. 26(a) shows a front view, a right side view and a rear view in the open, vertically long state, FIG. 26(b) shows a front view during transition, and FIG. 26(c) shows a front view, a right side view and a rear view in the open, horizontally long state.

First, in the closed state (FIGS. 13-16), the operator rotates joint member 31 and second casing 2 around rotation shaft 33 with respect to first casing 1, with first casing 1 grasped in hand. This brings about the open, vertically long state shown in FIG. 26(a) and causes operation portion 11 and display portion 21 to be exposed outside.

From the open, vertically long state shown in FIG. 26(a), second casing 2 is slidably rotated, for example, clockwise in the figure with respect to first casing 1 and joint member 31 around rotation shaft 3. Accordingly, as shown in FIG. 26(b), second casing 2 gradually makes transition into the horizontally long state with respect to first casing 1 and joint member 31.

By rotating second casing 2 by 90° from the open, vertically long state, as shown in FIG. 26(c), second casing 2 comes into left-right symmetry with respect to center line C-C of first casing 1, and second casing 2 comes into the open, horizontally long state. In this state, mobile information terminal 10 has a "T"-shaped contour as viewed from the front. Also in this state, operation portion 111 and display portion 21 are exposed outside.

On the other hand, the operation from the open, horizontally long state to the closed state is performed by reversing the aforementioned operation.

Now, a usage manner of the mobile information terminal in the present embodiment will be described.

Figure 27:
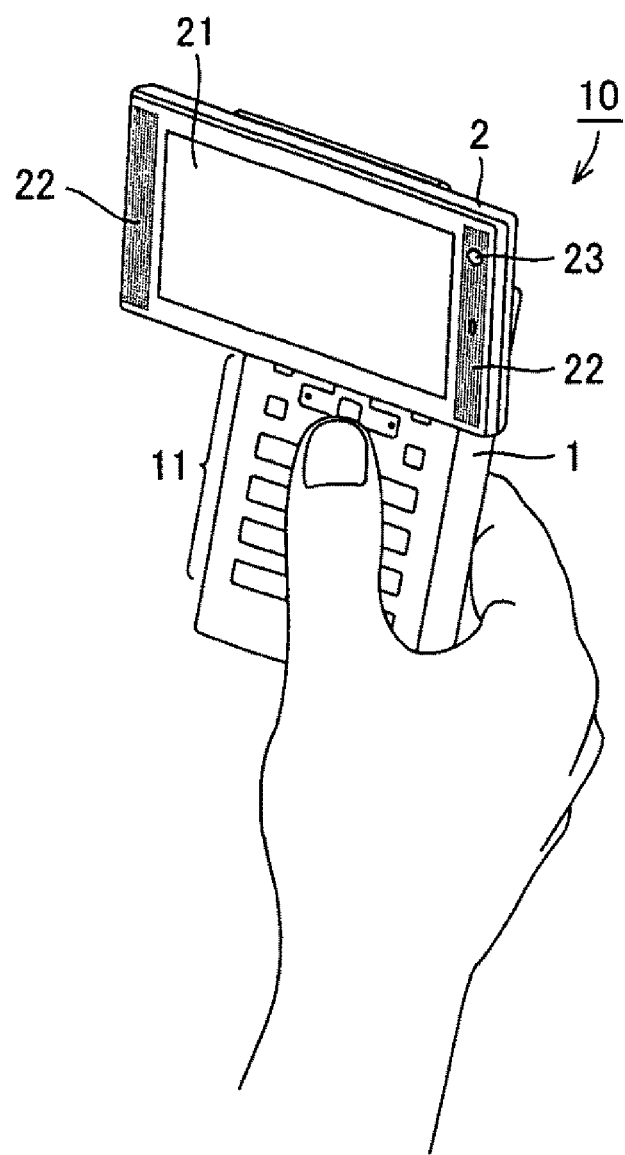
FIG. 27 is a perspective view illustrating a usage manner of the mobile information terminal in the first embodiment of the present invention in the open, horizontally long state.

In the open, horizontally long state shown in FIG. 27, the operator can see display portion 21 in horizontally long display while grasping first casing 1 in hand. Therefore, the operator can watch television (terrestrial digital broadcast, terrestrial analog broadcast, digital radio broadcast with image, or the like) on display portion 21 with the mobile information terminal held in his hand. In addition, display portion 21 has left-right symmetry with respect to the center line of first casing 1 in the open, horizontally long state, thereby achieving comfortable television viewing. Therefore, the operator can watch television comfortably even under the circumstances in which mobile information terminal 10 cannot be laid as in a train on the move.

Moreover, each key of operation portion 11 is operated by thumb for mail or calling operation with first casing 1 grasped.

Figure 28:
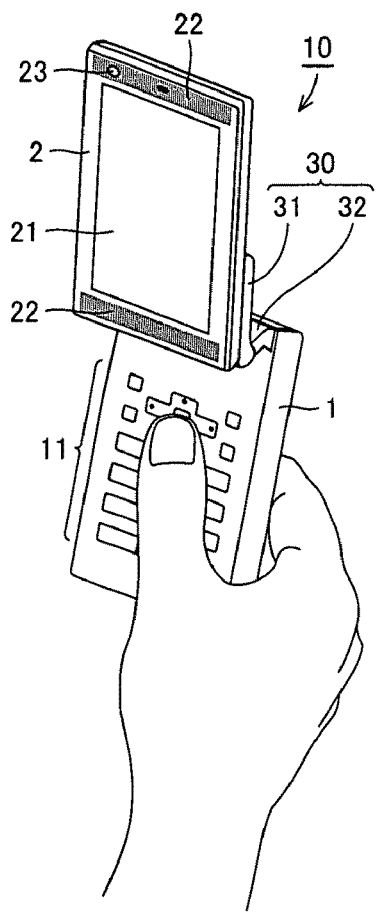
FIG. 28 is a perspective view illustrating a usage manner of the mobile information terminal in the first embodiment of the present invention in the open, vertically long state.

In the vertically long state shown in FIG. 28, the operator can perform, for example, mail or calling operation while viewing display portion 21 with first casing 1 grasped in hand. Here, a variety of operations are performed by operating operation portion 24.

In either state of FIG. 27 and FIG. 28, an image of a subject can be taken by pointing camera 14 provided on the rear surface of first casing 1 to the subject and seeing the subject and the shot composition on display portion 21 (namely, using display portion 21 as a finder). Furthermore, the operator can use camera 23 provided on the front surface of second casing 2 to take an image of himself as a subject while seeing the subject and the shot composition on display portion 21. Moreover, a videophone is also realized by camera 23 in which the operator talks to the party on the other end while taking an image of himself.

Figure 29:
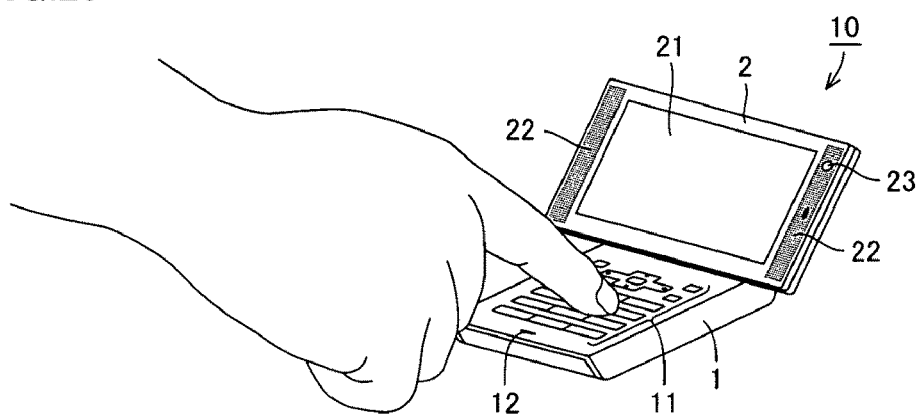
FIG. 29 is a perspective view illustrating a usage manner of the mobile information terminal in the first embodiment of the present invention placed on a table or the like in the open, vertically long state.

In the state where mobile information terminal 10 is placed on a table or the like in the open, horizontally long state shown in FIG. 29, the operator can watch television on display portion 21 without holding the mobile information terminal in hand. In addition, in the open, horizontally long state, display portion 21 has left-right symmetry with respect to the center line of first casing 1, thereby achieving comfortable television viewing. Moreover, the angle of inclination of second casing 2 with respect to first casing 1 can be adjusted by rotation shaft 33, so that the angle of display portion 21 can be adjusted for the operator to see easily. Therefore, the operator can watch television comfortably even under the circumstances in which the mobile information terminal is placed on a table or the like in a room.

In the state in FIG. 27 and FIG. 29, usability can be further improved by automatically setting (switching) to a mode of giving top priority to television viewing.

In the closed state shown in FIGS. 13-16, display portion 21 and operation portion 11 are not exposed outside. This eliminates the likelihood of damaging display portion 21 and prevents an operating error of the operation portion, and thus this state is convenient for carrying mobile information terminal 10.

In addition, in the case where a touch panel is employed in display portion 21, a variety of operations can be performed by operating the touch panel.

Now, an electric circuit portion of the mobile information terminal in the present embodiment will be described.

Figure 30:
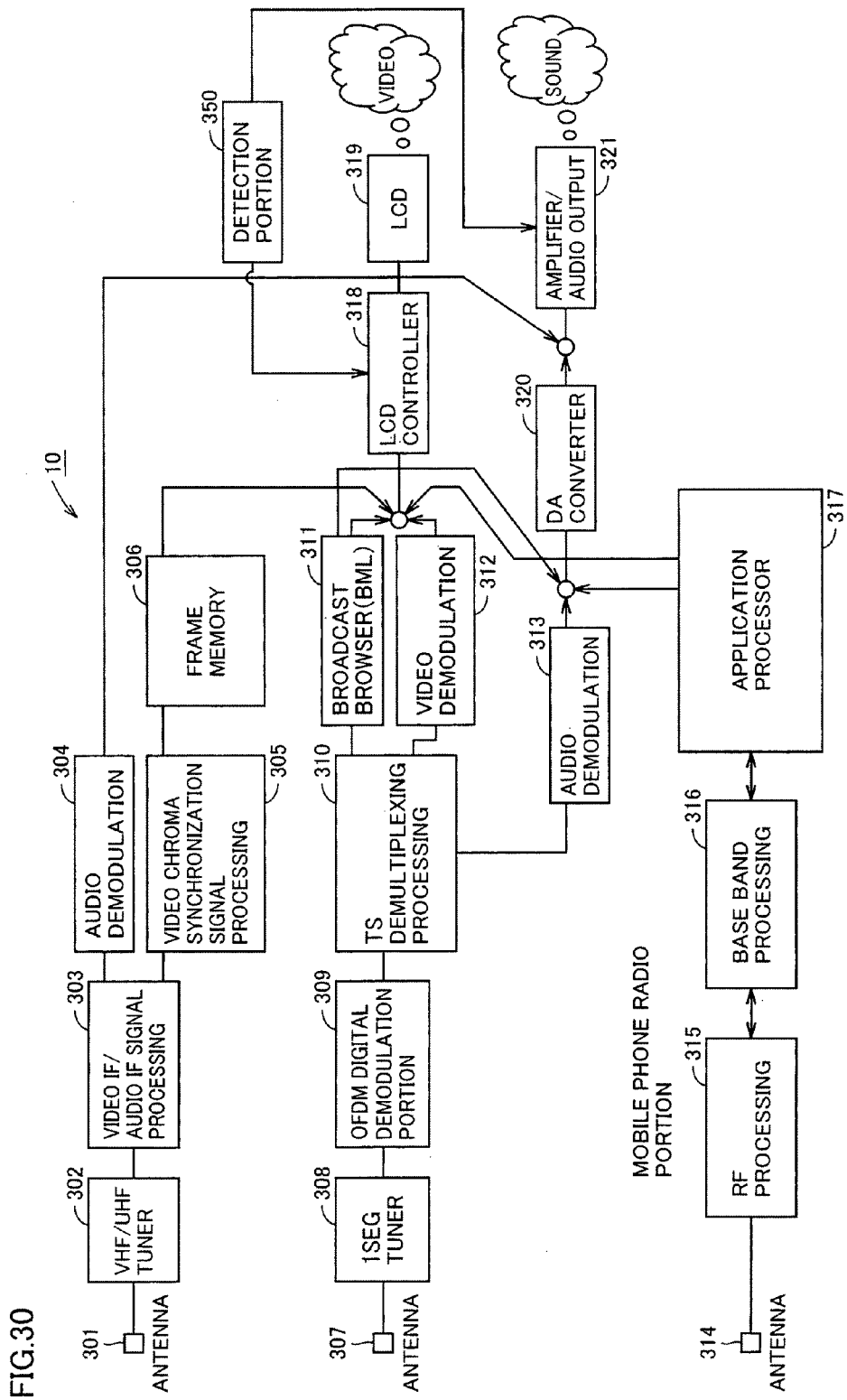
FIG. 30 is a circuit block diagram showing an exemplary electric circuit portion of the mobile information terminal in the first embodiment of the present invention.

Referring to FIG. 30, an electric circuit portion in this embodiment has a terrestrial analog broadcast reception portion, a terrestrial digital broadcast reception portion, and a mobile phone radio portion.

In the terrestrial analog broadcast reception portion, a signal received at an antenna 301 is processed in a VHF/UHF tuner circuit 302 and a video IF (intermediate frequency)/audio IF signal processing circuit 303. Thereafter, an audio signal is processed in an audio demodulation circuit 304 and then output in an amplifier/audio output circuit 321 as sound, and a video signal is processed in a video chroma synchronization signal processing circuit 305 and a frame memory circuit 306 and is then sent to an LCD (Liquid Crystal Display) controller circuit 318.

In the terrestrial digital broadcast reception portion, a signal received at an antenna 307 is processed in a 1 SEG (segment) tuner circuit 308, an OFDM (Orthognal Frequency Division Multiplexing) digital demodulation circuit 309 and a TS (Transport Streams) demultiplexing processing circuit 310. Thereafter, a video signal is processed concurrently in a broadcast browser circuit 311 and a video demodulation circuit 312 and is then sent to LCD controller circuit 318, and an audio signal is processed concurrently in broadcast browser circuit 311 and an audio demodulation circuit 313 and is then sent to a DA (Digital/Analogue) converter 320.

In the mobile phone radio portion, a signal received at an antenna 314 is processed in an RF (Radio Frequency) processing circuit 315 and a Based band processing circuit 316. Thereafter, through an application processor circuit 317, a video signal is sent to LCD controller circuit 318 and an audio signal is sent to DA converter 320.

The video signal sent to LCD controller circuit 318 is output as video in LCD circuit 319. On the other hand, the audio signal sent to DA converter 320 is output as sound in amplifier/audio output circuit 321.

In addition, a screen display on display portion 21 has to be switched between the case of vertically long display and the case of horizontally long display, and the audio output in the speaker has also to be switched as described later. Such screen display switching and speaker switching are performed by sensing that second casing 2 is in the vertically long state or in the horizontally long state. Specifically, a detection portion 350 detects whether second casing 2 is in the vertically long state or in the horizontally long state. Then, a detection signal from detection portion 350 is input to each of LCD controller 318 and amplifier/audio output 321. Accordingly, the switching between the vertically long display and the horizontally long display in LCD 319 is performed by LCD controller 318, and the switching of audio output in the speaker is performed by amplifier/audio output 321.

In accordance with the present embodiment, the following effects can be achieved as compared with the conventional example shown in FIG. 144.

Figure 31:
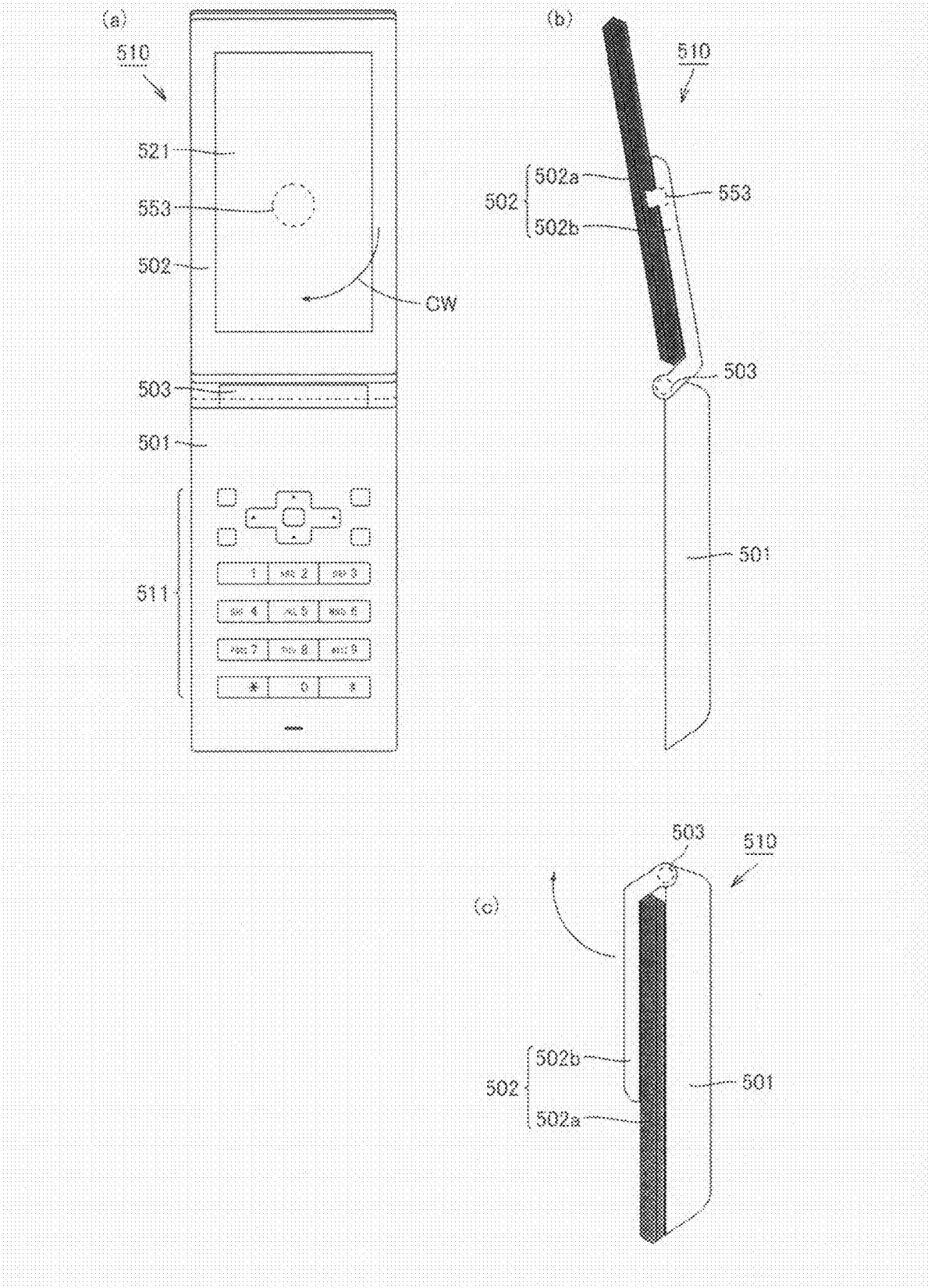
FIG. 31 shows a front view (a) and a right side view (b) in the open, vertically long state and a right side view (c) in the closed state showing a configuration similar to a configuration of a mobile phone shown in FIG. 144.

Referring to FIG. 31, in this configuration, as shown in FIG. 31(*c*), hinge portion 503 joining lower unit 501 and upper unit 502 in a foldable manner is located below display portion 502*a* with respect to the front surface of lower unit 501 in the folded state. Therefore, support portion unit 502*b* need to be bent in the shape of an angle bracket. In this case, in an attempt to slidably rotate display portion unit 502*a* around rotation shaft 553 with respect to support portion unit 502*b*, display portion unit 502*a* interferes with hinge portion 503 or support portion unit 502*b* so that display portion unit 502*a* cannot be rotated. In order to prevent this interference, as shown in FIG. 144, the four corners of display portion unit 502*a* are formed in a rounded curved shape, which restricts the contour of display portion unit 502*a*.

Furthermore, as shown in FIG. 31(*a*), rotation shaft 553 is located on the center line of lower unit 501 and upper unit 502. Therefore, even if display portion unit 502*a* is brought into the horizontally long state, it is hard to bring display portion unit 502*a* closer to lower unit 501, and therefore it is difficult to reduce the body size in the horizontally long display state.

FIG. 32 shows a right side view (a) in the open, vertically long state and a right side view (b) in the closed state showing the configuration of the mobile information terminal in the first embodiment of the present invention. Referring to FIG. 32, in this configuration, as shown in FIG. 32(*b*), rotation shaft 33 for coupling first casing 1 and second casing 2 in an openable/closable manner is located above second casing 2 with respect to the front surface of first casing 1 in the closed state. Therefore, when display portion 21 is brought from the vertically long state to the horizontally long state in the open state as shown in FIG. 32(*a*), this rotation shaft 33 or joint members 31, 32 do not interfere with second casing 2. Therefore, second casing 2 can be brought from the vertically long state to the horizontally long state even if the four corners of the contour of second casing 2 are not formed in a rounded curved shape. Thus, the contour of second casing 2 is less restricted.

In addition, since rotation shaft 33 does not interfere with second casing 2, second casing 2 can be brought closer to first casing 1 in the open state. Therefore, the body size can be further reduced as compared with the conventional example, in the state in which display portion 21 is horizontally long display.

Moreover, in the open state as shown in FIG. 6, rotation shaft 3 is arranged at a position shifted from the center line C-C of first and second casings 1, 2. Therefore, in the horizontally long state, second casing 2 can be arranged at a position closer to first casing 1, so that the body size can be further reduced when the display portion is in the horizontally long state, and the style during use is beautiful.

Furthermore, the joint mechanism in the present embodiment needs only two parts: rotation shaft 33 for coupling first casing 1 and second casing 2 in an openable/closable manner; and rotation shaft 3 for allowing display portion 21 to make a transition between the horizontally long state and the vertically long state. Therefore, the mechanism can be simplified as compared with the conventional example which requires three mechanism parts (two rotation mechanism portions and one slide mechanism portion).

In addition, the display portion can be brought into the horizontally long state from the closed state by setting second casing 2 to the open state with respect to first casing 1 and thereafter bringing second casing 2 from the vertically long state to the horizontally long state. Therefore, only two actions are required to bring the display portion into the horizontally long state, thereby reducing the number of actions as compared with the conventional example which requires three actions.

Moreover, in the open state, second casing 2 exposes operation portion 11 and has left-right symmetry with respect to the center line C-C of first casing 1, so that the operator can easily see display portion 21 with first casing 1 grasped in the open state. In particular, in the case where the operator plays a game with mobile information terminal 10, the left-right symmetry of display portion 21 with respect to the center line C-C of first casing 1 improves the game operability for the operator.

Further, the left-right symmetry makes it easier to distribute the weight of mobile information terminal 10 in the open state in left-right symmetry. This can prevent mobile information terminal 10 from tilting to the right or left in the open state. Therefore, when the operator grasps first casing 1 in the open state, tilting of mobile information terminal 10 can also be prevented easily. Accordingly, display portion 21 can be viewed stably even in an unstable state as in a commuter train.

Furthermore, with first casing 1 grasped in the open state, mobile information terminal 10 can be held securely without hiding display portion 21 of second casing 2 by finger.

In addition, in the unstable state, television (television broadcast) can be viewed with first casing 1 securely grasped as a grip, while in the stable state, television can be viewed in a compact, closed state.

(Arrangement of Diversity Antenna>

Figure 33:
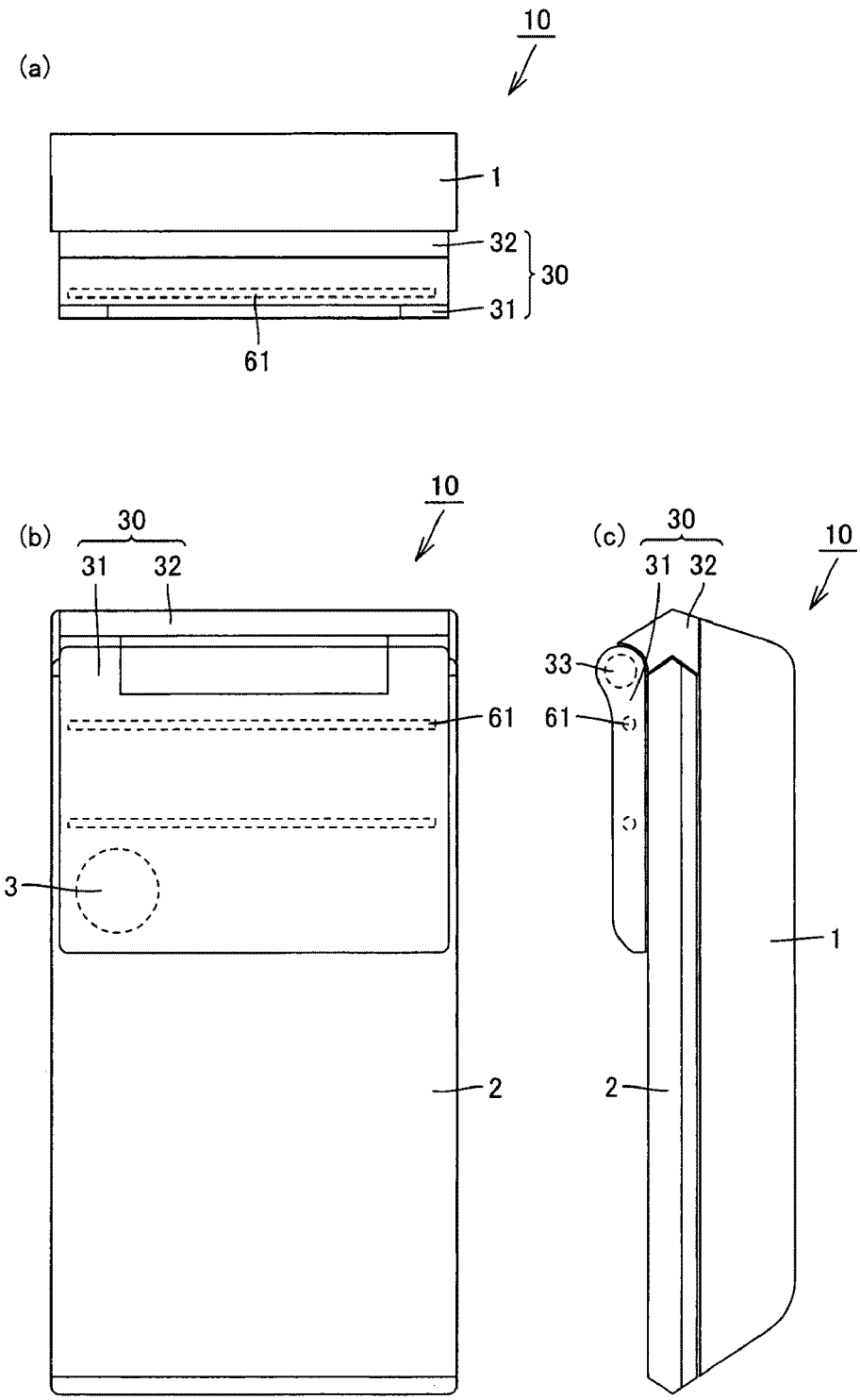
FIG. 33 shows a plan view (a), a front view (b) and a right side view (c) showing an arrangement manner of a diversity antenna.

Referring to FIG. 33, an antenna 61 is preferably installed inside joint member 31. Antenna 61 is preferably a diversity antenna. Diversity antenna 61 has a plurality of (for example, two) antennas, so that a signal of antenna 61 with superior radio conditions can be used preferentially and in addition, the received signals are combined with noise removed, thereby improving reception stability. Although antennas 61 are arranged to extend parallel in the horizontal direction in the figure in such a manner as to keep away from rotation shaft 3, they may be installed in any manner inside joint member 31 as long as they keep away from the rotation shaft, and may be arranged to extend parallel in the vertical direction in the figure.

The installation of antenna 61 inside joint member 31 allows the reception sensitivity of the antenna to be adjusted by adjusting the opening/closing angle of second casing 2.

<Arrangement of Sub-Display Portion>

Figure 34:
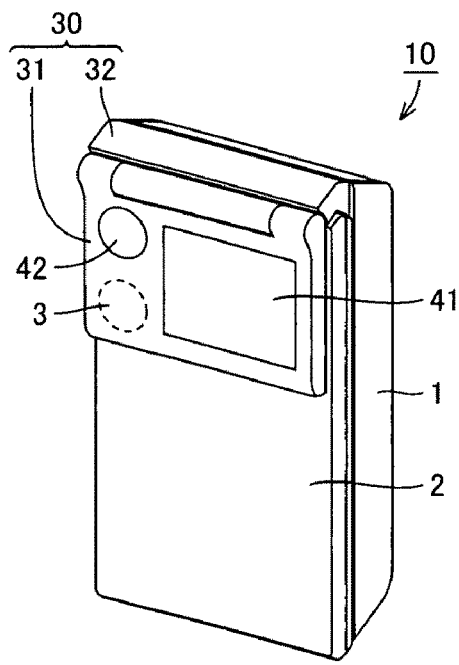
FIG. 34 is a perspective view illustrating an example of arrangement of a sub-display portion.
Figure 35:
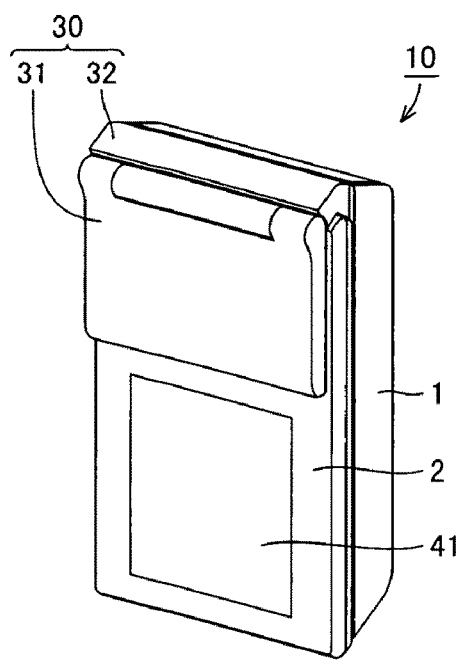
FIG. 35 is a perspective view illustrating another example of arrangement of the sub-display portion.

As a sub-display portion 41, for example, a liquid crystal display may be provided to joint member 31 as shown in FIG. 34 or may be provided on the back surface of second casing 2 as shown in FIG. 35. Provision of sub-display portion 41 in this manner allows image capturing in a digital camera manner in the closed state. More specifically, image capturing similar to image capturing using a digital camera becomes possible, in which the operator points camera 14 on the back surface of first casing 1 to a subject and presses the shutter button to take an image while seeing the subject and the shot composition on sub-display portion 41 in front of the operator. In this case, the shutter button is preferably arranged, for example, on the side surface of first casing 1 or second casing 2.

A flash lamp 42 may be provided to joint member 31 or the back surface of second casing 2. This flash lamp 42 may be a light emitting diode or a stroboscope using xenon. This flash lamp 42 illuminates a subject even in a dark place to allow for image capturing.

<Configuration Adapted to Double Swing>

In the foregoing description, a configuration using rotation shaft 3 has been described as a mechanism for enabling transition between the horizontally long state and the vertically long state. However, a configuration of a mechanism for transition is not limited thereto and may be a combination of a cam hole and a pin. With employment of this configuration, when second casing 2 is rotated in any direction with respect to first casing 1 and joint member 31, second casing 2 can be brought into left-right symmetry with respect to the center line of first casing 1 at a prescribed rotation angle (for example, 90°). In the following, this configuration will be described as a configuration adapted to double swing.

Figure 36:
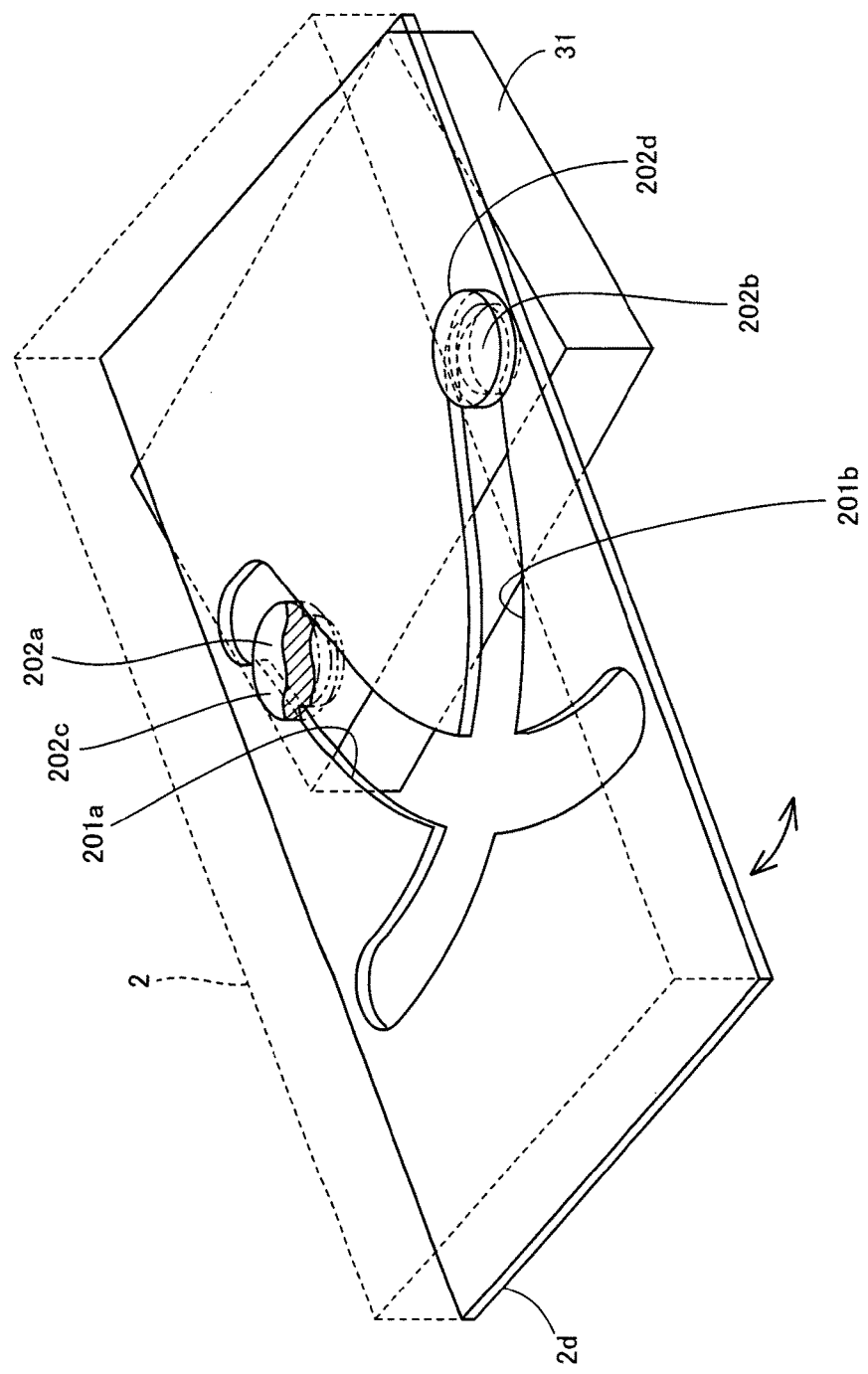
FIG. 36 is a partially broken perspective view schematically showing a configuration adapted to double swing.

FIG. 36 is a partially broken perspective view schematically showing a configuration adapted to double swing. Referring to FIG. 36, the configuration adapted to double swing has two cam holes (a first cam hole 201a and a second cam hole 201b) provided on a bottom plate 2d of second casing 2 and two pins (a first pin 202a and a second pin 202b) respectively inserted into first cam hole 201a and second cam hole 201b. The two cam holes are shaped such that arc-shaped first cam hole 201a and arc-shaped second cam hole 201b intersect each other. Each of the two pins (first pin 202a and second pin 202b) is fixed to a surface of joint member 31, and its fixed position is, for example, any of points P1-P3 in FIG. 1. The respective tip ends of first pin 202a and second pin 202b have a second flange portion 202c and a second flange portion 202d, respectively, each having an expanded diameter. First flange portion 202c and second flange portion 202d prevent first pin 202a and second pin 202b from dropping from cam holes 201, respectively.

Here, although first cam hole 201a and second cam hole 201b may be provided directly on bottom plate 2d of second casing 2, flat plate 2d provided with first cam hole 201a and second cam hole 201b may be bonded to the bottom plate of second casing 2.

Now, an opening/closing operation of the configuration adapted to double swing shown in FIG. 36 will be described.

Figure 37:
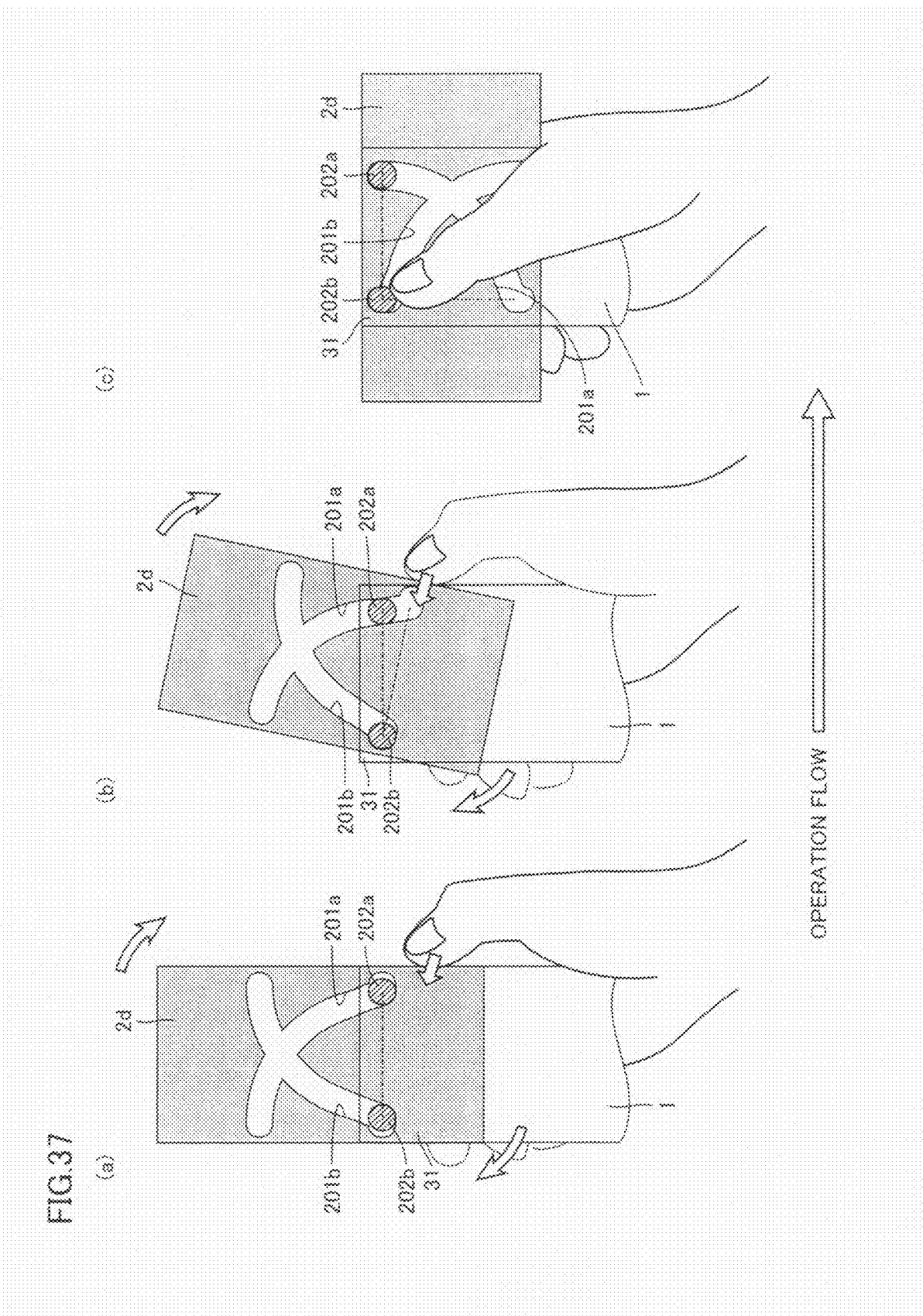
FIG. 37 is a front view illustrating an opening/closing operation using the right hand for the configuration adapted to double swing shown in FIG. 36.

Referring to FIG. 37, starting from the open, vertically long state (FIG. 37(a)), second casing 2 is pushed down by the thumb of the right hand which grasps first casing 1, so that first pin 202a on the right side in the figure slides along first cam hole 201a and second casing 2 slidably rotates clockwise in the figure with respect to first casing 1 around second pin 202b on the left side in the figure. Accordingly, second casing 2 is gradually displaced with respect to first casing 1 (FIG. 37(b)). Second casing 2 is brought into the open, horizontally long state (FIG. 37(c)) by rotating second casing 2 by 90° clockwise in the figure with respect to first casing 1. Accordingly, second casing 2 comes to have left-right symmetry with respect to the center line of first casing 1, and mobile information terminal 10 is brought into the open state with the contour in the shape of a letter "T."

Figure 38:
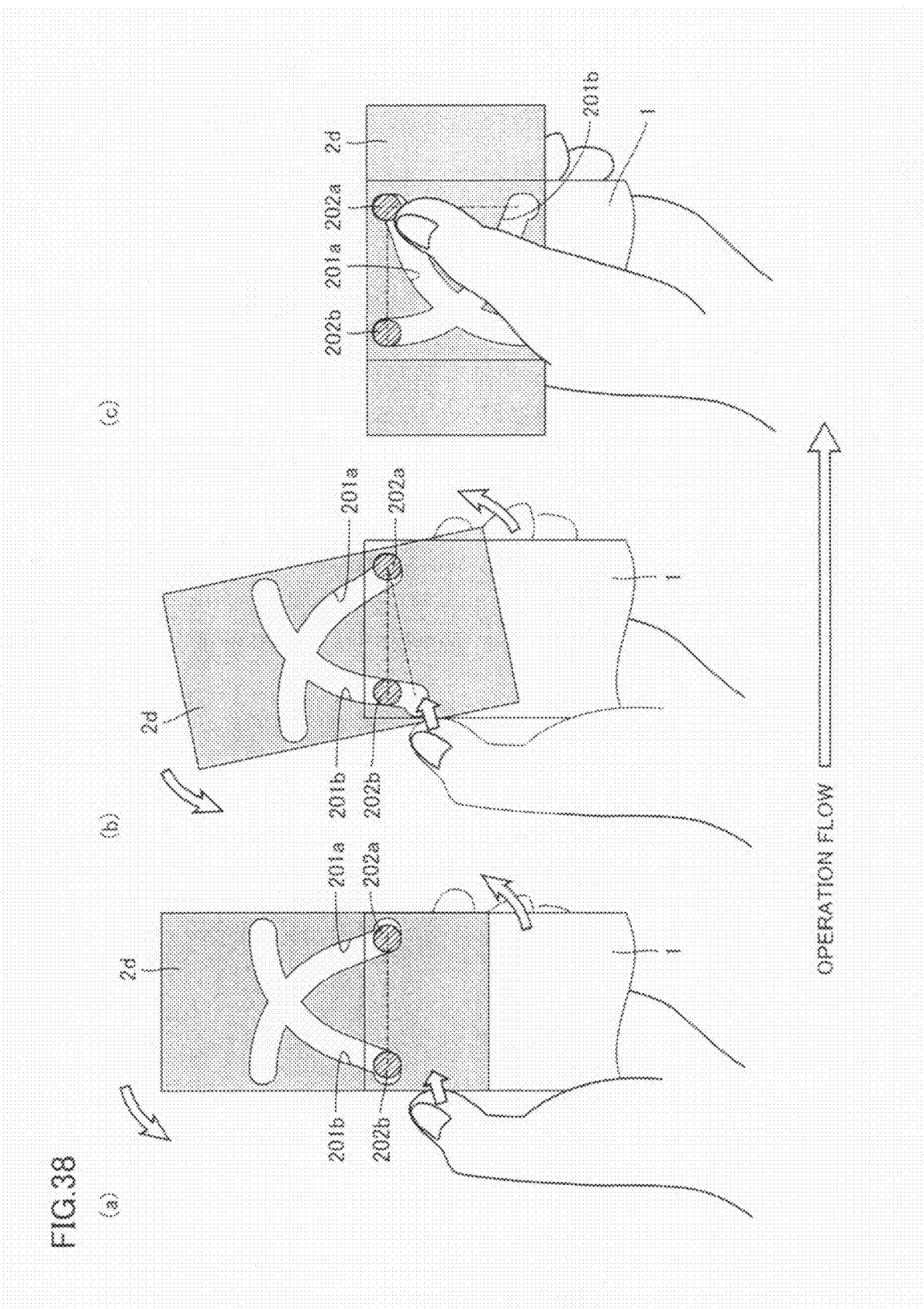
FIG. 38 is a front view illustrating an opening/closing operation using the left hand for the configuration adapted to double swing shown in FIG. 36.

Referring to FIG. 38, starting from the open, horizontally long state (FIG. 38(a)), second casing 2 is pushed down by the thumb of the left hand which grasps first casing 1, so that second pin 202b on the left side in the figure slides along second cam hole 201b and second casing 2 slidably rotates counterclockwise in the figure with respect to first casing 1 around first pin 202a on the right side in the figure. Accordingly, second casing 2 is gradually displaced with respect to first casing 1 (FIG. 38(b)). Second casing 2 is brought into the open, horizontally long state (FIG. 38(c)) by rotating second casing 2 by 90° counterclockwise in the figure with respect to first casing 1. Accordingly, second casing 2 comes to have left-right symmetry with respect to the center line of first casing 1, and mobile information terminal 10 is brought into the open state with the contour in the shape of a letter "T."

Because of such a configuration adapted to double swing, both a right-hand-dominant operator and a left-hand-dominant operator easily perform the opening/closing operation in a like manner.

The configuration adapted to double swing is not limited to the configuration of the combination of a pin and a cam hole shown in FIG. 36-FIG. 38 and may be a configuration having two rotation shafts joined like a seesaw.

Referring to FIG. 39 and FIG. 40, two rotation shafts 3 are joined like a seesaw by a joint member 403a. One rotation shaft 3 is located above and the other rotation shaft 3 is located below. Rotation shaft 3 located above protrudes from a hole 31a provided on the front surface of joint member 31 to be engaged with second casing 2. On the other hand, rotation shaft 3 located below does not protrude from hole 31a provided on the front surface of joint member 31 but is stored in joint member 31. Each rotation shaft 3 is positioned, for example, at any of points P1-P3 in FIG. 1.

In the case where second casing 2 is slidably rotated in one direction with respect to joint member 31 and first casing 1, the rotational direction is sensed so that one rotation shaft 3 suitable for that rotational direction protrudes from hole 31a to be engaged with the second casing. Then, second casing 2 slidably rotates around that rotation shaft 3 which is engaged therewith. In the case where second casing 2 is slidably rotated in the reverse direction to the foregoing one, the other rotation shaft 3 protrudes from hole 31a to be engaged with the second casing 2 so that second casing 2 slidably rotates around that rotation shaft 3 which is engaged therewith.

A configuration adapted to double swing can also be realized based on such a principle.

<Configuration Concerning Two-point Support of First Casing and Second Casing>

In the configuration shown in FIG. 5-FIG. 25, joint member 31 and second casing 2 are supported on one point of rotation shaft 3. Therefore, the support strength is preferably increased by supporting first casing 1 and second casing 2 on each other on another point. In the following, a configuration of supporting first casing 1 and second casing 2 on two points will be described.

Figure 41:
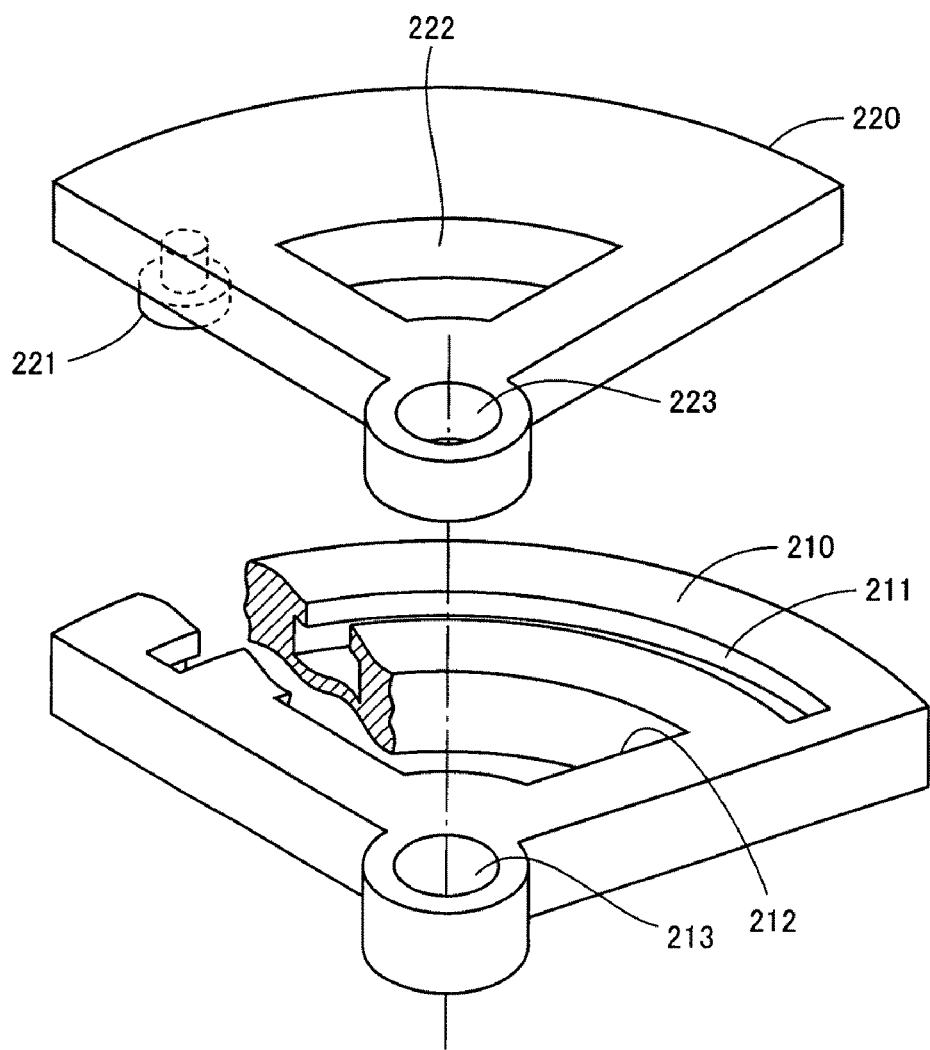
FIG. 41 is a partially broken perspective view schematically showing a configuration of a member for supporting the first casing and the second casing on two points.

Referring to FIG. 41, a member for supporting on two points is comprised of two members 210 and 220 each having the shape of a sector. An arc-shaped rail groove 211 is provided to a surface of one sector-shaped member 210, and a pin 221 is provided on a surface of the other sector-shaped member 220. This pin 221 is fitted in rail groove 211 in such a manner that it can slide along rail groove 211. A tip end of pin 221 is formed of a flange portion with an expanded diameter so that pin 221 does not drop off from rail groove 211. Both of sector-shaped members 210 and 220 have an angle of 90° or greater so that second casing 2 can rotate 90° or greater with respect to joint member 31. In this example, sector-shaped member 220 is formed to have a spreading angle of about 90°, and sector-shaped member 210 is formed to have a spreading angle greater than that of member 220.

Furthermore, both of sector-shaped members 210 and 220 are provided with holes 212, 222 to allow wire bundles to pass through for electrically connecting respective electric devices of first casing 1 and second casing 2. Both of sector-shaped members 210 and 220 are provided with circular holes 213, 223 to allow the rotation shaft portion of rotation shaft 3 to pass through.

Figure 42:
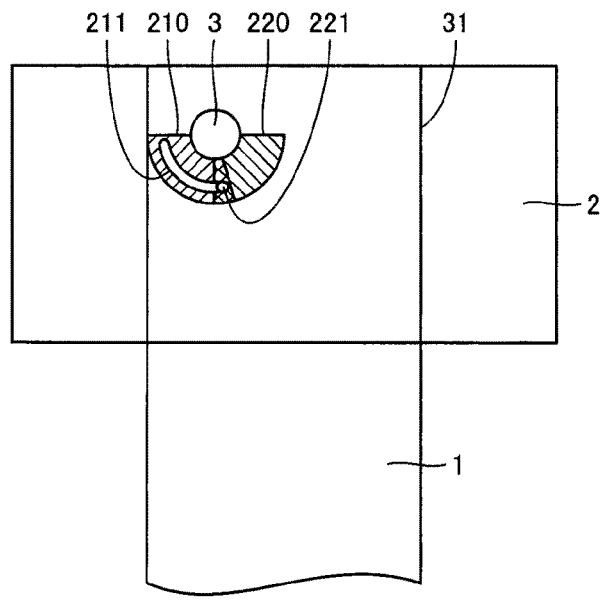
FIG. 42 is a front view showing the horizontally long state with two-point support.

Referring to FIG. 42, this sector-shaped member 210 (the hatching portion towards the upper right) is attached, for example, to second casing 2, and sector-shaped member 220 (the hatching portion towards the upper left) is attached, for example, to joint member 31.

Figure 43:
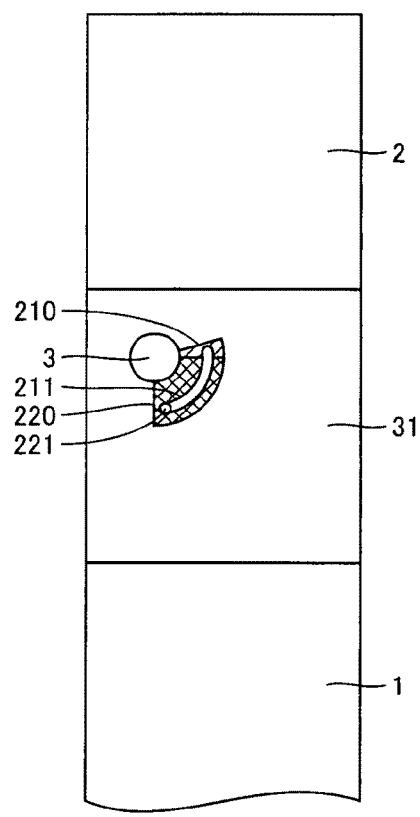
FIG. 43 is a front view showing the vertically long state with two-point support.

Accordingly, as shown in FIG. 42 and FIG. 43, while rotation of 90° with respect to first casing 1 and joint member 31 is permitted between the horizontally long state (FIG. 42) and the vertically long state (FIG. 43), second casing 2 can be supported on two points with respect to joint member 31, thereby increasing support strength.

Here, without provision of a sector-shaped member, rail groove 211 may be provided directly to either the front surface of first casing 1 or the back surface of second casing 2 and pin 221 may be provided directly to the other.

<Others>

Figure 44:
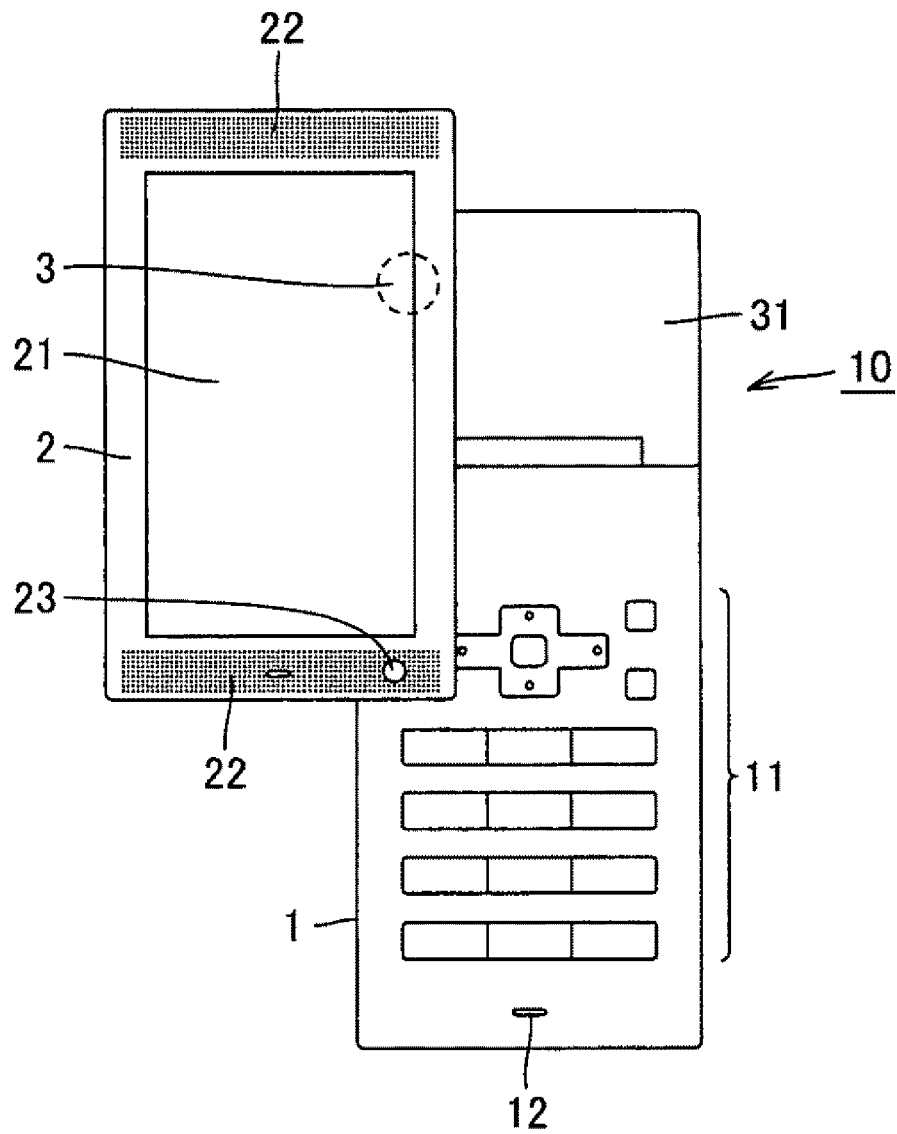
FIG. 44 is a front view illustrating that the second casing can be rotated by 360° with respect to the first casing.
Figure 45:
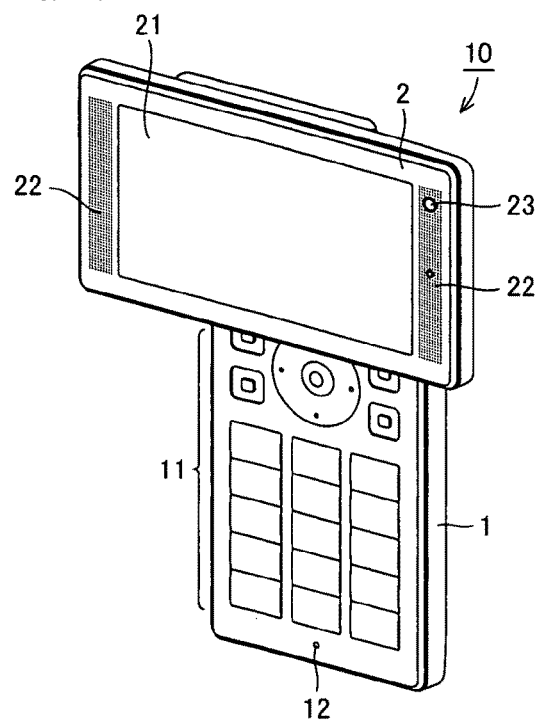
FIG. 45 is a perspective view showing a configuration of a specific example of a mobile information terminal in a second embodiment of the present invention in the open, horizontally long state.
Figure 46:
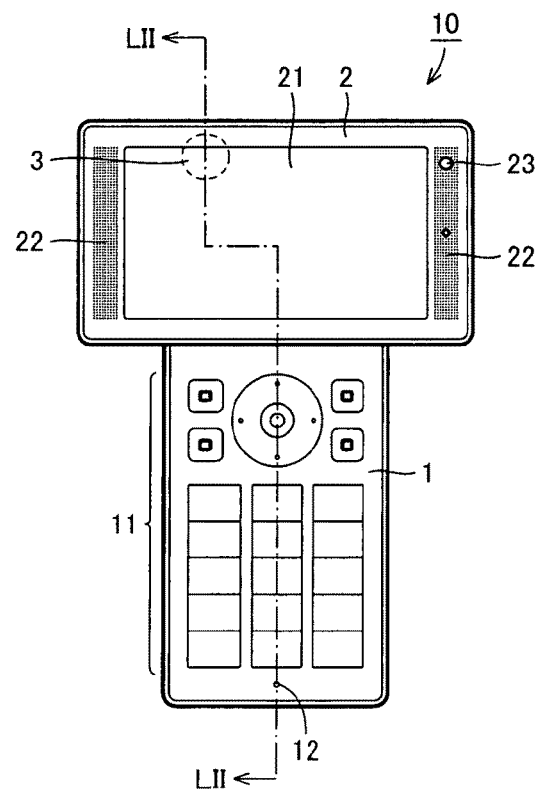
FIG. 46 is a front view showing a configuration of a specific example of the mobile information terminal in the second embodiment of the present invention in the open, horizontally long state.

It is noted that second casing 2 may be configured to rotate 360° with respect to first casing 1 and joint member 31, and in this case, for example, a state of the display portion as shown in FIG. 44 is possible.

Second Embodiment

Referring to FIG. 45-FIG. 62, a configuration in this embodiment differs from the configuration of the first embodiment in that (1) it is configured such that the front surface (that surface on which operation portion 11 is provided) of first casing 1 and the front surface (that surface on which display portion 21 is provided) of second casing 2 are parallel to each other in the open state (both in the horizontally long state and in the vertically long state), (2) joint member 32 protrudes vertically from the front surface of first casing 1, (3) the back surface of second casing 2 and the upper end surface of joint member 32 form substantially the same plane in the closed state, and (4) a flash lamp 15 and an infrared light emitting portion 17 for infrared-type active autofocus are provided beside a camera on the back surface of first casing 1.

Figure 48:
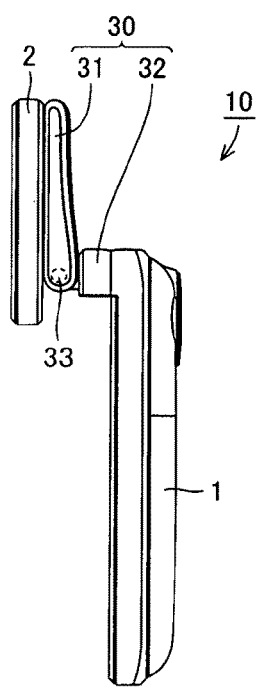
FIG. 48 is a right side view showing a configuration of a specific example of the mobile information terminal in the second embodiment of the present invention in the open, horizontally long state.
Figure 49:
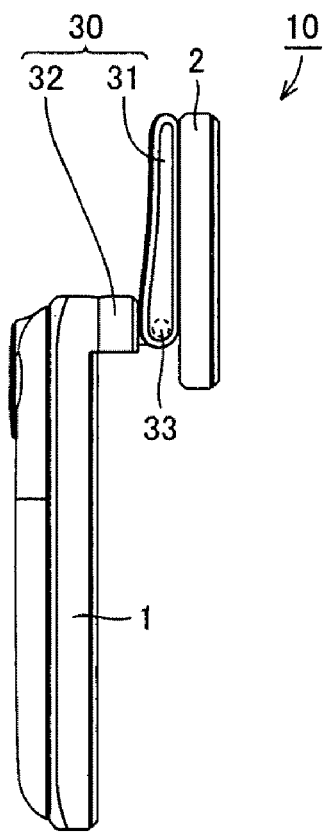
FIG. 49 is a left side view showing a configuration of a specific example of the mobile information terminal in the second embodiment of the present invention in the open, horizontally long state.
Figure 50:
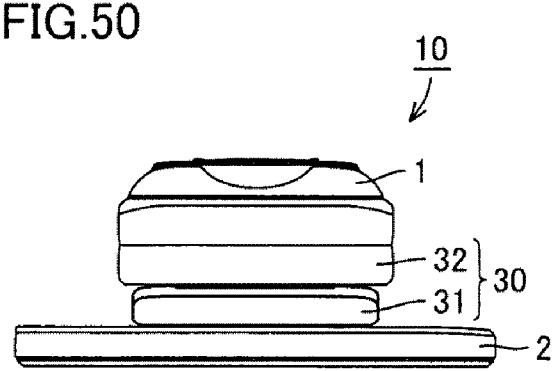
FIG. 50 is a plan view showing a configuration of a specific example of the mobile information terminal in the second embodiment of the present invention in the open, horizontally long state.
Figure 51:
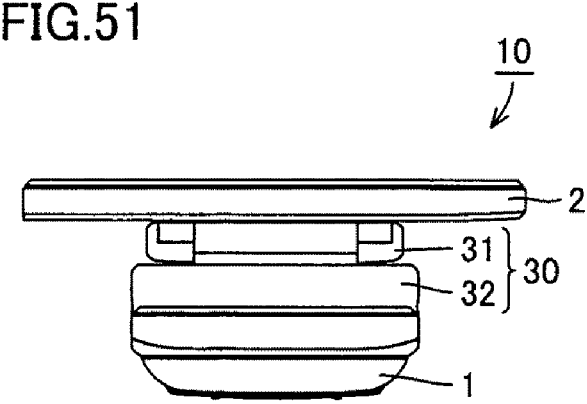
FIG. 51 is a bottom view showing a configuration of a specific example of the mobile information terminal in the second embodiment of the present invention in the open, horizontally long state.
Figure 52:
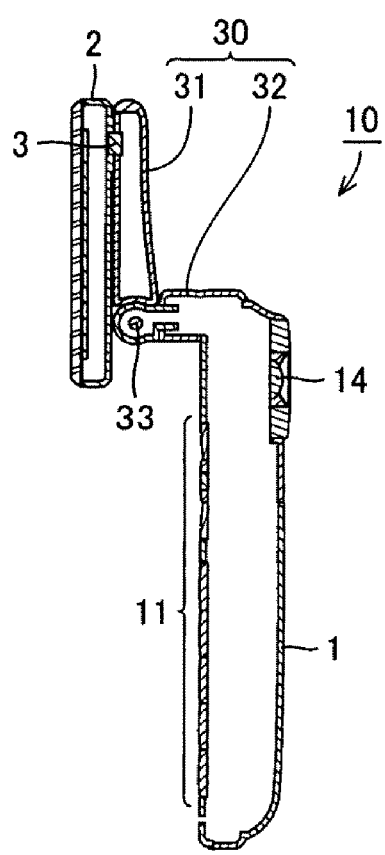
FIG. 52 is a schematic cross sectional view along line LII-LII in FIG. 46.

As for the above-noted (1), mainly referring to FIG. 48 and FIG. 49, in the open state, the front surface of first casing 1 and the front surface of second casing 2 are parallel to each other, so that the operator can view display portion 21 more easily.

Figure 53:
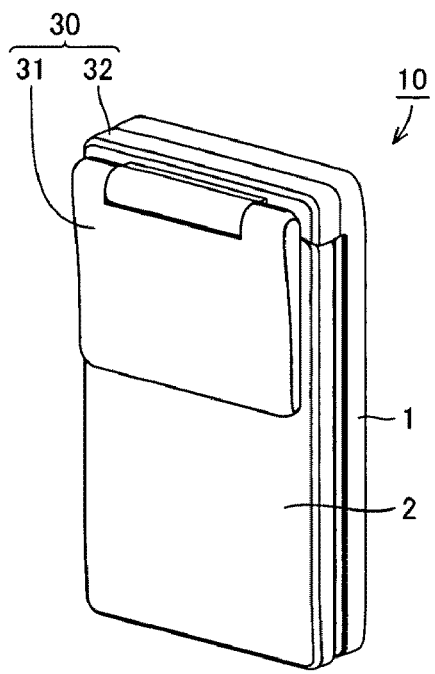
FIG. 53 is a perspective view showing a closed state of the mobile information terminal in the second embodiment of the present invention.
Figure 54:
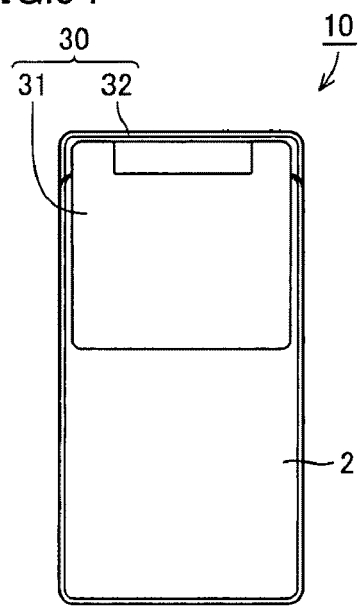
FIG. 54 is a front view showing the closed state of the mobile information terminal in the second embodiment of the present invention.
Figure 55:
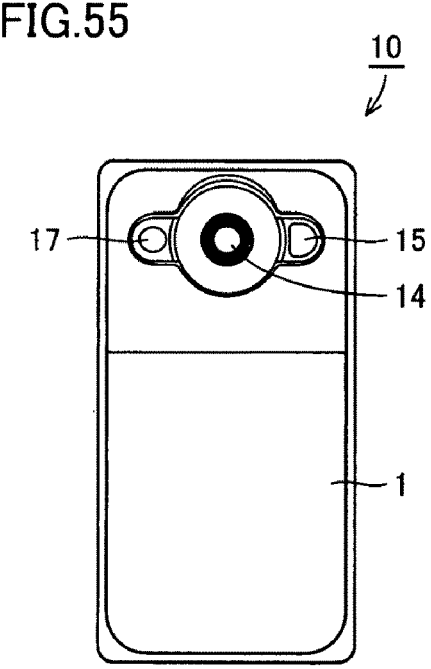
FIG. 55 is a rear view showing the closed state of the mobile information terminal in the second embodiment of the present invention.
Figure 56:
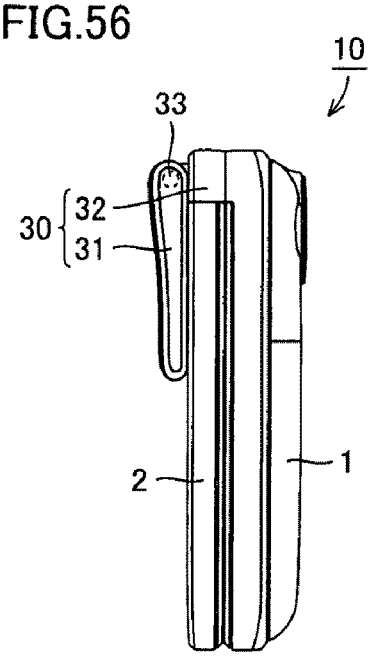
FIG. 56 is a right side view showing the closed state of the mobile information terminal in the second embodiment of the present invention.
Figure 57:
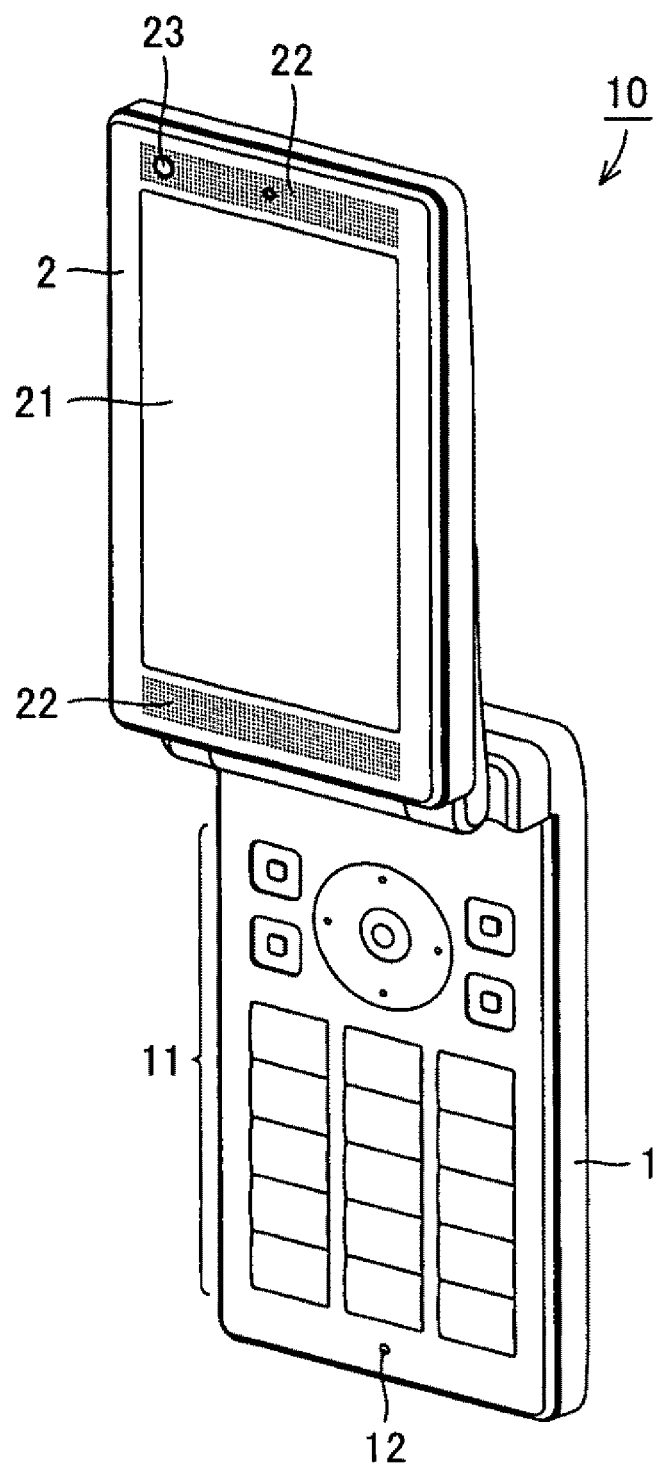
FIG. 57 is a perspective view showing that a second casing of the mobile information terminal in the second embodiment of the present invention is in the open, vertically long state.
Figure 58:
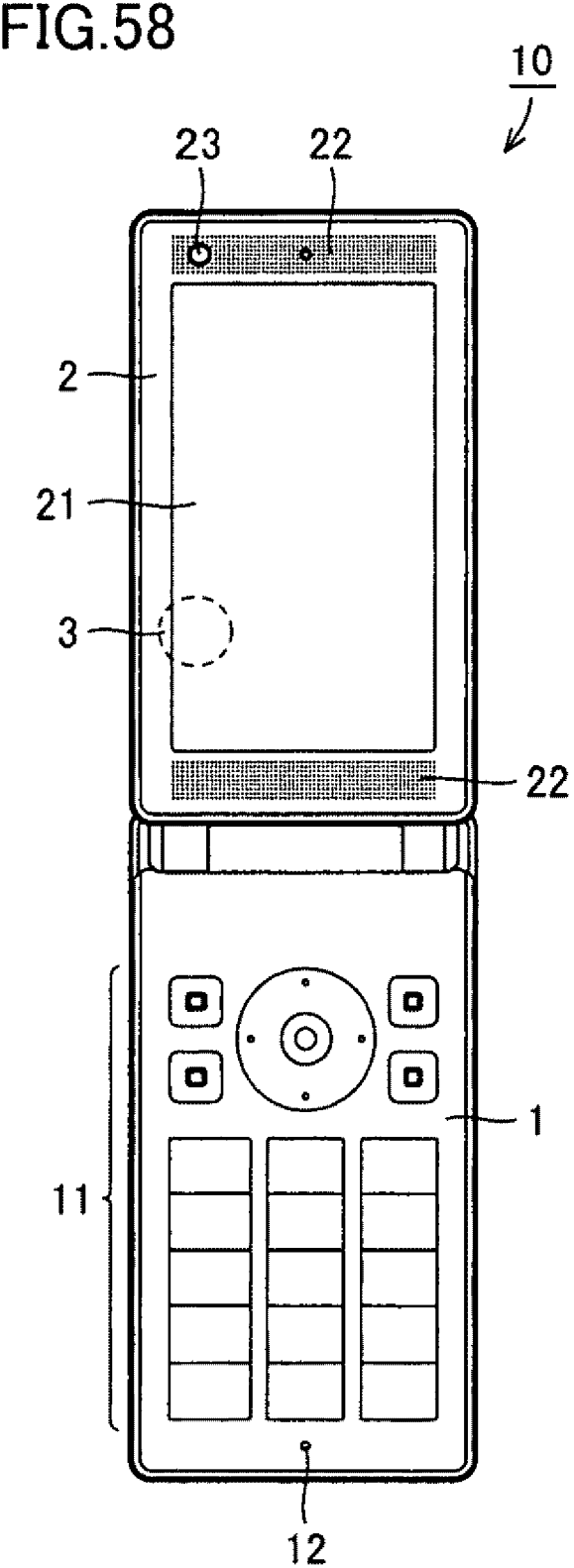
FIG. 58 is a front view showing that the second casing of the mobile information terminal in the second embodiment of the present invention is in the open, vertically long state.
Figure 59:
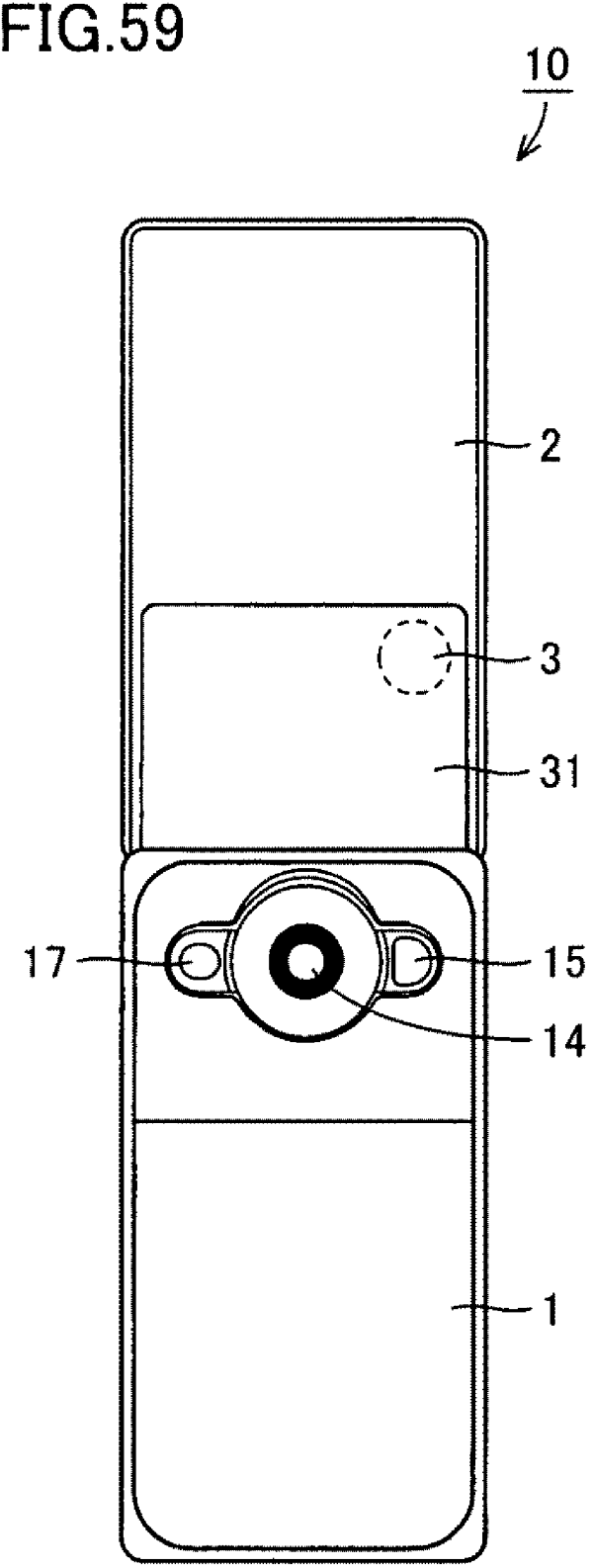
FIG. 59 is a rear view showing that the second casing of the mobile information terminal in the second embodiment of the present invention is in the open, vertically long state.
Figure 60:
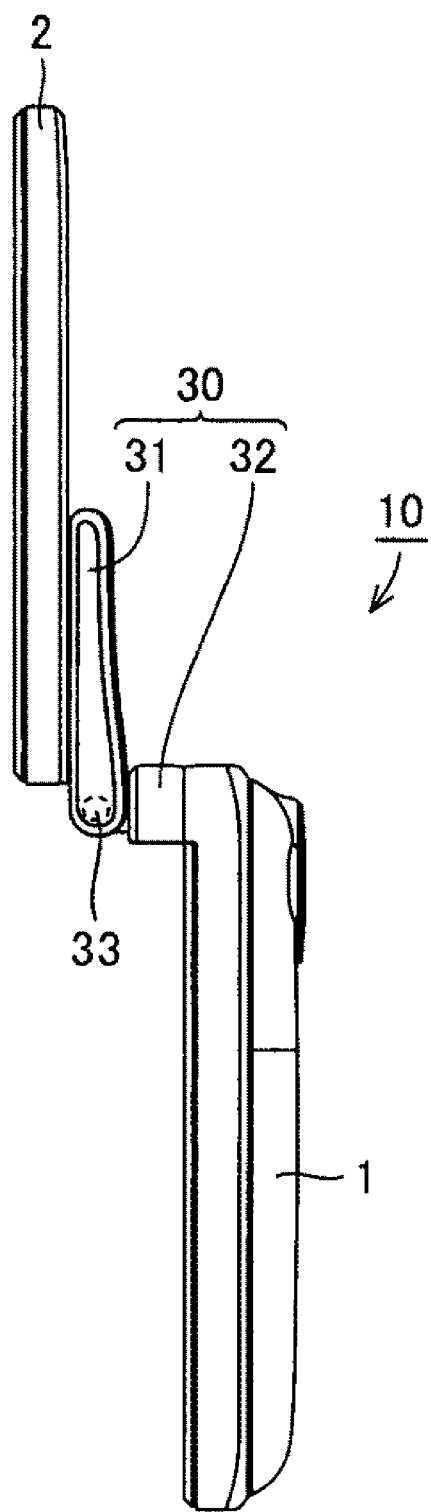
FIG. 60 is a right side view showing that the second casing of the mobile information terminal in the second embodiment of the present invention is in the open, vertically long state.
Figure 61:
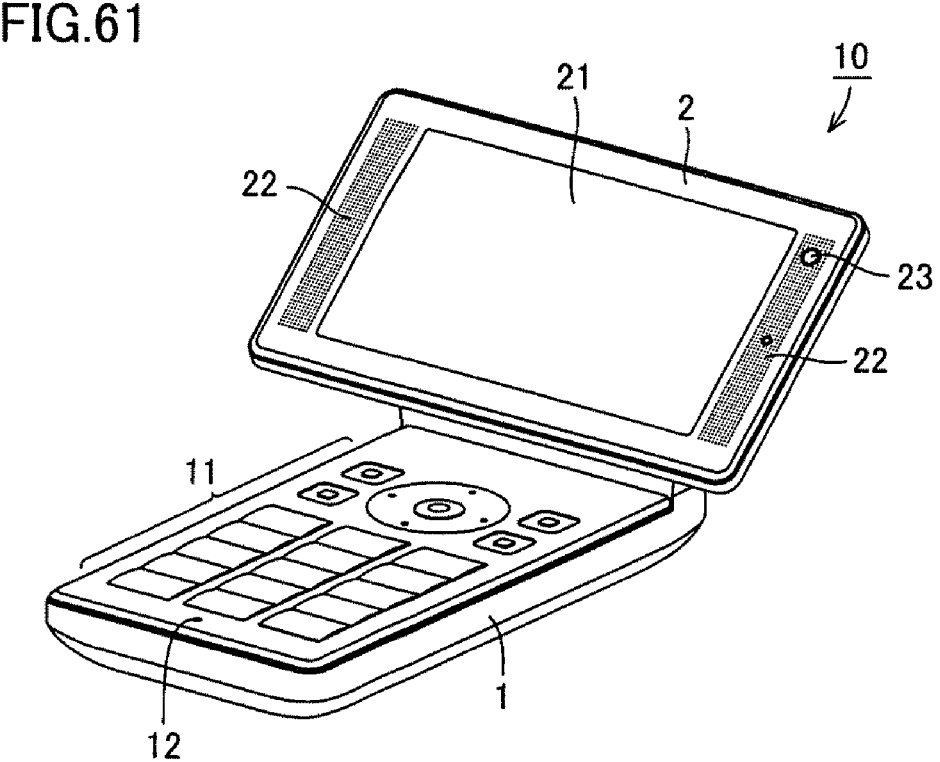
FIG. 61 is a perspective view showing that the mobile information terminal in the second embodiment of the present invention is placed on a table or the like in the open, horizontally long state.
Figure 62:
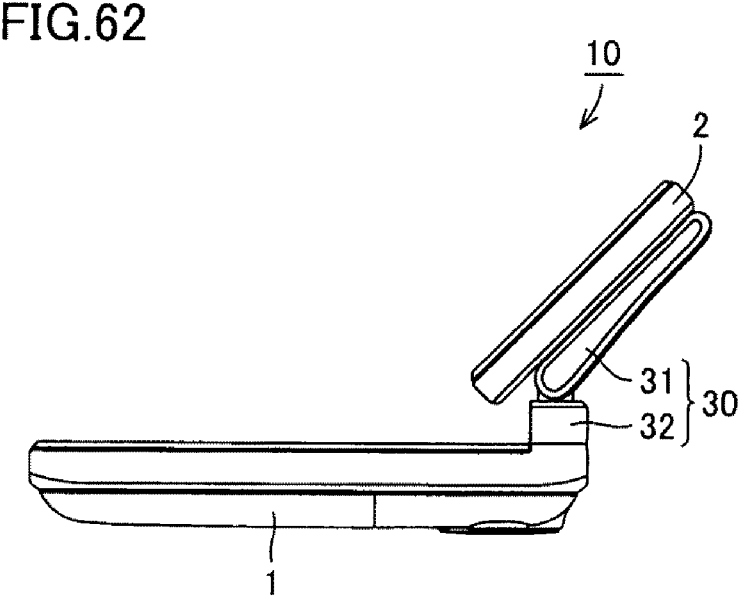
FIG. 62 is a right side view showing that the mobile information terminal in the second embodiment of the present invention is placed on a table or the like in the open, horizontally long state.

As for the above-noted (2) and (3), mainly referring to FIG. 53 and FIG. 56, joint member 32 protrudes vertically from the front surface of first casing 1, and the back surface of second casing 2 and the upper end surface of joint member 32 form substantially the same plane in the closed state, so that as shown in FIG. 54, joint member 31 looks as if it was arranged like an island on the back surface of second casing 2 and the upper end surface of joint member 32 and therefore, visually, the entire thickness of mobile information terminal 10 appears thin.

Figure 47:
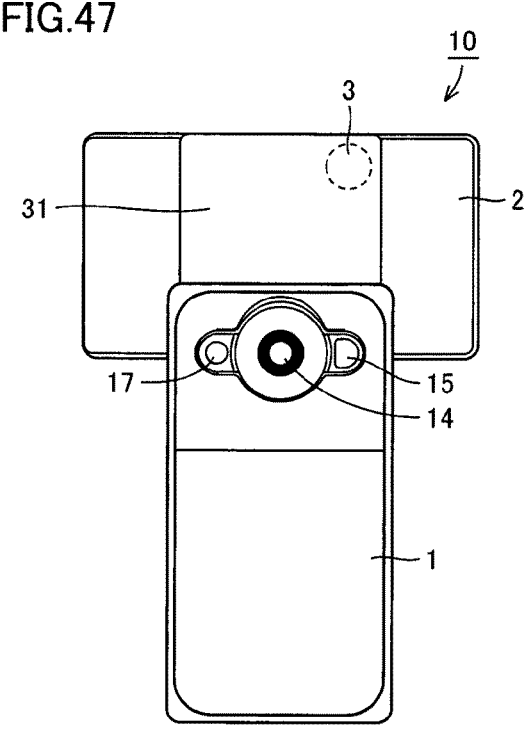
FIG. 47 is a rear view showing a configuration of a specific example of the mobile information terminal in the second embodiment of the present invention in the open, horizontally long state.

As for the above-noted (4), mainly referring to FIG. 47, since flash lamp 15 and infrared light emitting portion 17 are provided, a subject can be illuminated even in a dark place to allow for image capturing, and in addition, a subject can be brought into focus for image capturing.

Here, the active mode refers to a mode in which a distance from a subject is obtained using reflection of infrared radiation emitted from a camera (mobile information terminal 10), and advantageously, the focus can be adjusted even in a dark place without the help of outside light.

Here, the other configuration is substantially identical to the configuration of the first embodiment. Therefore, the same components will be denoted with the same reference characters and a description thereof will not be repeated. The opening/closing operation is also substantially identical to the first embodiment and therefore a description thereof will not be repeated.

Now, the usage of the mobile information terminal in the present embodiment will be described.

Figure 63:
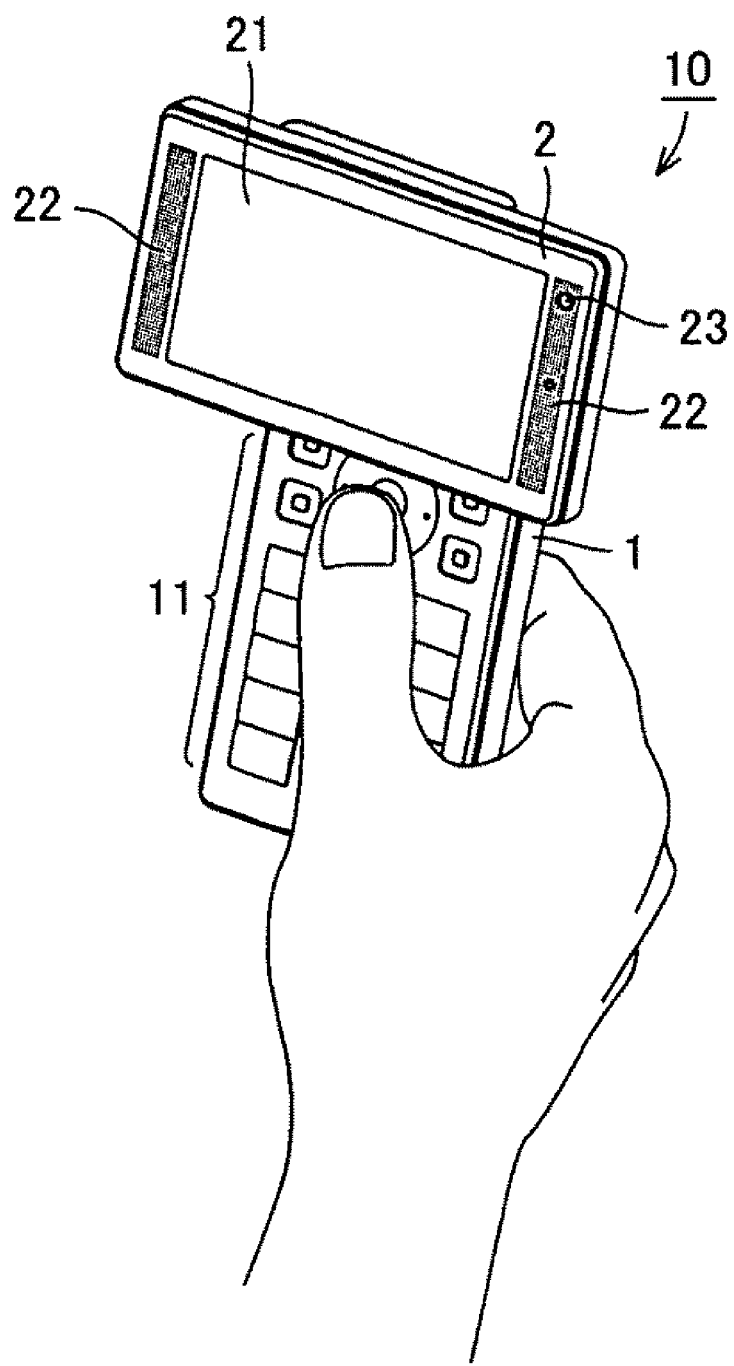
FIG. 63 is a perspective view illustrating a usage manner of the mobile information terminal in the second embodiment of the present invention in the open, horizontally long state.

In the open, horizontally long state shown in FIG. 63, the operator can see display portion 21 in the horizontally long display with first casing 1 grasped in hand. Therefore, with the mobile information terminal held in hand, the operator can watch television (terrestrial digital broadcast, terrestrial analog broadcast, digital radio broadcast with image, and the like) on display portion 21. In addition, in the open, horizontally long state, display portion 21 has left-right symmetry with respect to the center line of first casing 1, thereby achieving comfortable television viewing. Therefore, the operator can watch television comfortably even under the circumstances in which the mobile information terminal cannot be laid as in a train on the move or the like.

Furthermore, each key on operation portion 11 can be operated by thumb for mail or calling operations and the like with first casing 1 grasped.

Figure 64:
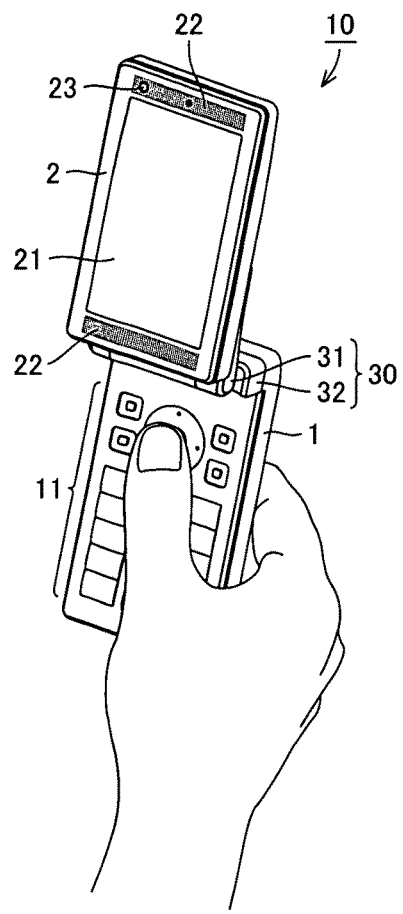
FIG. 64 is a perspective view illustrating a usage manner of the mobile information terminal in the second embodiment of the present invention in the open, vertically long state.

In the open, vertically long state shown in FIG. 64, the operator can perform mail or calling operations and the like, for example, while viewing display portion 21 with first casing 1 grasped in hand. Here, a variety of operations are performed by operating operation portion 24.

In either state in FIG. 63 and FIG. 64, an image of a subject can be taken by pointing camera 14 provided on the back surface of first casing 1 to the subject and seeing the subject and the shot composition on display portion 21 (namely, using display portion 21 as a finder). In addition, the operator can use camera 23 provided on the front surface of second casing 2 to take an image of himself as a subject while seeing the subject and the shot composition on display portion 21. Moreover, a videophone is also realized by camera 23 in which the operator talks to the party on the other end while taking an image of himself.

Figure 65:
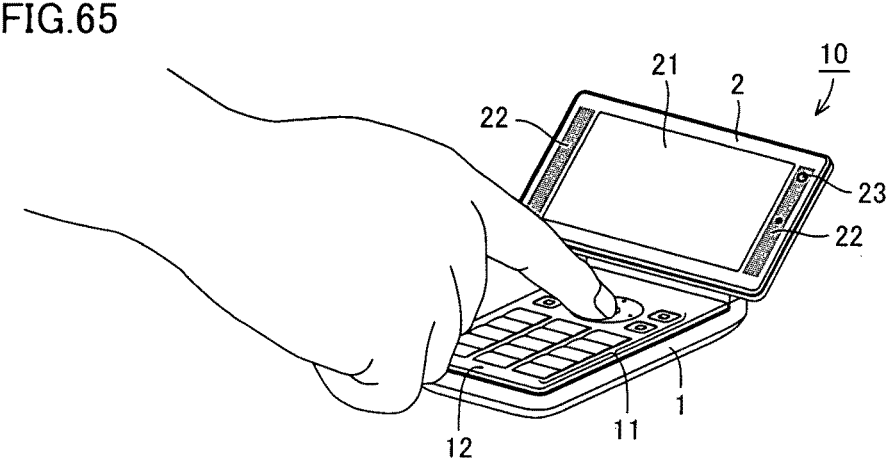
FIG. 65 is a perspective view illustrating a usage manner of the mobile information terminal in the second embodiment of the present invention placed on a table or the like in the open, horizontally long state.

In the state where mobile information terminal 10 is placed on a table or the like in the open, horizontally long state shown in FIG. 65, the operator can watch television on display portion 21 without holding mobile information terminal 10 in hand. In addition, in the open, horizontally long state, display portion 21 has left-right symmetry with respect to the center line of first casing 1, thereby achieving comfortable television viewing. Moreover, the angle of inclination of second casing 2 with respect to first casing 1 can be adjusted by rotation shaft 33, so that the angle of display portion 21 can be adjusted for the operator to see easily. Therefore, the operator can watch television comfortably even under the circumstances in which mobile information terminal 10 is placed on a table or the like in a room.

In the state in FIG. 63 and FIG. 65, usability can be further improved by automatically setting (switching) to a mode of giving top priority to television viewing.

In the closed state shown in FIGS. 53-56, display portion 21 and operation portion 11 are not exposed outside. This eliminates the likelihood of damaging display portion 21 and prevents an operating error of operation portion 11, and thus this state is convenient for carrying mobile information terminal 10.

In accordance with the present embodiment, the similar effect as in the first embodiment can be achieved.

Here, (a) arrangement of a diversity antenna, (b) arrangement of a sub-display portion, (c) configuration adapted to double-swing, (d) configuration concerning two-point support of the first casing and the second casing, and (e) 360° rotation of second casing 2 as illustrated in the first embodiment are also applicable to the present embodiment similarly.

<Switching of Portrait/Landscape Angle>

In the first and second embodiments, in each case of still-image capturing and videophone function, switching of portrait/landscape angle can be made as follows.

Figure 66:
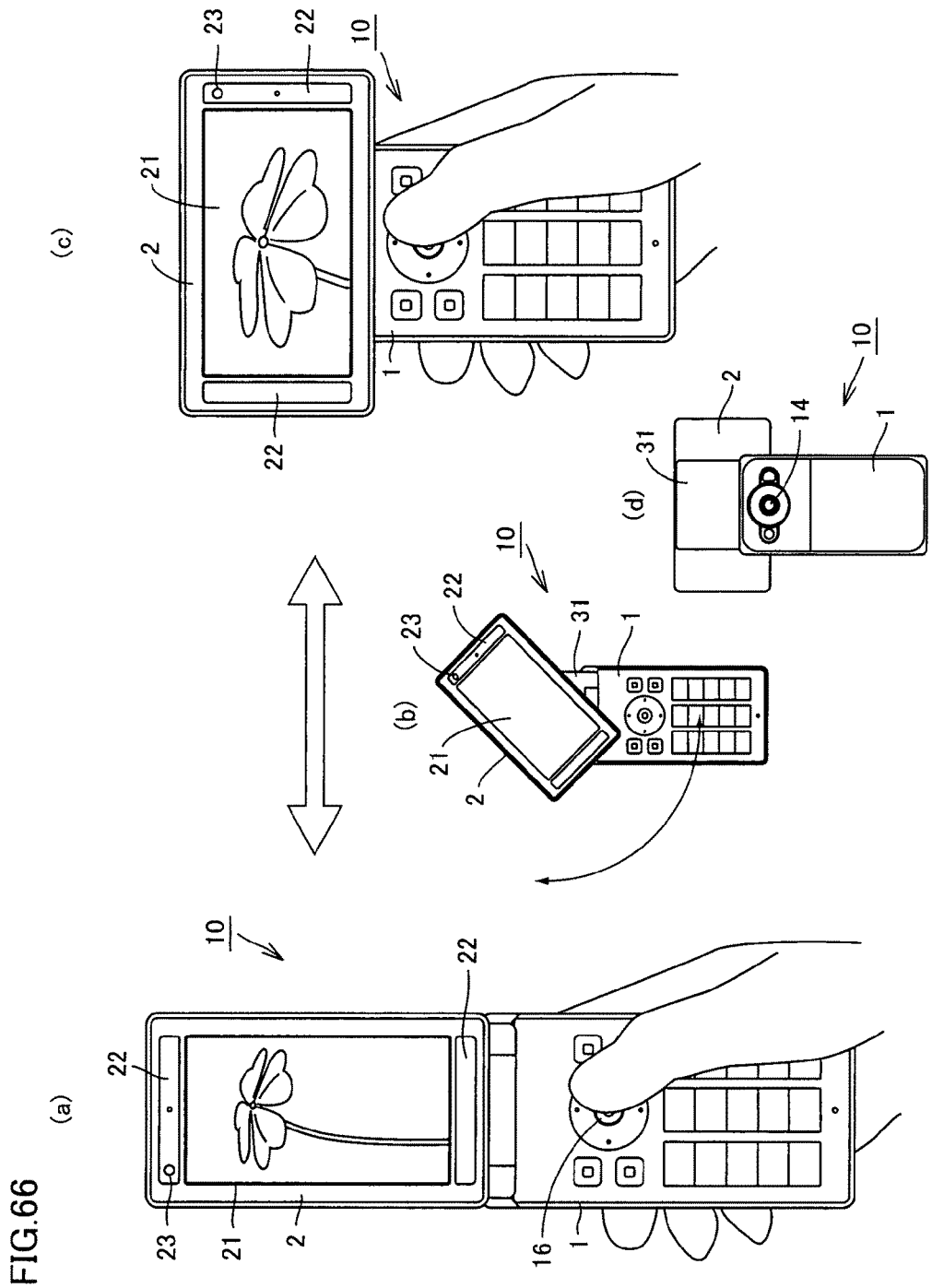
FIG. 66 is a diagram illustrating switching of portrait/landscape angle in still image capturing.

FIG. 66 is an illustration of switching of portrait/landscape angle in still-image capturing. Referring to FIG. 66, in the case where an image in the portrait composition is taken, as shown in FIG. 66(a), a shutter button is pressed for image capturing, with mobile information terminal 10 set in the open, vertically long state. On the other hand, in the case where an image in the landscape composition is taken, second casing 2 is slidably rotated as shown in FIG. 66(b) from the state in FIG. 66(a), and the shutter button is pressed for image capturing, with mobile information terminal 10 set in the open, horizontally long state as shown in FIG. 66(c).

In this manner, in mobile information terminal 10 in the first and second embodiments, during still-image capturing, switching of portrait/landscape angle of display portion 21 can be made easily with one hand, without shifting mobile information terminal 10 from one hand to the other. In connection with this angle switching, the angle of camera 14 shown in FIG. 66(d) or camera 23 shown in FIGS. 66(a) and (c) is also switched.

Figure 67:
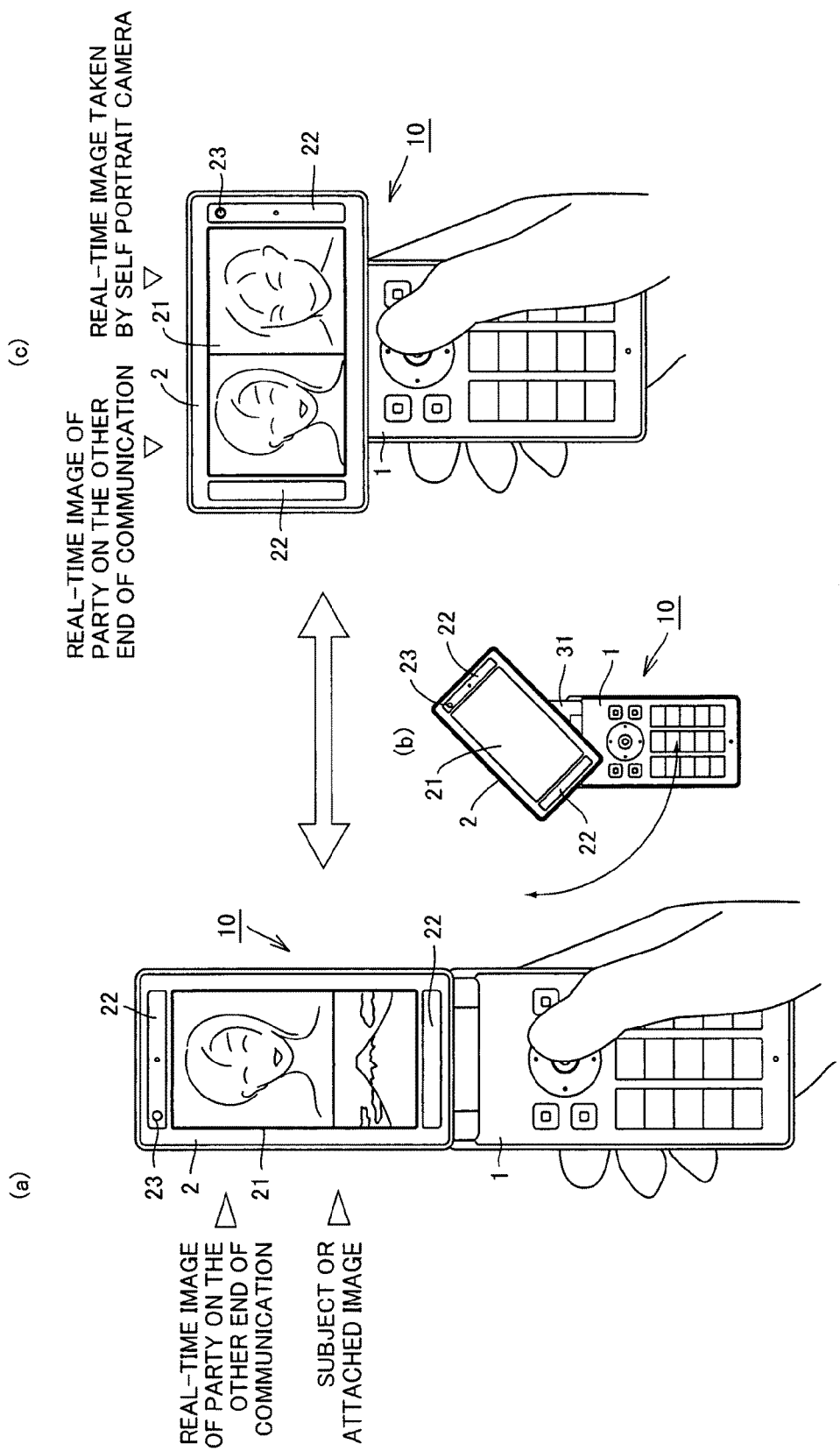
FIG. 67 is an illustration of switching of portrait/landscape angle in a videophone function.

FIG. 67 is an illustration of switching of portrait/landscape angle in a videophone function. Referring to FIG. 67, in the case where a subject or an attached image in the portrait composition and an image of the other party in the portrait composition are simultaneously displayed during videophone, they are displayed in the vertically long display on display portion 21 as shown in FIG. 67(a). From this state, according to the flow of conversation, the angle of display portion 21 can be switched easily with one hand without shifting from one hand to the other, as shown in FIG. 67(b). In connection with this angle switching, the arrangement of a split screen on display portion 21 is changed. As shown in FIG. 67(c), two screen displays in the portrait composition can be arranged side by side. In this case, for example, two images, namely an image of the other party and a self-portrait image, can be arranged.

<Speaker Switching According to Switching between Vertically Long State and Horizontally Long State of Second Casing>

Figure 68:
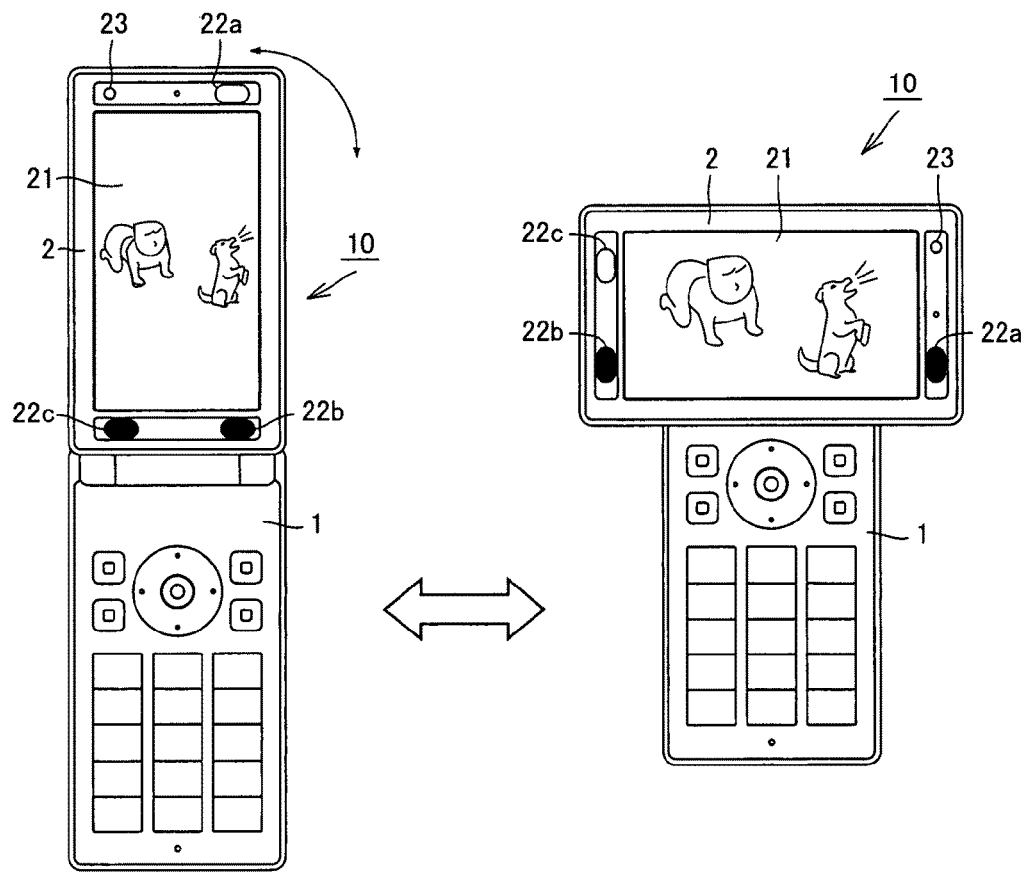
FIG. 68 is an illustration of speaker switching in a case of three speakers.
Figure 69:
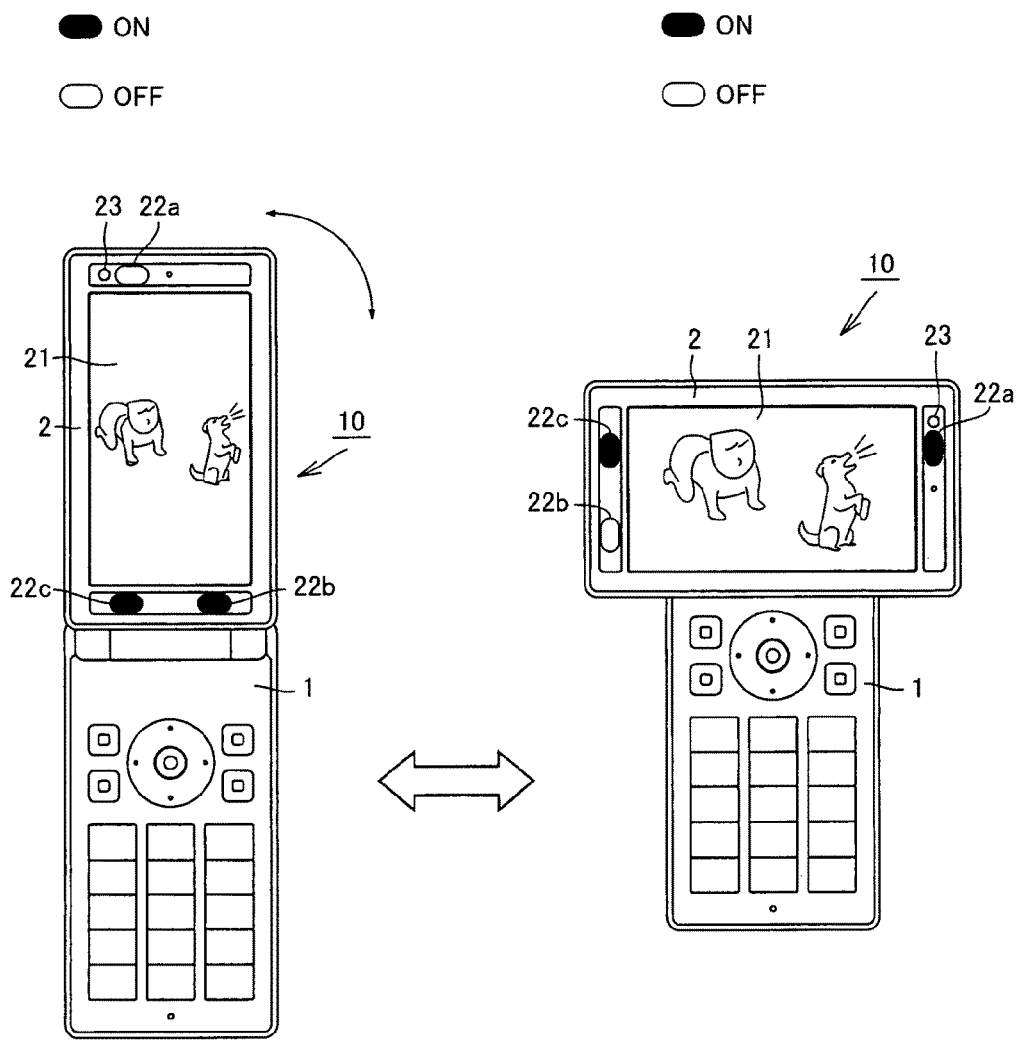
FIG. 69 is another illustration of speaker switching in a case of three speakers.

Although in the first and second embodiments, speakers 22 are arranged on opposite sides in the longer side direction of display portion 21, three speakers 22a-22c may be arranged in total where one speaker 22a is arranged on one side in the longitudinal direction of display portion 21 and two speakers 22b, 22c are arranged on the other side, for example, as shown in FIG. 68 and FIG. 69. As shown in FIG. 68(a), when second casing 2 is in the vertically long state, sound is output from both speaker 22b and speaker 22c. Accordingly, sound can be output from both of the left side and the right side of display portion 21. On the other hand, when second casing 2 is in the horizontally long state as shown in FIG. 68(c) and speaker 22a is arranged on the relatively lower side of second casing 2, sound is output from both of speaker 22a and speaker 22b arranged on the relatively lower side of second casing 2. Accordingly, sound can be output from both of the left side and the right side of display portion 21 and in addition, sound can be output from speakers 22a, 22b located at the same height on the left side and the right side.

Moreover, in the case where stereophonic sound is output, in the state shown in FIG. 68(a), speaker 22b outputs right-side sound and speaker 22c outputs left-side sound, and in the state shown in FIG. 68(b), speaker 22a outputs right-side sound and speaker 22b outputs left-side sound. Therefore, output sounds of all of the speakers have to be switched according to switching between the vertically long state and the horizontally long state.

As shown in FIG. 69(a), when second casing 2 is in the vertically long state, sound is output from both of speaker 22b and speaker 22c. Accordingly, sound can be output from both the left side and the right side of display portion 21. As shown in FIG. 69(b), when second casing 2 is in the horizontally long state and speaker 22a is arranged on the relatively upper side of second casing 2, sound is output from both speaker 22a and speaker 22c arranged on the relatively upper side of second casing 2. Accordingly, sound can be output from both the left side and the right side of display portion 21 and in addition, sound can be output from speakers 22a, 22c located at the same height on the left side and the right side.

In the case where stereophonic sound is output, in the state shown in FIG. 69(a), speaker 22b outputs right-side sound and speaker 22c outputs left-side sound, and in the state shown in FIG. 69(b), speaker 22a outputs right-side sound and speaker 22c outputs left-side sound. Therefore, even when switching is done between the vertically long state and the horizontally long state, the output sound of speaker 22c remains left-side sound and does not have to be switched.

Figure 70:
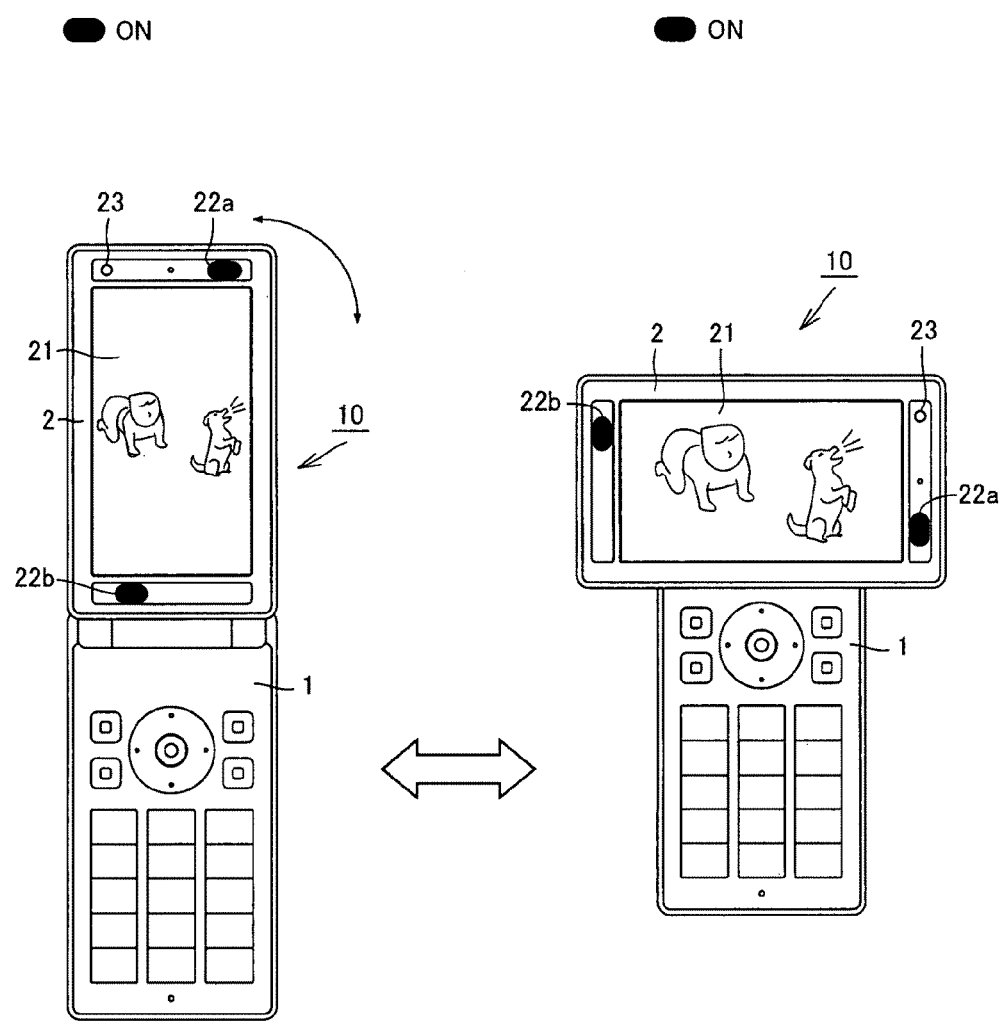
FIG. 70 is an illustration of speaker switching in a case of two speakers.

Furthermore, as shown in FIG. 70, two speakers 22a, 22b may be arranged in total, where one speaker 22a is arranged on one side in the longitudinal direction of display portion 21 and one speaker 22b is arranged on the other side. In this case, as shown in FIG. 70(a), in the vertically long state of second casing 2, speaker 22a and speaker 22b are arranged on the right side and the left side, respectively, of display portion 21. Accordingly, when second casing 2 is in the vertically long state, sound can be output from both of the left side and the right side of display portion 21. Moreover, the arrangement of two speakers 22a, 22b in this manner allows sound to be output from both of the left side and the right side of display portion 21 even in the case where second casing 2 is brought into the horizontally long state as shown in FIG. 70(b).

In the case where stereophonic sound is output, in the state shown in FIG. 70(a), speaker 22a outputs right-side sound and speaker 22b outputs left-side sound, and in the state shown in FIG. 70(b), speaker 22a outputs right-side sound and speaker 22b outputs left-side sound. Therefore, even when switching is done between the vertically long state and the horizontally long state, the output sounds of the speakers do not have to be switched.

Figure 71:
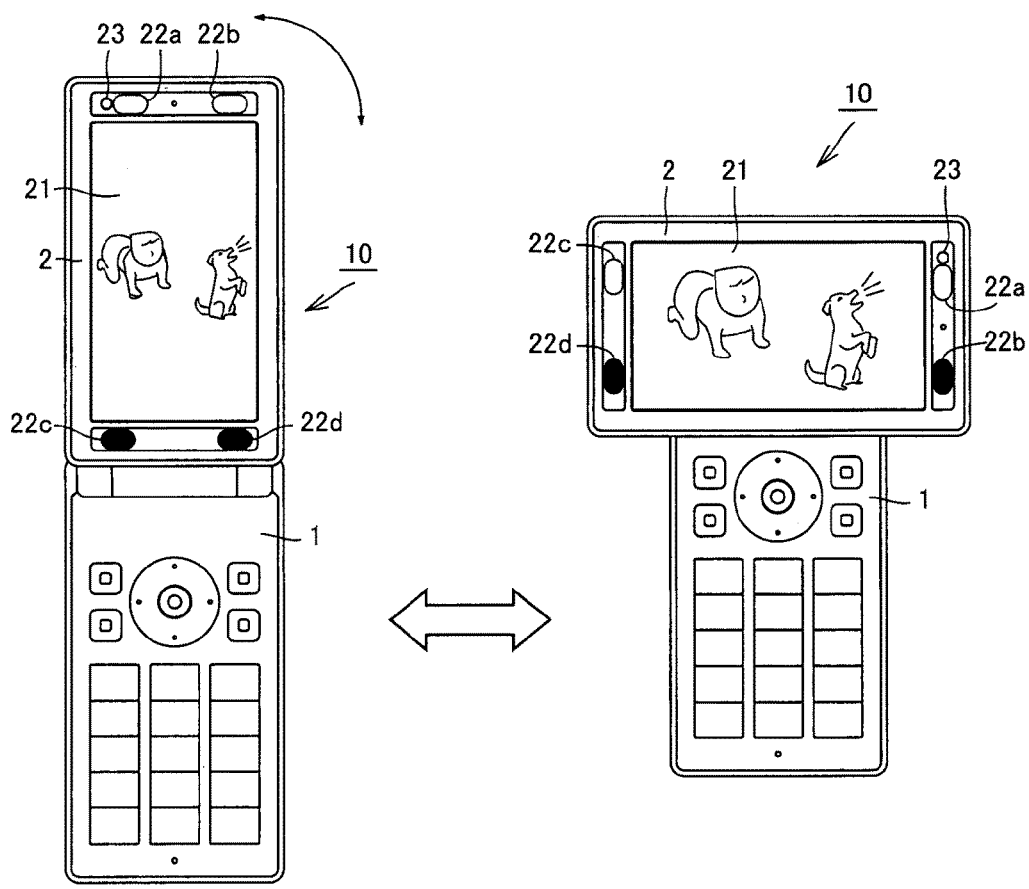
FIG. 71 is an illustration of speaker switching in a case of four speakers.

Furthermore, as shown in FIG. 71, four speakers 22a-22d may be arranged in total, where two speakers 22a, 22b are arranged on one side in the longitudinal direction of display portion 21 and two speakers 22c, 22d are arranged on the other side. As shown in FIG. 71(a), when second casing 2 is in the vertically long state, sound can be output from both of speaker 22c and speaker 22d. Accordingly, sound can be output from both of the left side and the right side of display portion 21 and in addition, sound can be output from speakers 22c, 22d located at the same height on the left side and the right side. On the other hand, as shown in FIG. 71(b), when second casing 2 is in the horizontally long state, sound can be output from both of speaker 22b and speaker 22d. Accordingly, sound can be output from both of the left side and the right side of display portion 21 and in addition, sound can be output from speakers 22b, 22d located at the same height on the left side and the right side.

In the case where stereophonic sound is output, in the state shown in FIG. 71(a), speaker 22d outputs right-side sound and speaker 22c outputs left-side sound, and in the state shown in FIG. 71(b), speaker 22b outputs right-side sound and speaker 22d outputs left-side sound. Therefore, the output sounds of all of the speakers have to be switched according to switching between the vertically long state and the horizontally long state.

<Speaker Switching at Incoming Call during AV Contents Reproduction>

In the first and second embodiments, when an incoming call arrives during AV (Audio Visual) contents reproduction, the following three manners are assumed: (A) the volume of AV sound is unchanged; (B) the volume of AV sound is lowered; and (C) the volume of AV sound is turned off.

In order to let the viewer of AV contents know that he receives an incoming call, the following three manners are assumed: (i) an incoming call window is displayed on the screen of display portion 21; (ii) an incoming call ringtone is played; and (iii) an incoming call ringtone is played while an incoming call window is displayed on the screen of display portion 21.

As for the switching timing at which (B) the volume of AV sound is lowered or (C) the volume of AV sound is turned off as described above, the following two manners are assumed: (1) switching is done when a sensor senses that the viewer brings mobile information terminal 10 closer to the ear; and (2) switching is forcedly done at the point in time when an incoming call arrives.

Then, these may be combined arbitrarily. Specifically, the following 21 combinations can be made: (A)-(i), (A)-(ii), (A)-(iii), (B)-(i), (B)-(ii), (B)-(iii), (C)-(i), (2), (C)-(i)-(1), (C)-(i)-(2), (C)-(ii)-(1), (C)-(ii)-(2), (C)-(iii)-(1), (C)-(iii)-(2).

Third Embodiment

Referring to FIG. 72-FIG. 79, mobile information terminal 10 in the present embodiment has first casing 1, second casing 2 and a joint mechanism.

Figure 72:
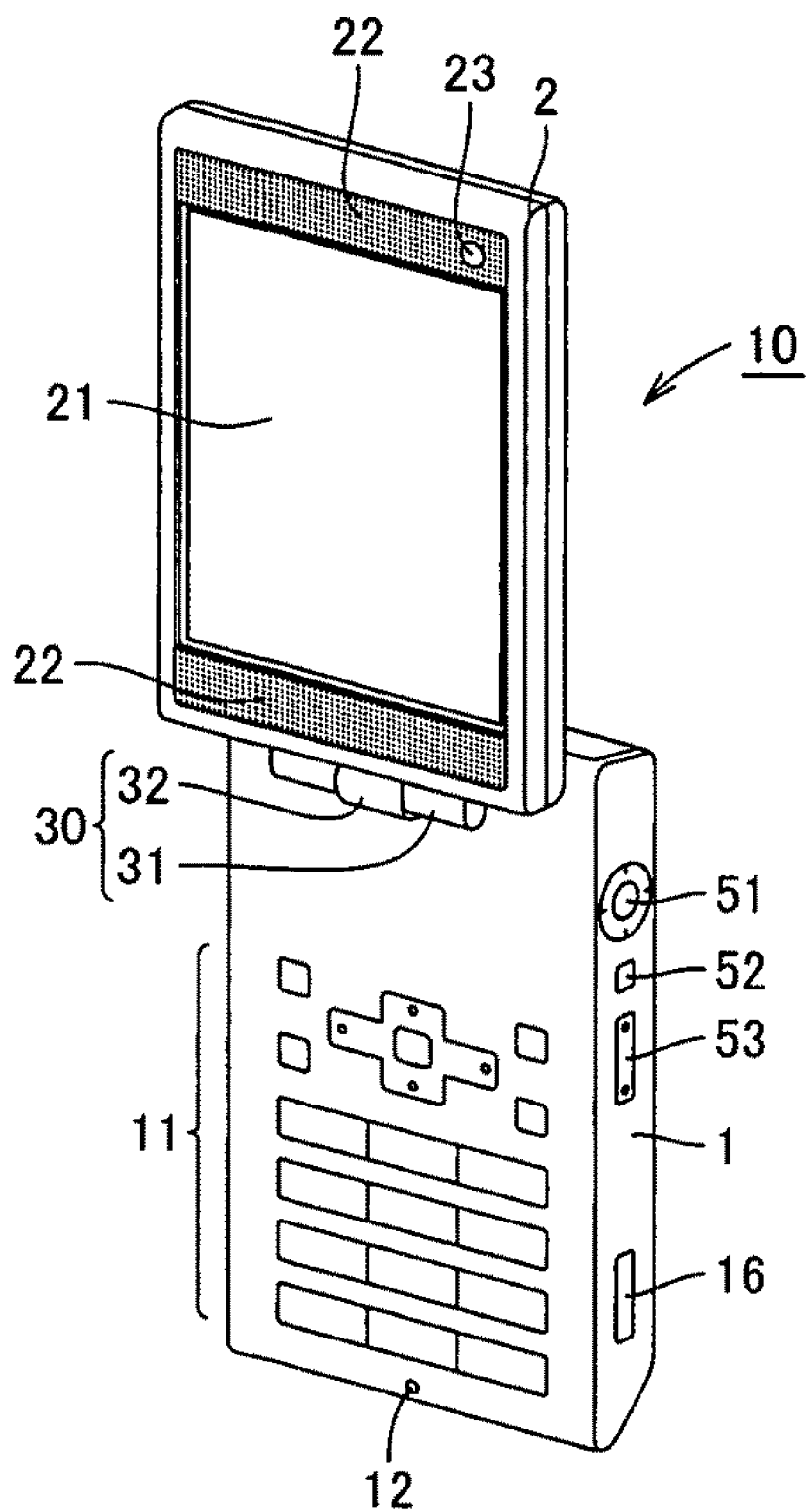
FIG. 72 is a perspective view showing a configuration of a specific example of a mobile information terminal in a third embodiment of the present invention in the open, vertically long state.
Figure 73:
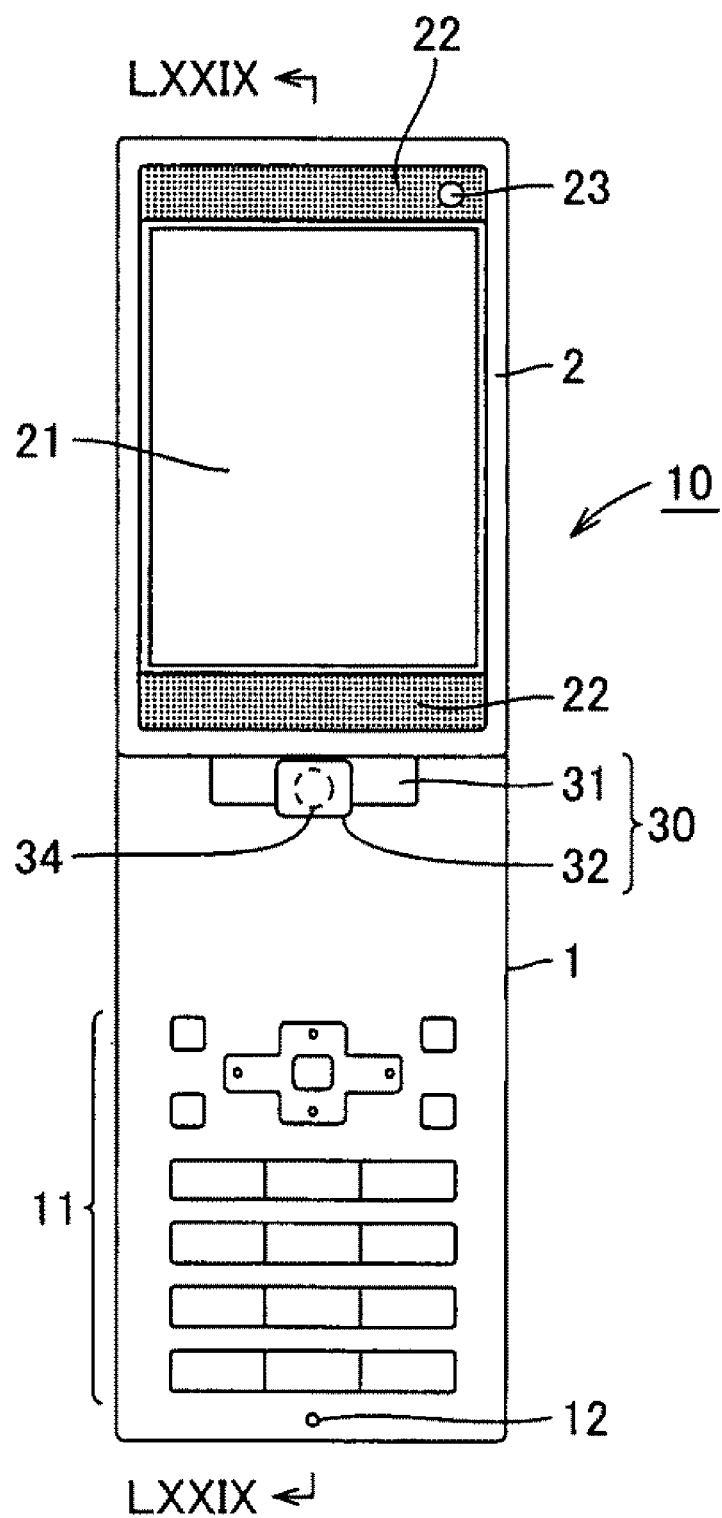
FIG. 73 is a front view showing a configuration of a specific example of the mobile information terminal in the third embodiment of the present invention in the open, vertically long state.

Mainly referring to FIG. 72 and FIG. 73, arranged on the front surface of first casing 1 are operation portion 11 comprised of a ten-key pad, a function key for performing a shutter operation and the like, a menu selection key for performing menu selection and the like, a character switch key for switching characters, and the like, and microphone 12 for telephone call. Arranged on the front surface of second casing 2 are display portion 21 having, for example, a liquid crystal display, speaker 22 arranged on opposite sides in the longitudinal direction of display portion 21, and camera 23. Display portion 21 may be used as a finder of camera 23.

Figure 74:
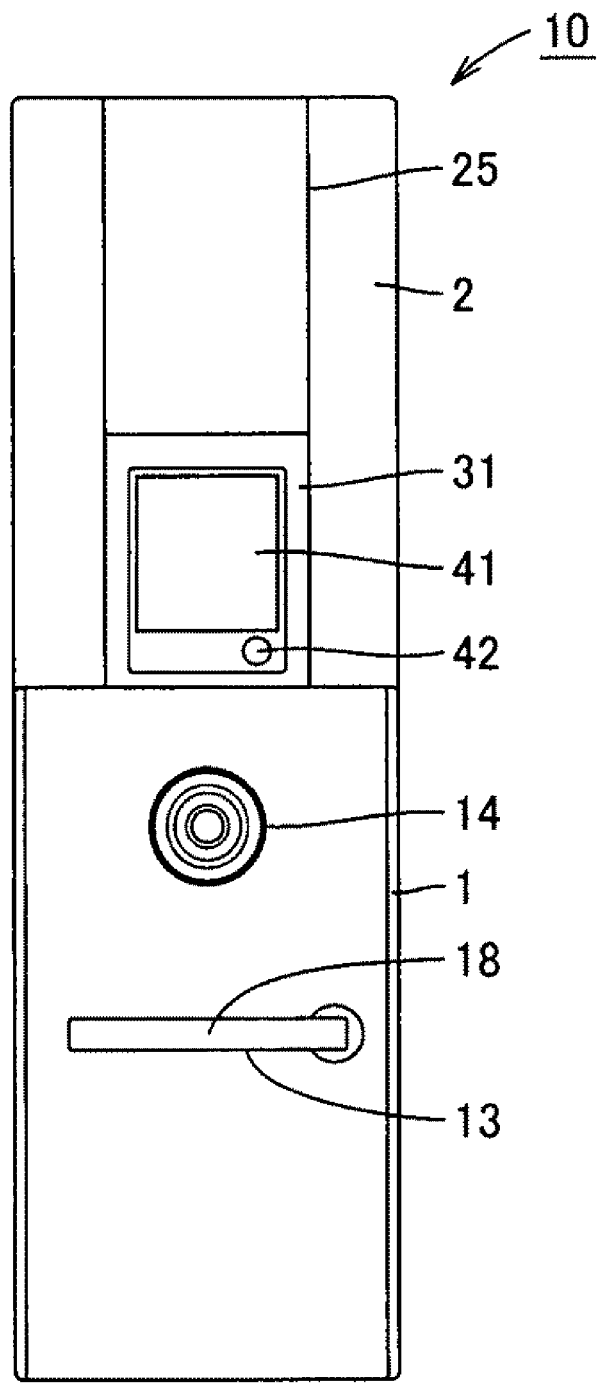
FIG. 74 is a rear view showing a configuration of a specific example of the mobile information terminal in the third embodiment of the present invention in the open, vertically long state.

Mainly referring to FIG. 74, camera 14, a stand 18, a groove 13 for storing the stand are arranged on the back surface of first casing 1. In this case, display portion 21 may be used as a finder of camera 14. Cameras (image pickup device, for example, CCD) 14, 23 may also be rotated according to the rotation of display portion 21 so that an image picked up by cameras 14, 23 (an image displayed on display portion 21) can be displayed in a normal state whether display portion 21 is the portrait type (the state in FIG. 72) or the landscape type (the state in FIG. 83). A flash lamp (not shown) may be arranged in vicinity of camera 14.

The angle of stand 18 can be adjusted with respect to the back surface of first casing 1, and a choice can be made by adjusting this angle, between the state in which stand 18 is stored in groove 13 for storing the stand and the state in which stand 18 protrudes from the back surface of first casing 1 at an angle. A diversity antenna (not shown), for example, is also provided in stand 18.

Figure 75:
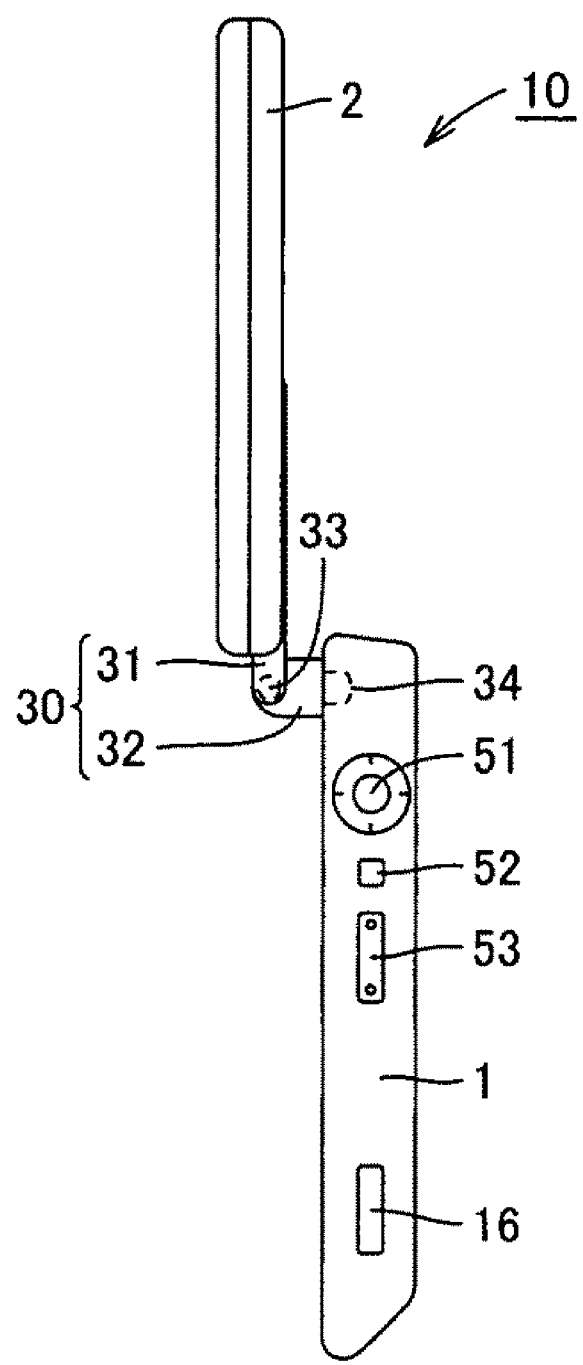
FIG. 75 is a right side view showing a configuration of a specific example of the mobile information terminal in the third embodiment of the present invention in the open, vertically long state.
Figure 76:
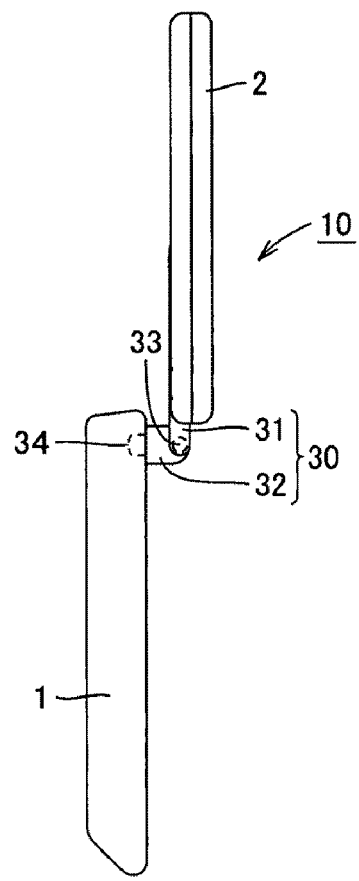
FIG. 76 is a left side view showing a configuration of a specific example of the mobile information terminal in the third embodiment of the present invention in the open, vertically long state.
Figure 77:
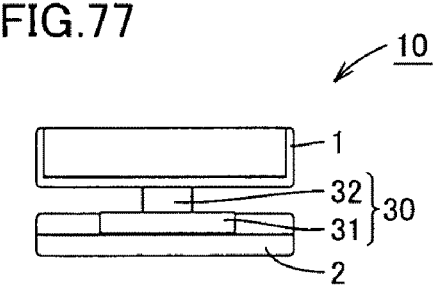
FIG. 77 is a plan view showing a configuration of a specific example of the mobile information terminal in the third embodiment of the present invention in the open, vertically long state.
Figure 78:
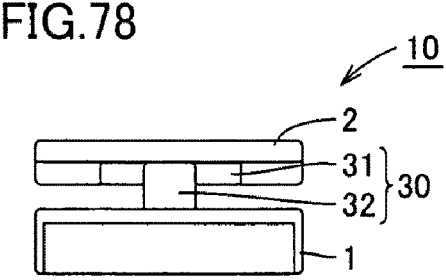
FIG. 78 is a bottom view showing a configuration of a specific example of the mobile information terminal in the third embodiment of the present invention in the open, vertically long state.

Mainly referring to FIG. 75 and FIG. 76, arranged on the right side surface of first casing 1 are a key 51 comprised of an annular search key and a decision key at the center, function keys 52, 53, and a shutter button 16.

A slot for inserting/removing an external memory such as a memory card into/from first casing 1 may be arranged on a side surface (one of the right side surface and the left side surface) of first casing 1. In this case, when an image from camera 14 or camera 23 is stored in an external memory, a flag may also be input which allows recognition of the storage (recording) state of an image depending on whether camera 14 or camera 23 is used in the portrait type or the landscape type (the usage in the portrait type or the landscape type is sensed by an acceleration sensor), whereby a reproduction image can be obtained in a normal state at the time of reproduction. Then, a television broadcast may be recorded in an external memory. In addition, another external memory having a television broadcast or music recorded therein may be inserted into the slot so that the image or sound recorded in another external memory is reproduced in the mobile phone.

Figure 79:
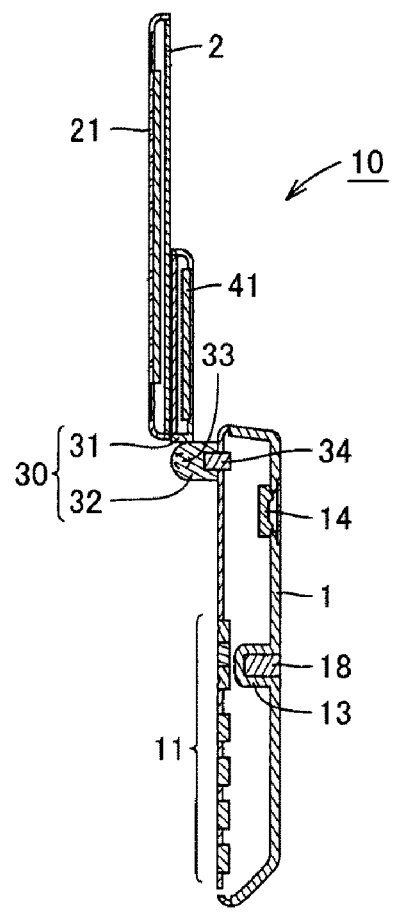
FIG. 79 is a schematic cross sectional view along line LXXIX-LXXIX in FIG. 73.

Mainly referring to FIG. 79, the joint mechanism has hinge portion 30 and a rotation shaft 34. Hinge portion 30 is comprised of two joint member 31 and 32 which are rotatably joined to each other by rotation shaft 33. Joint member 31 is coupled to second casing 2 such that it can make a reciprocally sliding movement along a rail groove 25 (FIG. 74) of second casing 2. Joint member 32 is coupled to first casing 1 rotatably around rotation shaft 34 attached vertically to the front surface of first casing 1.

Joint member 31 and second casing 2 may be electrically connected to each other by providing a rail-like conductor to rail groove 25 of second casing 2 and providing a contact in contact with the conductor to joint member 31. Joint member 31 and second casing 2 may be electrically connected to each other by providing an extensible cable inside.

Mainly referring to FIG. 74, joint member 31 is provided with sub-display portion 41 and flash lamp 42.

Figure 80:
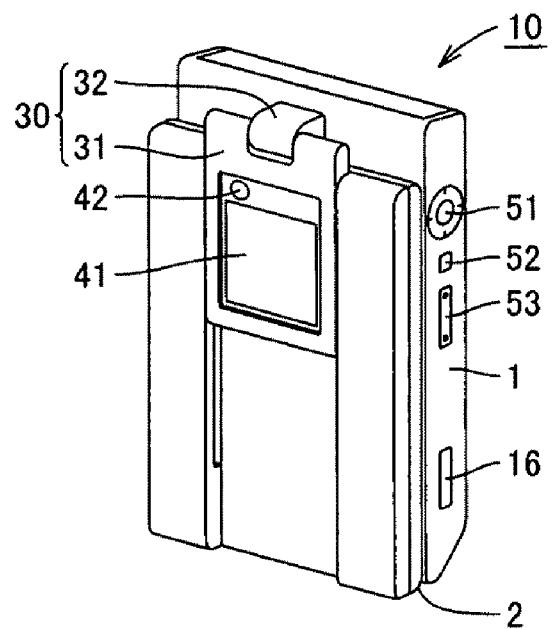
FIG. 80 is a perspective view showing the closed state (a state in which display portion 21 is not exposed outside) of the mobile information terminal in the third embodiment of the present invention.
Figure 81:
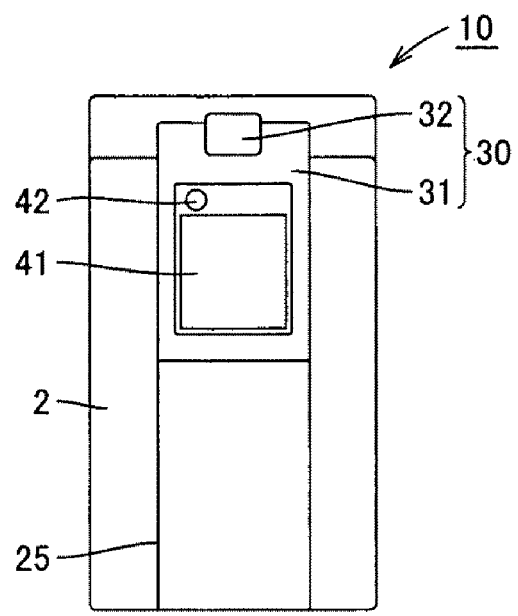
FIG. 81 is a front view showing the closed state (a state in which display portion 21 is not exposed outside) of the mobile information terminal in the third embodiment of the present invention.
Figure 82:
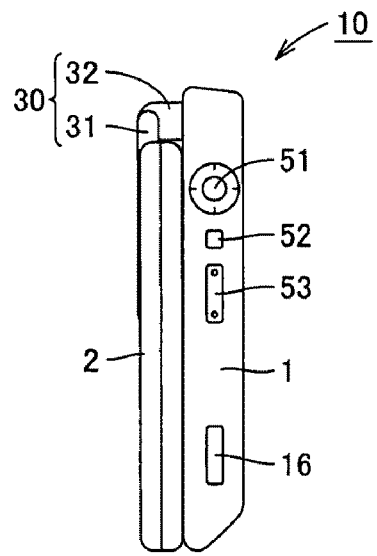
FIG. 82 is a right side view showing the closed state (a state in which display portion 21 is not exposed outside) of the mobile information terminal in the third embodiment of the present invention.

Referring to FIG. 80-FIG. 82, in this closed state, the front surface of first casing 1 and the front surface of second casing 2 are opposed to each other, operation portion 11 provided on the front surface of first casing 1 is entirely covered with second casing 2, and display portion 21 provided on the front surface of second casing 2 is entirely covered with first casing 1. Thus, display portion 21 is not visually recognized from the outside of mobile information terminal 10 and protected. In addition, an operating error of operation portion 11 can be prevented.

Mainly referring to FIG. 80, in the closed state, sub-display portion 41 and flash lamp 42 provided in hinge portion 30 (provided on the back surface of second casing 2) are exposed outside mobile information terminal 10. Accordingly, when an image is taken by camera 14 provided on the back surface of first casing 1, an image can be taken by pressing shutter button 16 while a subject is viewed on sub-display portion 41. Therefore, image capturing in a digital camera manner becomes possible. Furthermore, even in the closed state, an incoming call or the like can be checked on sub-display portion 41.

Figure 83:
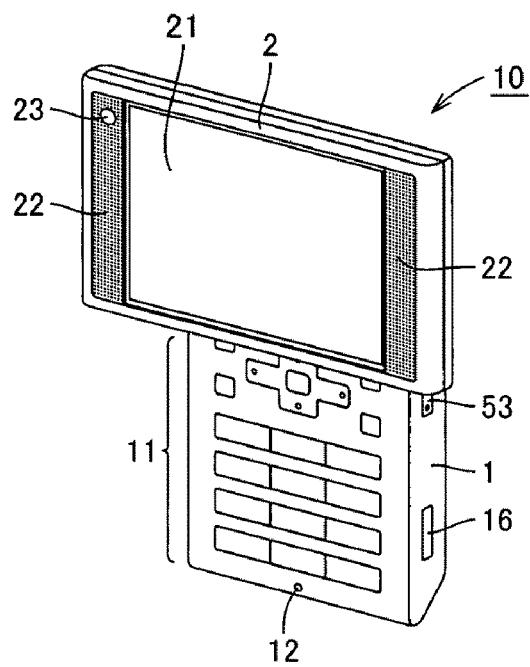
FIG. 83 is a perspective view showing a configuration of a specific example of the mobile information terminal in the third embodiment of the present invention in the open, horizontally long state.
Figure 84:
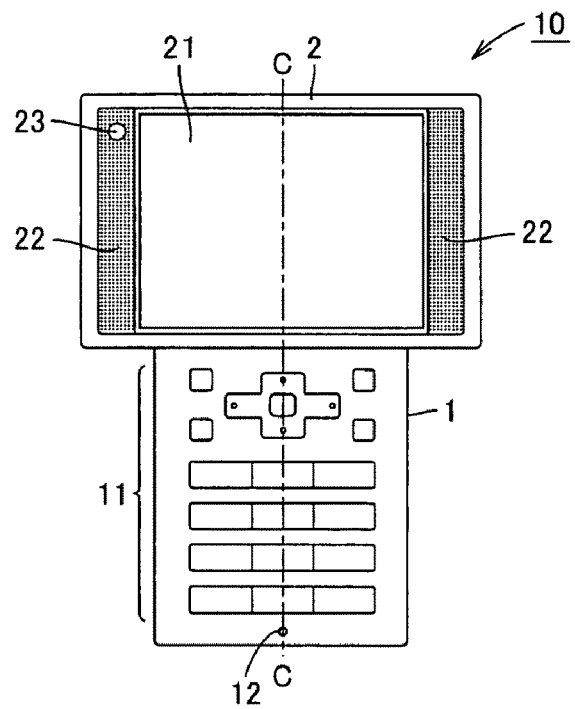
FIG. 84 is a front view showing a configuration of a specific example of the mobile information terminal in the third embodiment of the present invention in the open, horizontally long state.
Figure 85:
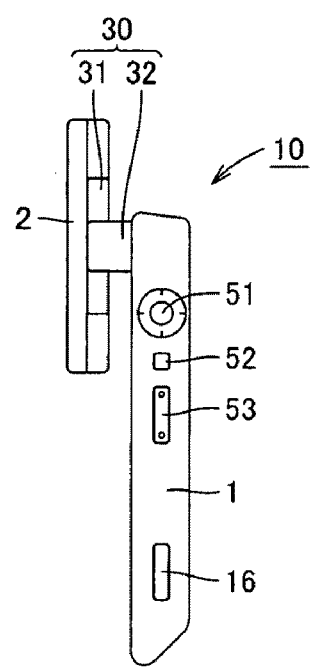
FIG. 85 is a right side view showing a configuration of a specific example of the mobile information terminal in the third embodiment of the present invention in the open, horizontally long state.
Figure 86:
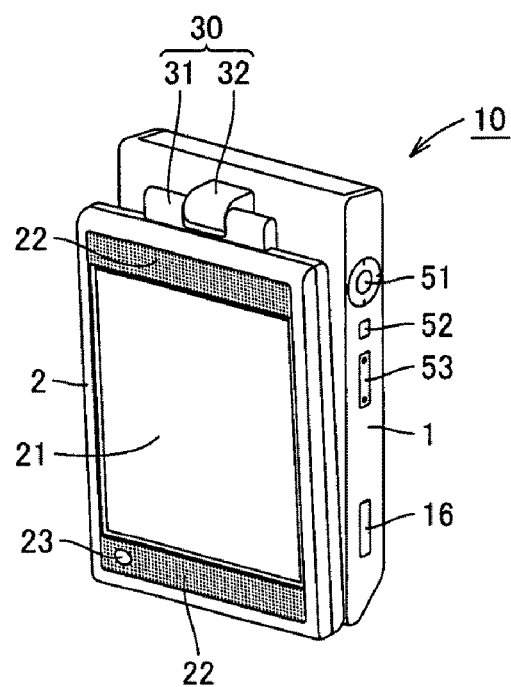
FIG. 86 is a perspective view showing a closed state (a state in which display portion 21 is exposed outside) of the mobile information terminal in the third embodiment of the present invention.
Figure 87:
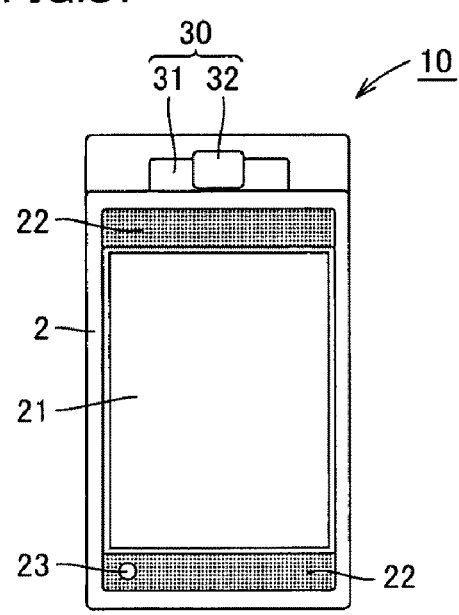
FIG. 87 is a front view showing the closed state (a state in which display portion 21 is exposed outside) of the mobile information terminal in the third embodiment of the present invention.
Figure 88:
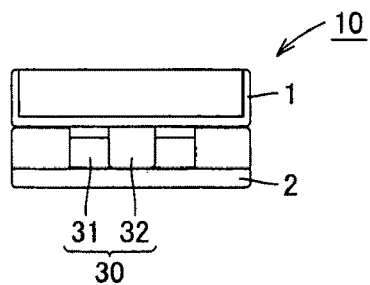
FIG. 88 is a plan view showing the closed state (a state in which display portion 21 is exposed outside) of the mobile information terminal in the third embodiment of the present invention.
Figure 89:
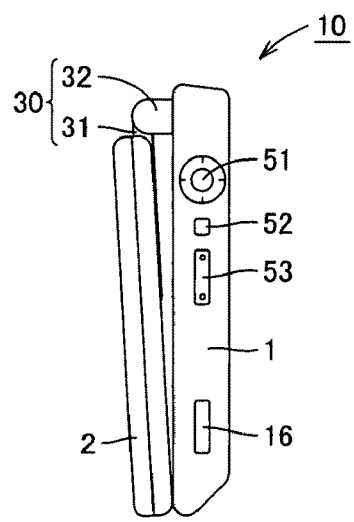
FIG. 89 is a right side view showing the closed state (a state in which display portion 21 is exposed outside) of the mobile information terminal in the third embodiment of the present invention.

Referring to FIG. 83-FIG. 85, in the open, horizontally long state, both operation portion 11 and display portion 21 are exposed outside. Second casing 2 has left-right symmetry with respect to the center line C-C of first casing 1, and mobile information terminal 10 has a "T"-shaped contour as viewed from the front.

Referring to FIG. 86-FIG. 89, in this closed state, the front surface of first casing 1 and the back surface of second casing 2 are opposed to each other, operation portion 11 provided on the front surface of first casing 1 is entirely covered with second casing 2, and sub-display portion 41 and flash lamp 42 provided in hinge portion 30 on the back surface side of second casing 2 are entirely covered with first casing 1. On the other hand, display portion 21 provided on the front surface of second casing 2 is exposed outside. Accordingly, in a compact state with operation portion 11 protected, when an image is taken by camera 14 provided on the back surface of first casing 1, an image can be taken by pressing shutter button 16 while a subject is viewed on display portion 21. Thus, image capturing in a digital camera manner becomes possible. In addition, even in the closed state, an incoming call or the like can be checked on sub-display portion 41. Furthermore, a variety of keys 51-53 provided on the side surface of first casing 1 can be operated for mail transmission, television viewing, and the like.

Figure 90:
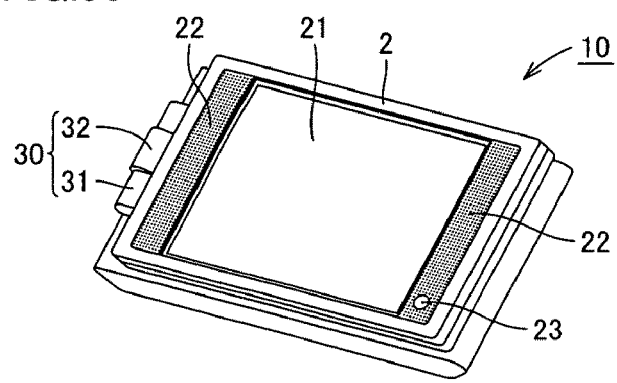
FIG. 90 is a perspective view showing that the mobile information terminal in the third embodiment of the present invention is placed on a table or the like in the closed state (a state in which display portion 21 is exposed outside).
Figure 91:
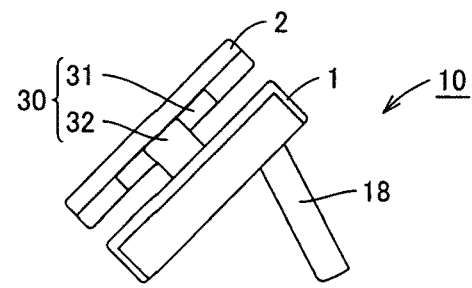
FIG. 91 is a right side view showing that the mobile information terminal in the third embodiment of the present invention is placed on a table or the like in the closed state (a state in which display portion 21 is exposed outside).

Referring to FIG. 90 and FIG. 91, when mobile information terminal 10 in the present embodiment is placed on a table or the like in the closed state, stand 18 is in an inclined standing state with respect to the back surface of first casing 1. This stand 18 allows mobile information terminal 10 to be supported from the back surface side of first casing 1 in an inclined state with respect to a surface of a table or the like. Accordingly, the operator can easily see display portion 21 of second casing 2 even in the state in which mobile information terminal 10 is placed on a table or the like. The angle of inclination of display portion 21 of second casing 2 can be adjusted by adjusting the angle of inclination of stand 18 with respect to first casing 1. Accordingly, display portion 21 can be inclined such that the operator can view easily. In addition, mobile information terminal 10 can be held in a standing state by stand 18 and therefore does not have to be held in hand for television viewing.

An antenna 50 is preferably provided in stand 18. Accordingly, the reception sensitivity of antenna 50 can be set at the best position by changing the angle (standing angle) of stand 18 with respect to the back surface of first casing 1.

The usage of the mobile information terminal in the present embodiment will now be described.

Figure 92:
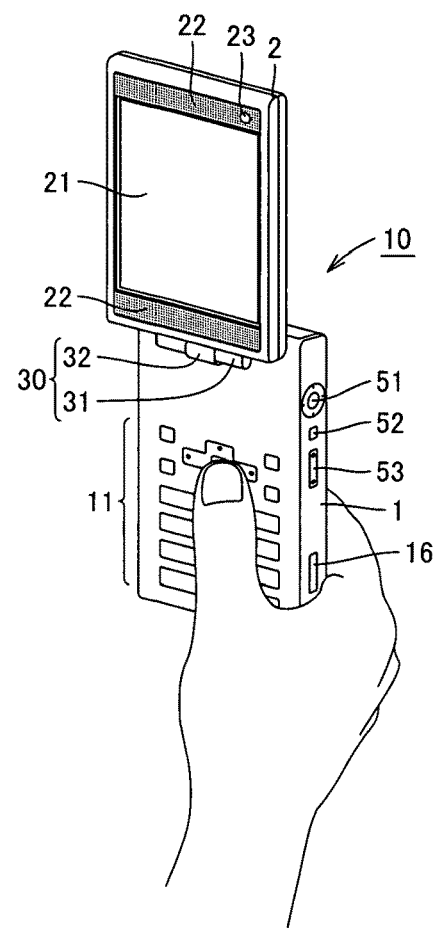
FIG. 92 is a perspective view illustrating a usage manner of the mobile information terminal in the third embodiment of the present invention in the open, vertically long state.

In the open, vertically long state shown in FIG. 92, the operator can perform, for example, mail or calling operations and the like while viewing display portion 21 with first casing 1 held in hand. Here, a variety of operations are performed by operating operation portion 24.

When the operator holds mobile information terminal 10 with the back surfaces of first and second casings 1, 2 facing the operator, the operator can use camera 14 provided on the back surface of first casing 1 to take an image of himself while viewing himself as a subject on sub-display portion 41 arranged on the back surface of second casing 2. Here, in the case of image capturing in a dark place, the operator can use flash lamp 42 to illuminate himself as a subject for image capturing.

Figure 93:
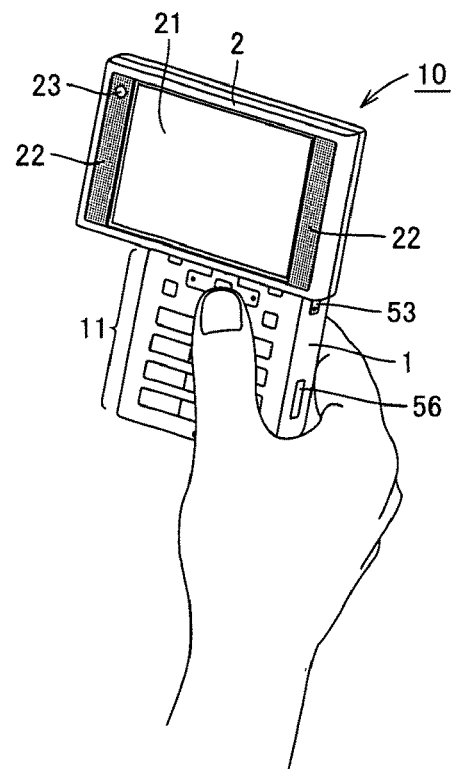
FIG. 93 is a perspective view illustrating a usage manner of the mobile information terminal in the third embodiment of the present invention in the open, horizontally long state.

In the open, horizontally long state shown in FIG. 93, the operator can see display portion 21 in the horizontally long display with first casing 1 grasped in hand. Therefore, the operator can watch television (terrestrial digital broadcast, terrestrial analog broadcast, digital radio broadcast with image) on display portion 21 with mobile information terminal 10 kept in hand. Furthermore, in the open, horizontally long state, display portion 21 has left-right symmetry with respect to the center line of first casing 1, thereby achieving comfortable television viewing. Therefore, the operator can watch television comfortably even under the circumstances in which mobile information terminal 10 cannot be laid as in a train on the move.

Moreover, each key of operation portion 11 is operated by thumb for mail or calling operations and the like with first casing 1 grasped.

In either state in FIG. 92 and FIG. 93, an image of a subject can be taken by pointing camera 14 provided on the back surface of first casing 1 to the subject and seeing the subject and the shot composition on display portion 21 (namely, using display portion 21 as a finder). In addition, the operator can use camera 23 provided on the front surface of second casing 2 to take an image of himself as a subject while seeing the subject and the shot composition on display portion 21. Moreover, a videophone is also realized in which the operator talks to the party on the other end while taking an image of himself by camera 23.

Figure 94:
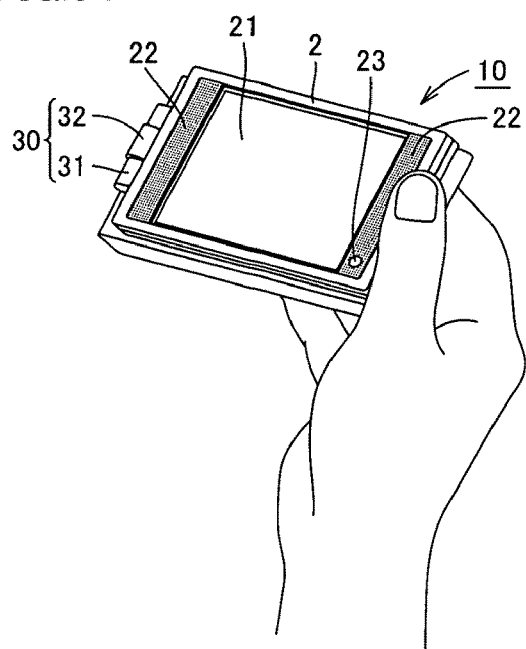
FIG. 94 is a perspective view illustrating a usage manner of the mobile information terminal in the second embodiment of the present invention in the closed state with display portion 21 exposed.

In the closed state shown in FIG. 94, mail operations, television viewing, and the like are possible in a compact state. In addition, the operator can use camera 23 provided on the front surface of second casing 2 to take an image of himself as a subject while seeing the subject and the shot composition on display portion 21. Moreover, a videophone is also realized in which the operator talks to the party on the other end while taking an image of himself by camera 23.

In the state in which the mobile information terminal is placed on a table or the like in the closed state shown in FIG. 90 and FIG. 91, the operator can watch television on display portion 21 without holding mobile information terminal 10 in hand. Furthermore, since the angle of inclination of second casing 2 can be adjusted by stand 18, the angle of display portion 21 can be adjusted for the operator to see easily. Therefore, the operator can watch television comfortably even under the circumstances in which mobile information terminal 10 is placed on a table or the like in a room.

In the state shown in FIG. 90 and FIG. 91, usability can be further improved by automatically setting (switching) to a mode of giving top priority to television viewing.

In the closed state shown in FIGS. 80-82, display portion 21 and operation portion 11 are not exposed outside. This eliminates the likelihood of damaging display portion 21 and prevents an operating error of the operation portion, and thus this state is convenient for carrying mobile information terminal 10.

In the case where a touch panel is employed in display portion 21, a variety of operations can be performed by operating the touch panel.

Now, the opening/closing operation of mobile information terminal 10 in the present embodiment will be described.

Figure 95:
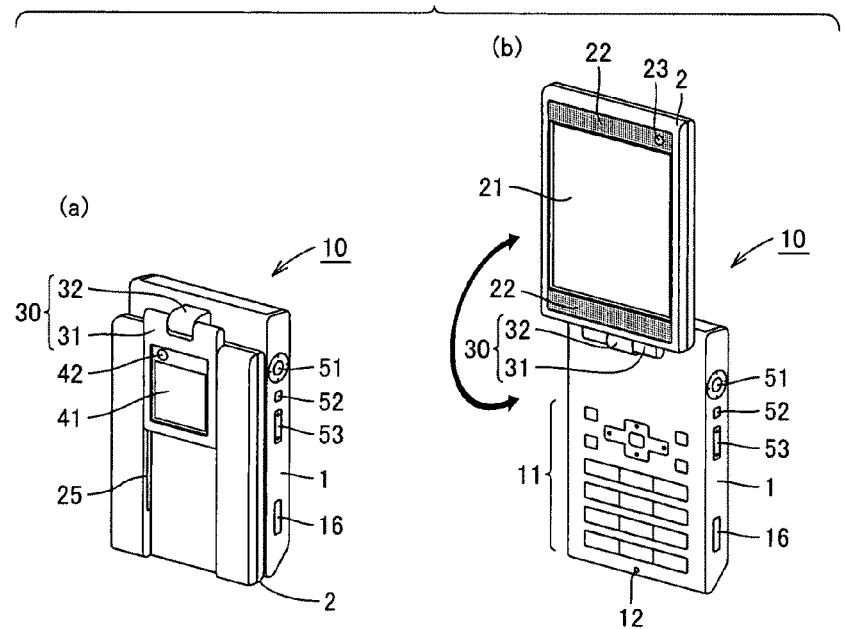
FIG. 95 is a perspective view illustrating an opening/closing operation of the mobile information terminal in the third embodiment of the present invention.
Figure 96:
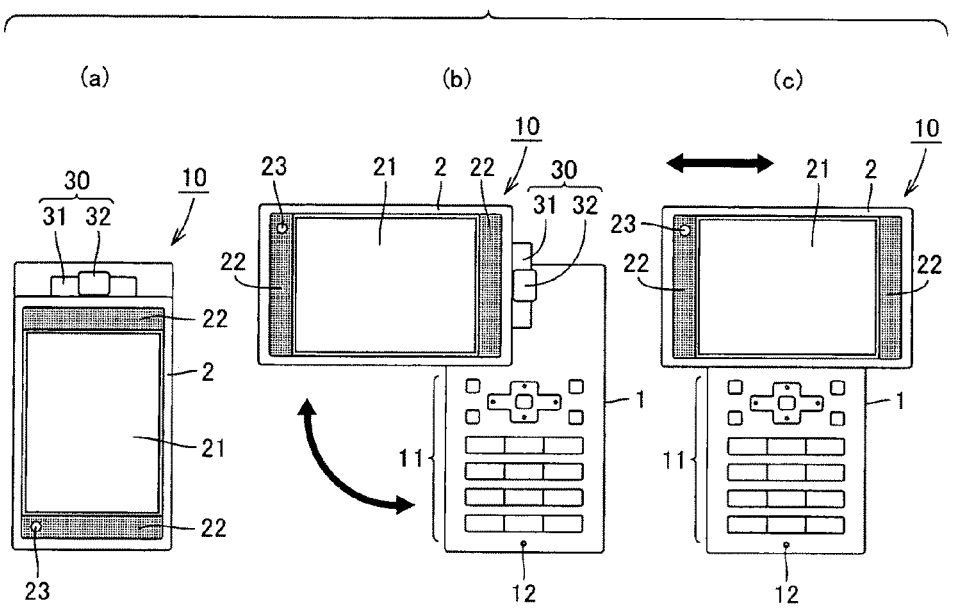
FIG. 96 is a front view illustrating an opening/closing operation of the mobile information terminal in the third embodiment of the present invention.

FIG. 95 and FIG. 96 are a perspective view and a front view illustrating the opening/closing operation of the mobile information terminal in the third embodiment of the present invention. FIG. 95(a) shows a perspective view in the closed state (the state in which display portion 21 is not exposed), and FIG. 95(b) shows a perspective view in the open, vertically long state. FIG. 96(a) shows a front view in the open state (the state in which display portion 21 is exposed), FIG. 96(b) shows a front view during transition, and FIG. 96(c) shows a front view in the open, horizontally long state.

Referring to FIG. 95(a), in the closed state (the state in which display portion 21 is not exposed), the operator rotates joint member 31 and second casing 2 around rotation shaft 33 with respect to joint member 32 with first casing 1 grasped in hand, thereby bringing about the open, vertically long state shown in FIG. 95(b). Operation portion 11 and display portion 21 are then exposed outside.

In the open, vertically long state shown in FIG. 95(b), joint member 32 is rotated by 180° around rotation shaft 34 with respect to first casing 1 so that second casing 2 is slidably rotated with respect to first casing 1. This brings about the closed state (the state in which display portion 21 is exposed) shown in FIG. 96(a) and allows display portion 21 to be exposed without exposing operation portion 11.

In the closed state (the state in which display portion 21 is exposed) shown in FIG. 96(a), joint member 32 is rotated by 90° around rotation shaft 34 with respect to first casing 1 so that second casing 2 is slidably rotated with respect to first casing 1. This brings about the transition state shown in FIG. 96(b).

From the transition state shown in FIG. 96(b), joint member 31 is slid along rail groove 25 (FIG. 74) on the back surface of second casing 2, so that as shown in FIG. 96(c), second casing 2 has left-right symmetry with respect to the center line of first casing 1, and second casing 2 is in the open, horizontally long state. In this state, mobile information terminal 10 has a "T"-shaped contour as viewed from the front. Also in this state, operation portion 11 and display portion 21 are exposed outside.

The operation from the open, horizontally long state shown in FIG. 96(c) to the closed state shown in FIG. 95(a) is performed by reversing the operation as described above.

In accordance with the present embodiment, it is possible to make a choice between the vertically long state and the horizontally long state in the open state as described above. In the horizontally long state, second casing 2 has left-right symmetry with respect to the center line of first casing 1 and mobile information terminal 10 has a "T" shaped contour as viewed from the front. Therefore, in the horizontally long state, the operator can view television or the like comfortably on display portion 21. Moreover, the body size can be reduced when display portion 21 is set in the horizontally long state.

In addition, it is possible to make a choice between the state in which display portion 21 is exposed and the state in which it is not exposed in the closed state. Therefore, in the state in which display portion 21 is exposed, a variety of operations can be performed with the body in a compact state, while in the state in which display portion 21 is not exposed, display portion 21 can be protected.

Furthermore, since sub-display portion 41 is provided in hinge portion 30, sub-display portion 41 can be seen even in the state in which display portion 21 is not exposed in the closed state.

Moreover, when television is viewed on a landscape screen, selection can be made from two different viewing manners, namely the state shown in FIG. 93 and the state shown in FIG. 94.

In addition, as shown in FIG. 80, there is no step between the front surface of joint member 31 and the front surface of second casing 2, so that the mobile information terminal can be smoothly put into a pocket or a bag without being hooked on to the opening thereof.

Here, in the present embodiment, similar to the first embodiment, an electric circuit portion shown in FIG. 30 may be provided, an antenna (for example, a diversity antenna) may be provided in joint member 31 or 32 of hinge portion 30, and second casing 2 may be slidably rotated 360° with respect to first casing 1. Furthermore, the switching between the portrait and landscape angles, the speaker switching according to the switching between the vertically long state and the horizontally long state of the second casing, and the speaker switching at the time of an incoming call during reproduction of AV contents as illustrated in the first and second embodiments can also be applied to the present embodiment, similarly.

Fourth Embodiment

Referring to FIG. 97-FIG. 104, mobile information terminal 10 in the present embodiment has first casing 1, second casing 2, and a joint mechanism. First casing 1 has a first portion 1a, a second portion 1b, and a rotation shaft 1c. First portion 1a and second portion 1b are joined to each other in a bendable manner by rotation shaft 1c.

Figure 97:
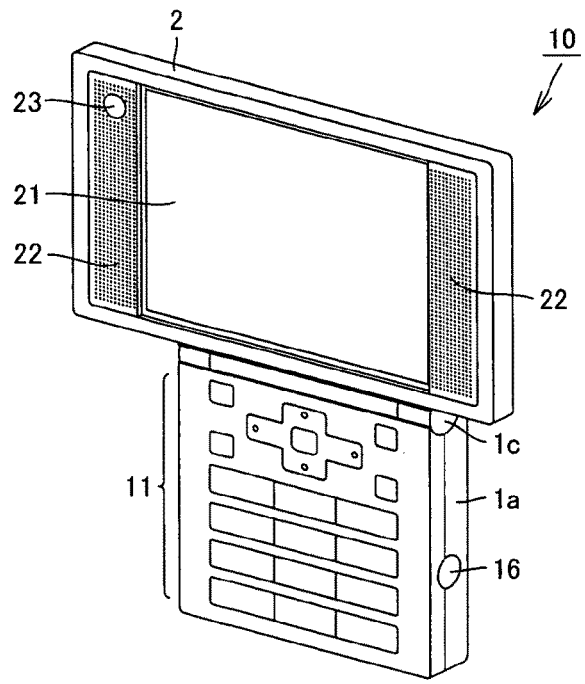
FIG. 97 is a perspective view showing a configuration of a specific example of a mobile information terminal in a fourth embodiment of the present invention in the open, horizontally long state.
Figure 98:
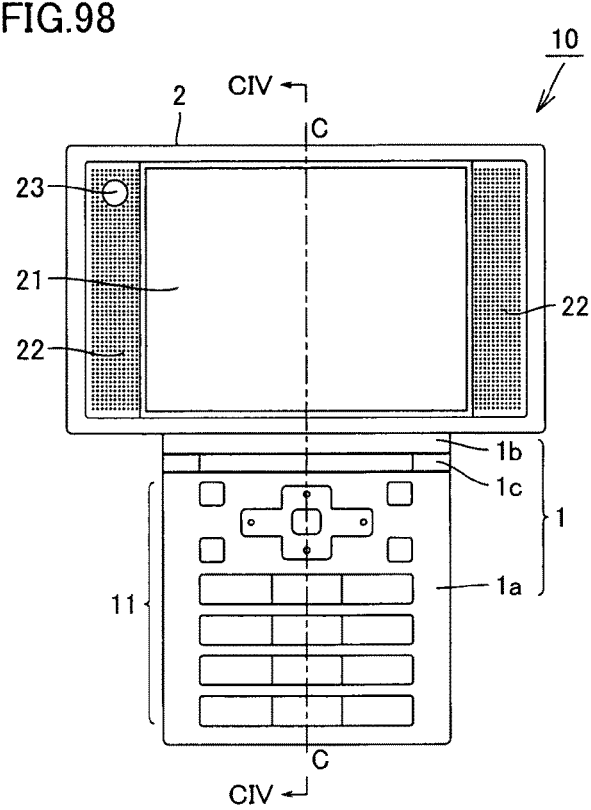
FIG. 98 is a front view showing a configuration of a specific example of the mobile information terminal in the fourth embodiment of the present invention in the open, horizontally long state.

Mainly referring to FIG. 97 and FIG. 98, arranged on the front surface of first portion 1a is operation portion 11 comprised of a ten-key pad, a function key for performing a shutter operation and the like, a menu selection key for performing menu selection and the like, a character switch key for switching characters, and the like. Second casing 2 is joined to the front surface of second portion 1b by the joint mechanism.

Arranged on the front surface of second casing 2 are display portion 21 having, for example, a liquid crystal display, speaker 22 arranged on opposite sides in the longitudinal direction of display portion 21, and camera 23. Display portion 21 may be used as a finder of camera 23.

Figure 99:
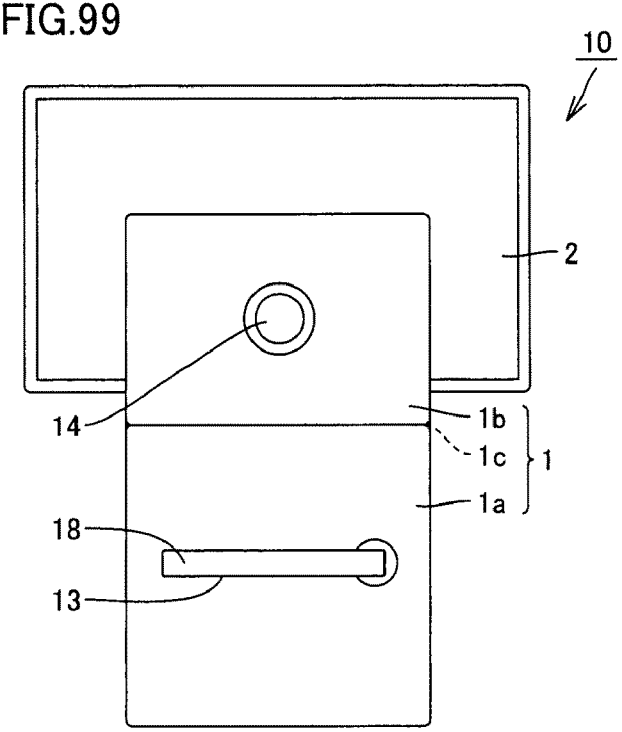
FIG. 99 is a rear view showing a configuration of a specific example of the mobile information terminal in the fourth embodiment of the present invention in the open, horizontally long state.

Mainly referring to FIG. 99, camera 14, stand 18, groove 13 for storing the stand are arranged on the back surface of first casing 1. In this case, display portion 21 may be used as a finder of camera 14. Cameras (image pickup device, for example, CCD) 14, 23 may also be rotated according to the rotation of display portion 21 so that an image picked up by cameras 14, 23 (an image displayed on display portion 21) can be displayed in a normal state whether display portion 21 is a portrait type (the state in FIG. 109) or a landscape type (the state in FIG. 97). A flash lamp (not shown) may be arranged in vicinity of camera 14.

The angle of stand 18 can be adjusted with respect to the back surface of first casing 1, and a choice can be made by adjusting this angle, between the state in which stand 18 is stored in groove 13 for storing the stand and the state in which stand 18 protrudes from the back surface of first casing 1 at an angle. A diversity antenna (not shown), for example, is also provided in stand 18.

Figure 100:
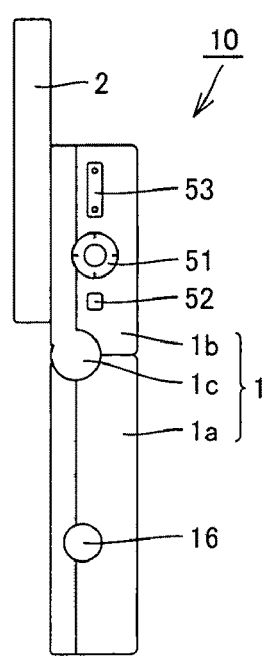
FIG. 100 is a right side view showing a configuration of a specific example of the mobile information terminal in the fourth embodiment of the present invention in the open, horizontally long state.
Figure 101:
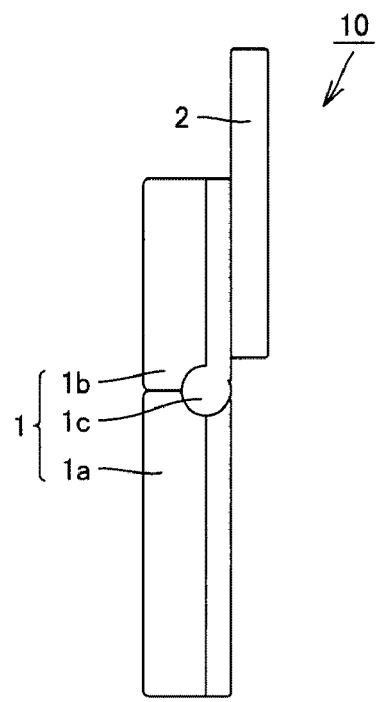
FIG. 101 is a left side view showing a configuration of a specific example of the mobile information terminal in the fourth embodiment of the present invention in the open, horizontally long state.
Figure 102:
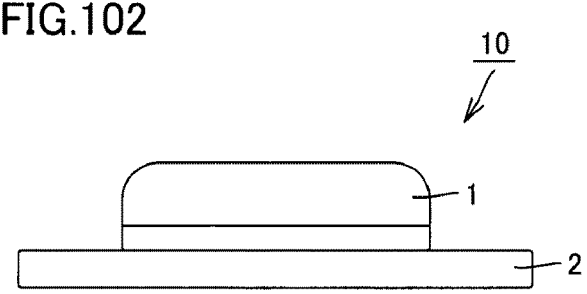
FIG. 102 is a plan view showing a configuration of a specific example of the mobile information terminal in the fourth embodiment of the present invention in the open, horizontally long state.
Figure 103:
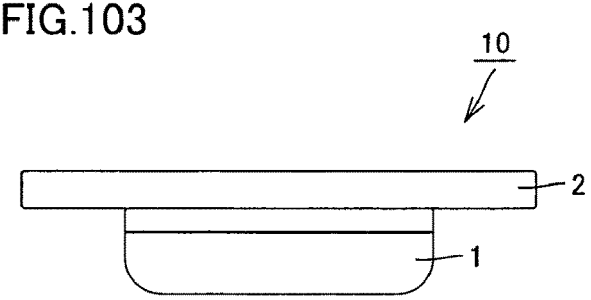
FIG. 103 is a bottom view showing a configuration of a specific example of the mobile information terminal in the fourth embodiment of the present invention in the open, horizontally long state.

Mainly referring to FIG. 100 and FIG. 101, arranged on the right side surface of first casing 1 are key 51 comprised of an annular search key and a decision key at the center, function keys 52, 53, and shutter button 16.

A slot for inserting/removing an external memory such as a memory card into/from first casing 1 may be arranged on a side surface (one of the right side surface and the left side surface) of first casing 1. In this case, when an image from camera 14 or camera 23 is stored in an external memory, a flag may also be input which allows recognition of the storage (recording) state of an image depending on whether camera 14 or camera 23 is used in the portrait type or the landscape type (the usage in the portrait type or the landscape type is sensed by an acceleration sensor), whereby a reproduction image can be obtained in a normal state at the time of reproduction. Then, a television broadcast may be recorded in an external memory. In addition, another external memory having a television broadcast or music recorded therein may be inserted into the slot so that the image or sound recorded in another external memory is reproduced in the mobile phone.

Figure 104:
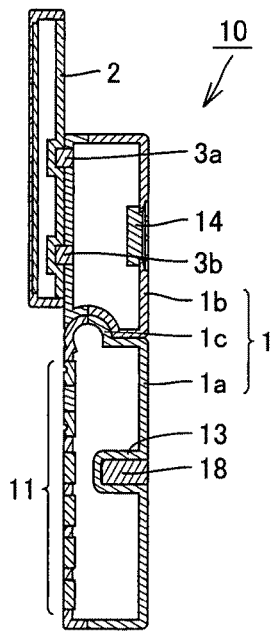
FIG. 104 is a schematic cross sectional view along line CIV-CIV in FIG. 98.
Figure 105:
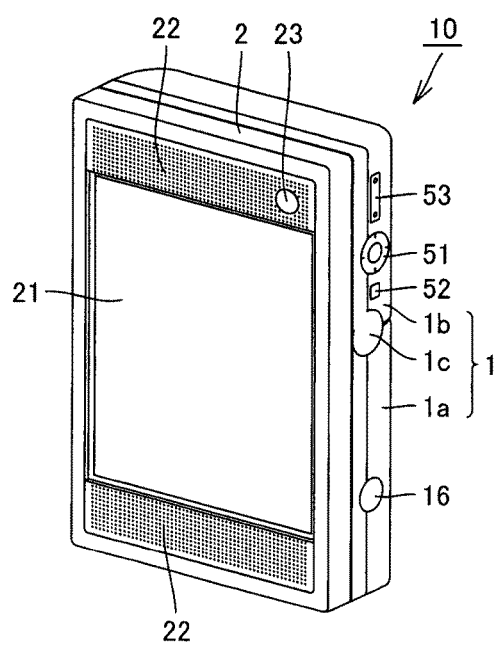
FIG. 105 is a perspective view showing the closed state of the mobile information terminal in the fourth embodiment of the present invention.
Figure 106:
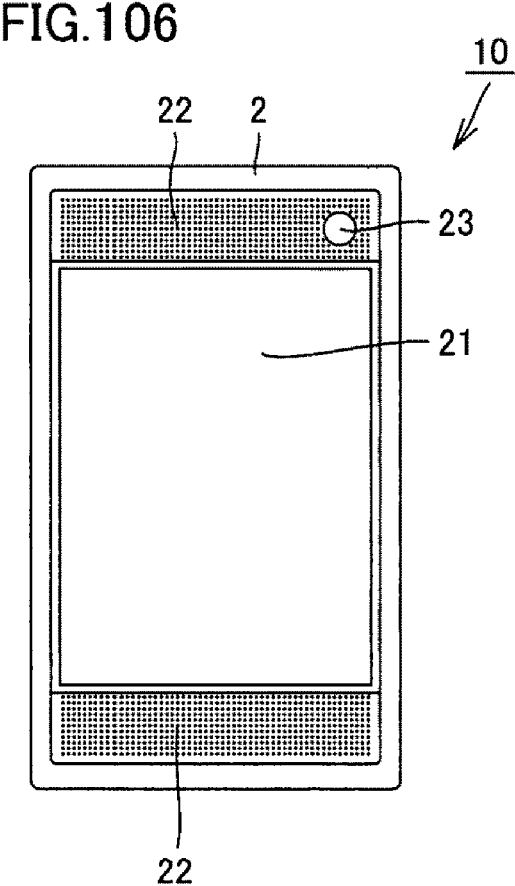
FIG. 106 is a front view showing the closed state of the mobile information terminal in the fourth embodiment of the present invention.
Figure 107:
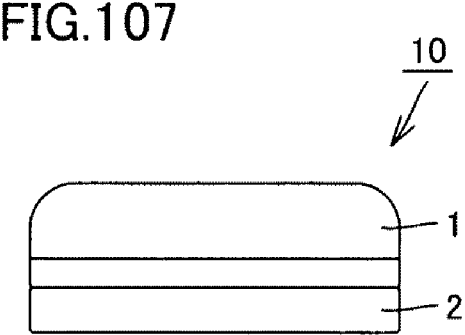
FIG. 107 is a plan view showing the closed state of the mobile information terminal in the fourth embodiment of the present invention.
Figure 108:
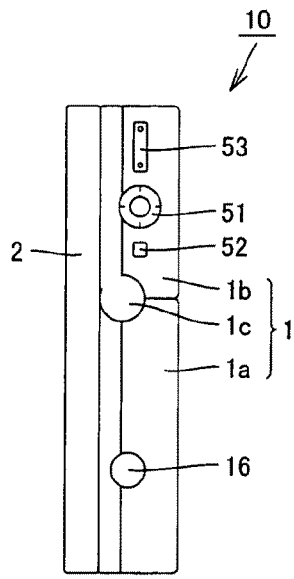
FIG. 108 is a right side view showing the closed state of the mobile information terminal in the fourth embodiment of the present invention.
Figure 118:
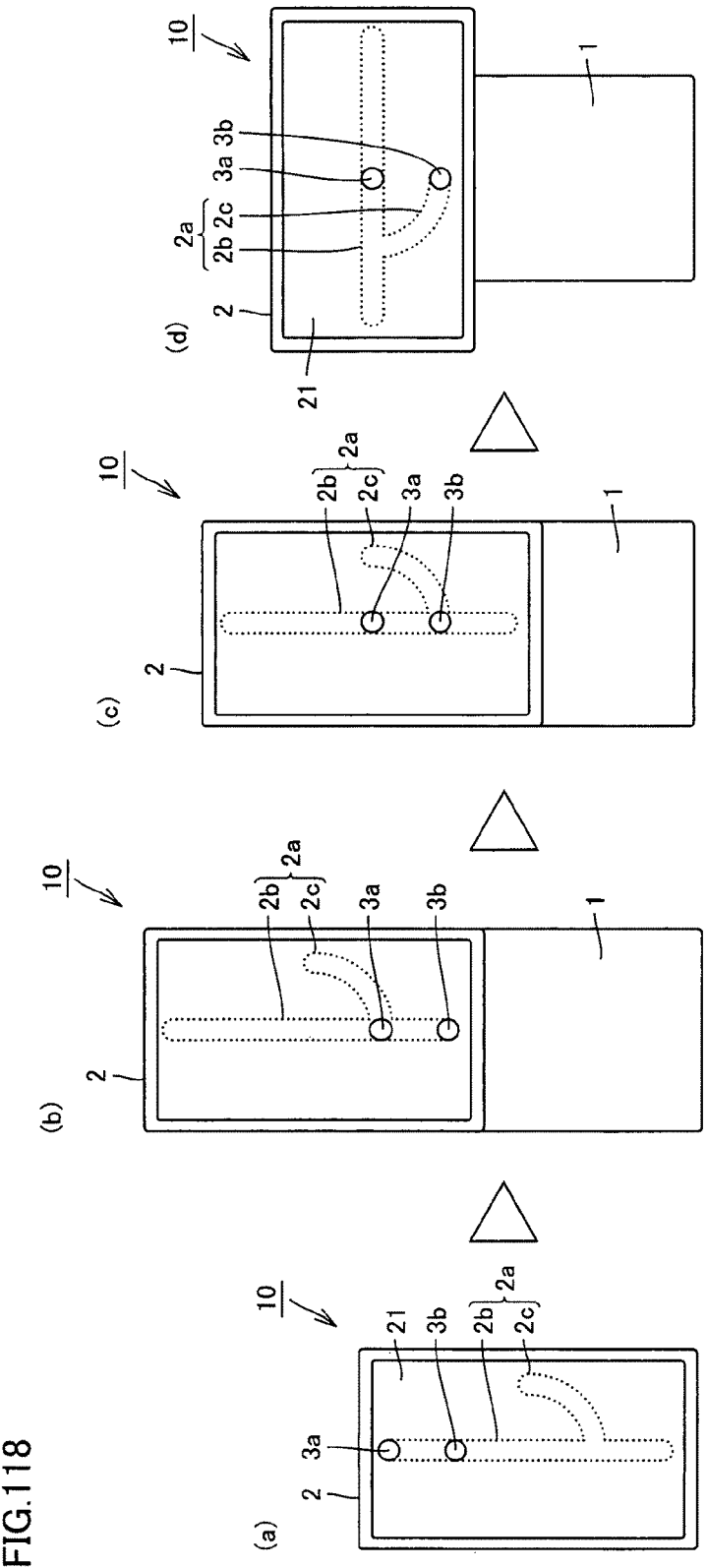
FIG. 118 is an illustration showing an engagement state between two pins and a cam hole of a joint mechanism in the opening/closing operation of the mobile information terminal in the fourth embodiment of the present invention.

Mainly referring to FIG. 104 and FIG. 118, the joint mechanism has two pins 3a, 3b provided on the front surface of second portion 1b, and a cam hole 2a provided on the back surface of second casing 2. Cam hole 2a is comprised of a linear cam hole 2b and an arc-like cam hole 2c branched from the middle portion of the linear cam hole 2b. Each of two pins 3a, 3b is slidably inserted into cam hole 2a. In order to prevent each of two pins 3a, 3b from dropping off from cam hole 2a, a tip end of each of two pins 3a, 3b may have a flange portion with an expanded diameter. This joint mechanism allows second casing 2 to be coupled to first casing 1 such that second casing 2 can slide with respect to first casing 1 and that display portion 21 can make a transition between the horizontally long state and the vertically long state with respect to first casing 1.

In the horizontally long state shown in FIG. 97-FIG. 104, second casing 2 has left-right symmetry with respect to the center line C-C of first casing 1, and mobile information terminal 10 has a "T"-shaped contour as viewed from the front.

FIG. 105-FIG. 108 are a perspective view, a front view, a plan view, and a right side view showing the closed state of the mobile information terminal in the fourth embodiment of the present invention. Referring to FIG. 105-FIG. 108, in this closed state, as viewed from the side surface (see FIG. 108), first casing 1 is not bent so that first portion 1a and second portion 1b extend linearly. Then, the front surface of first casing 1 and the back surface of second casing 2 are opposed to each other, operation portion 11 provided on the front surface of first casing 1 is entirely covered with second casing 2, and display portion 21 provided on the front surface of second casing 2 is exposed outside. Accordingly, a variety of operations can be performed while display portion 21 is viewed, and an operating error of operation portion 11 can be prevented. Here, a variety of operations in this state are performed with a variety of keys 51-53 and 16 provided on the side surface of first casing 1.

Figure 109:
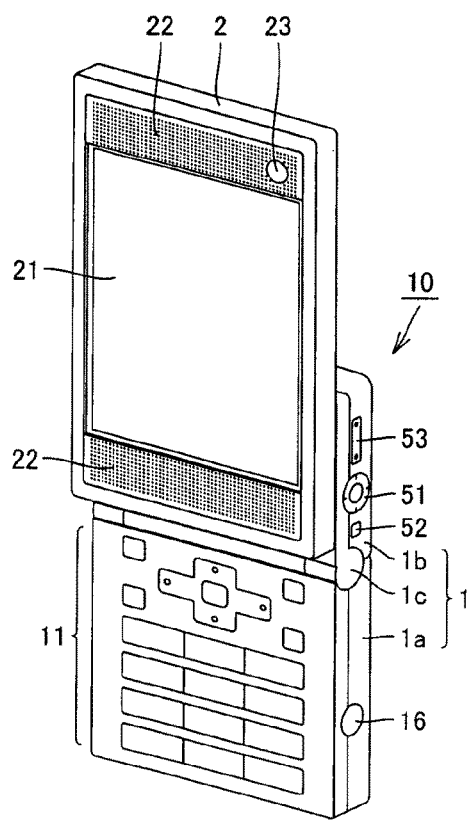
FIG. 109 is a perspective view showing a configuration of a specific example of the mobile information terminal in the fourth embodiment of the present invention in the open, vertically long state.

FIG. 109 is a perspective view showing a configuration of a specific example of the mobile information terminal in the fourth embodiment of the present invention in the open, vertically long state. Referring to FIG. 109, in the open, vertically long state, both operation portion 11 and display portion 21 are exposed outside.

Figure 110:
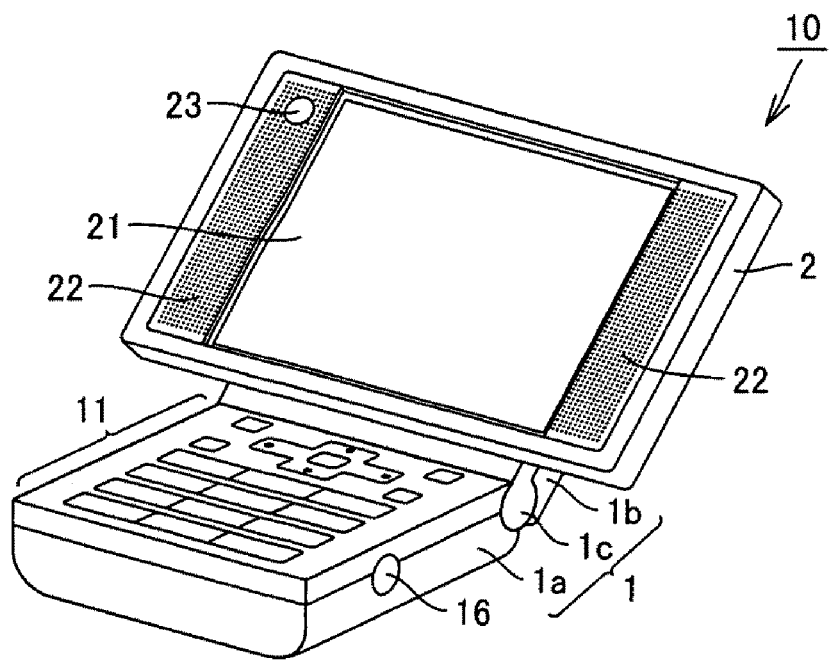
FIG. 110 is a perspective view showing that the mobile information terminal in the fourth embodiment of the present invention is placed on a table of the like in the open, horizontally long state.
Figure 111:
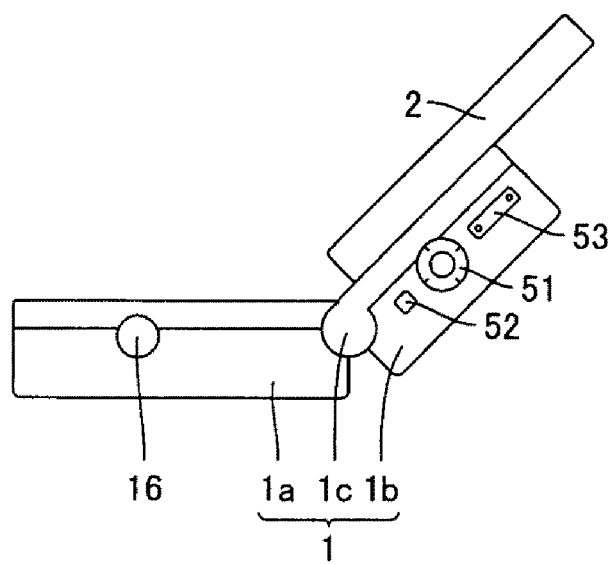
FIG. 111 is a right side view showing that the mobile information terminal in the fourth embodiment of the present invention is placed on a table of the like in the open, horizontally long state.

FIG. 110 and FIG. 111 are a perspective view and a right side view showing that the mobile information terminal in the fourth embodiment of the present invention is placed in the open, horizontally long state on a table or the like. Referring to FIG. 110 and FIG. 111, when mobile information terminal 10 in the present embodiment is placed in the open, horizontally long state on a table or the like, it is bent at second portion 1b around rotation shaft 1c with respect to first portion 1a so that the back surface of first portion 1a comes into contact with the surface of the table or the like and second casing 2 becomes inclined with respect to the front surface of first casing 1. Accordingly, the operator can easily see display portion 21 of second casing 2 even in the state in which mobile information terminal 10 is placed on a table or the like. Here, the angle of inclination of second casing 2 can be adjusted by adjusting the bending angle between first portion 1a and second portion 1b. Accordingly, display portion 21 can be inclined to be more easily viewable for the operator. In addition, the lower end portion (the lower side in the figure) of the inclined second casing 2 may be brought in abutment with the front surface of first portion 1a. Accordingly, the inclination state of second casing 2 can be securely held.

Figure 112:
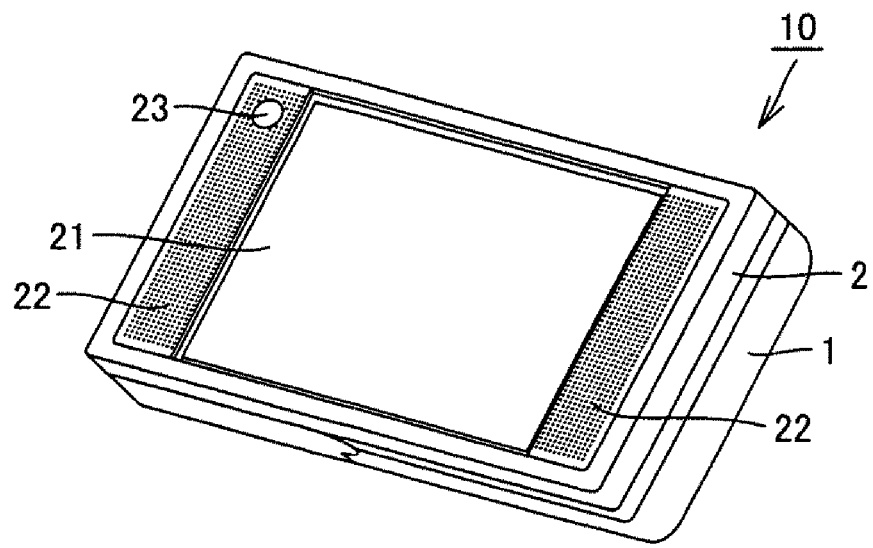
FIG. 112 is a perspective view showing that the mobile information terminal in the fourth embodiment of the present invention is placed on a table of the like in the closed state.
Figure 113:
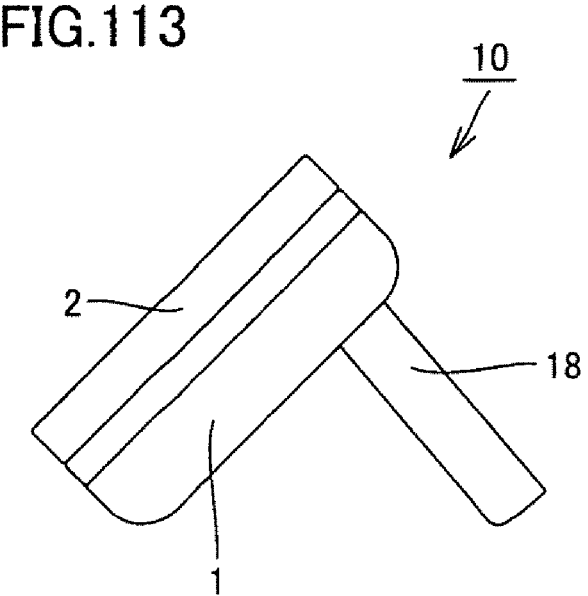
FIG. 113 is a right side view showing that the mobile information terminal in the fourth embodiment of the present invention is placed on a table of the like in the closed state.

Referring to FIG. 112 and FIG. 113, when mobile information terminal 10 in the present embodiment is placed on a table or the like in the closed state, stand 18 is in an inclined standing state with respect to the back surface of first casing 1. This stand 18 allows mobile information terminal 10 to be supported from the back surface side of first casing 1 in an inclined state with respect to a surface of a table or the like. Accordingly, the operator can easily see display portion 21 of second casing 2 even in the state in which mobile information terminal 10 is placed on a table or the like. The angle of inclination of display portion 21 of second casing 2 can be adjusted by adjusting the angle of inclination of stand 18 with respect to first casing 1. Accordingly, display portion 21 can be inclined to be more easily viewable for the operator. In addition, mobile information terminal 10 can be held in a standing state by stand 18 and therefore does not have to be held in hand for television viewing.

Antenna 50 is preferably provided in stand 18. Accordingly, the reception sensitivity of antenna 50 can be set at the best position by changing the angle (standing angle) of stand 18 with respect to the back surface of first casing 1.

The usage of the mobile information terminal in the present embodiment will now be described.

Figure 114:
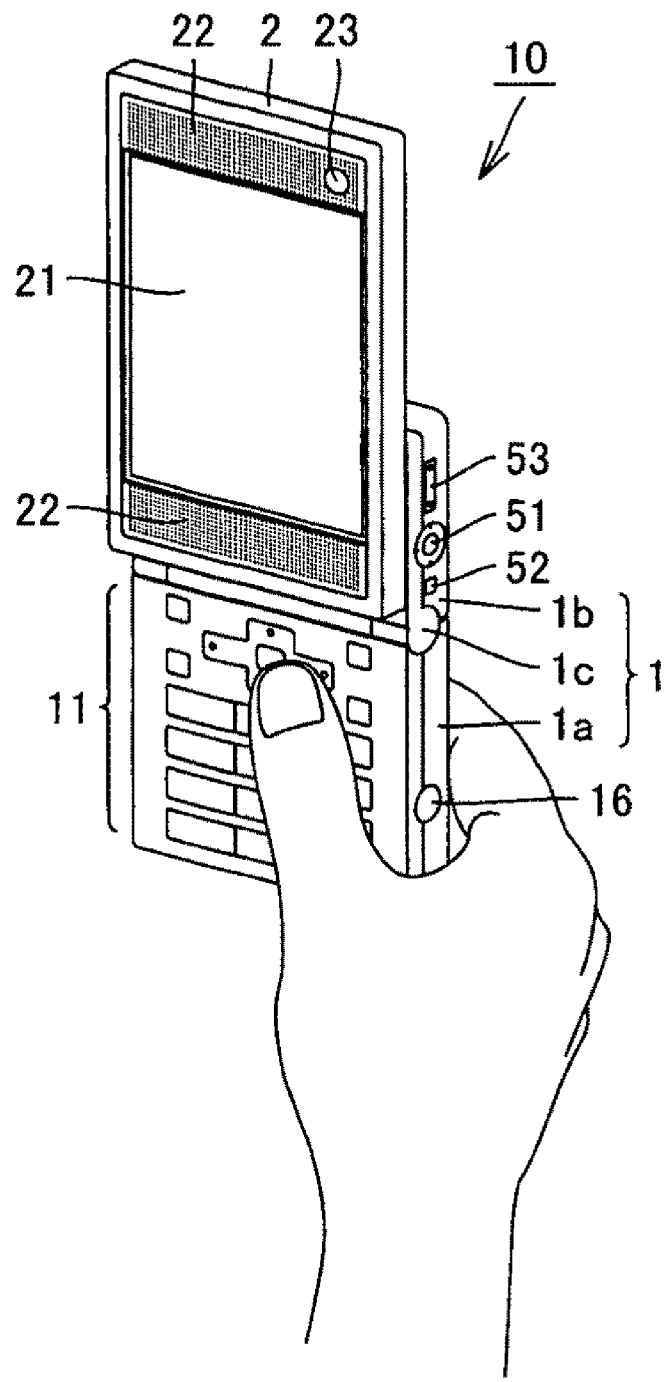
FIG. 114 is a perspective view illustrating a usage manner of the mobile information terminal in the fourth embodiment of the present invention in the open, vertically long state.

In the open, vertically long state shown in FIG. 114, the operator can perform, for example, mail or calling operations and the like while viewing display portion 21 with first casing 2 held in hand. Here, a variety of operations are performed by operating operation portion 11.

Figure 115:
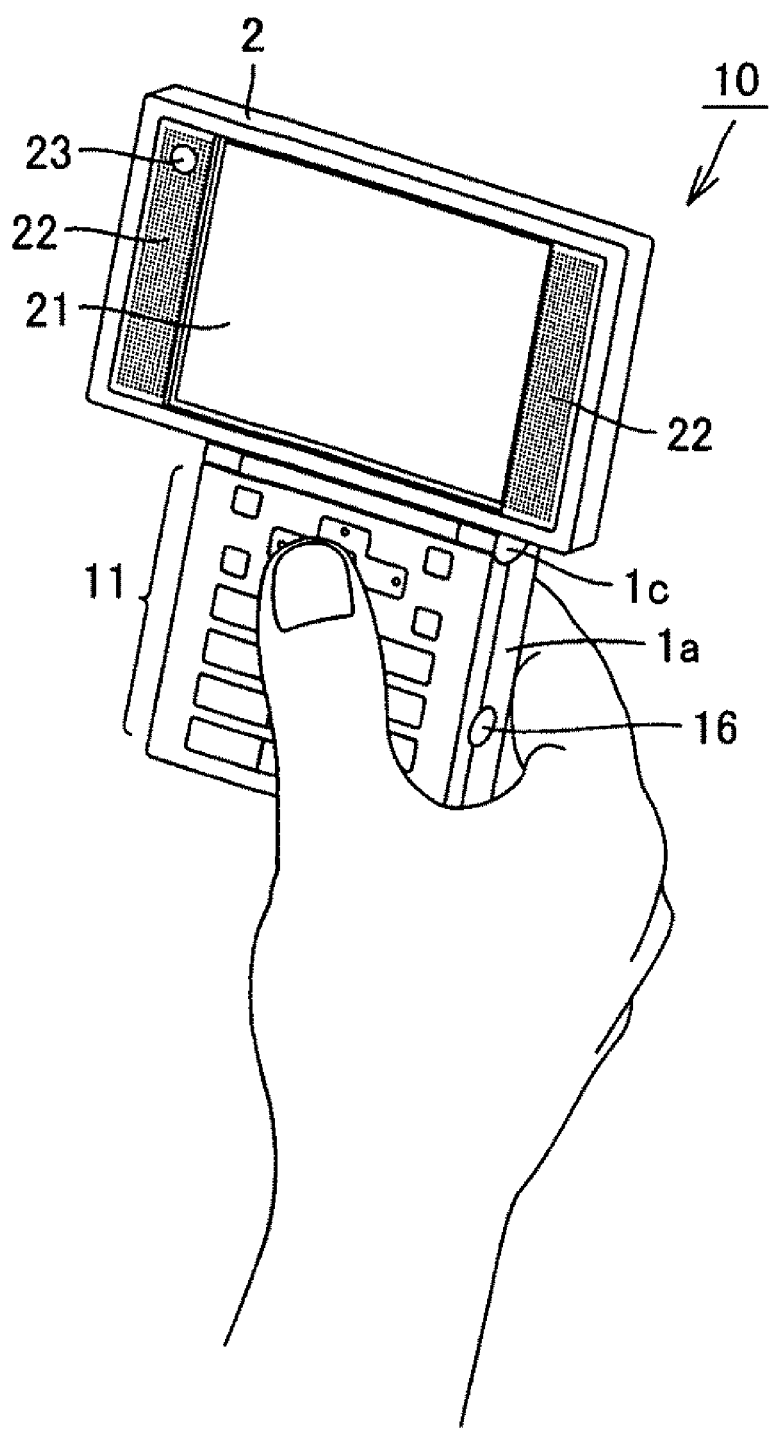
FIG. 115 is a perspective view illustrating a usage manner of the mobile information terminal in the fourth embodiment of the present invention in the open, horizontally long state.

In the open, horizontally long state shown in FIG. 115, the operator can see display portion 21 in the horizontally long display with first casing 1 grasped in hand. Therefore, the operator can watch television (terrestrial digital broadcast, terrestrial analog broadcast, digital radio broadcast with image) on display portion 21 with mobile information terminal 10 kept in hand. Furthermore, in the open, horizontally long state, display portion 21 has left-right symmetry with respect to the center line of first casing 1, thereby achieving comfortable television viewing. Therefore, the operator can watch television comfortably even under the circumstances in which mobile information terminal 10 cannot be laid as in a train on the move.

Moreover, each key of operation portion 11 is operated by thumb for mail or calling operation with first casing 1 grasped.

In either state in FIG. 114 and FIG. 115, an image of a subject can be taken by pointing camera 14 provided on the back surface of first casing 1 to the subject and seeing the subject and the shot composition on display portion 21 (namely, using display portion 21 as a finder). In addition, the operator can use camera 23 provided on the front surface of second casing 2 to take an image of himself as a subject while seeing the subject and the shot composition on display portion 21. Moreover, a videophone is also realized in which the operator talks to the party on the other end while taking an image of himself by camera 23.

Figure 116:
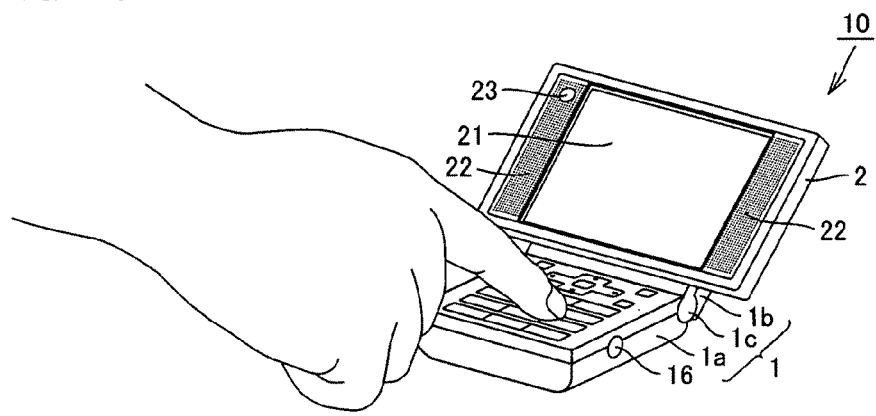
FIG. 116 is a perspective view illustrating a usage manner of the mobile information terminal in the fourth embodiment of the present invention placed on a table or the like in the open, horizontally long state.

In the state in which the mobile information terminal is placed on a table or the like in the open, horizontally long state shown in FIG. 116, the operator can watch television on display portion 21 without holding the mobile information terminal in hand. Furthermore, in the open, horizontally long state, display portion 21 has left-right symmetry with respect to the center line of first casing 1, thereby achieving comfortable television viewing. In addition, the angle of inclination of second casing 2 with respect to first portion 1a can be adjusted by rotation shaft 1c, so that the angle of display portion 21 can be adjusted for the operator to see more easily. Therefore, the operator can watch television comfortably even under the circumstances in which the mobile information terminal is placed on a table or the like in a room.

Figure 117:
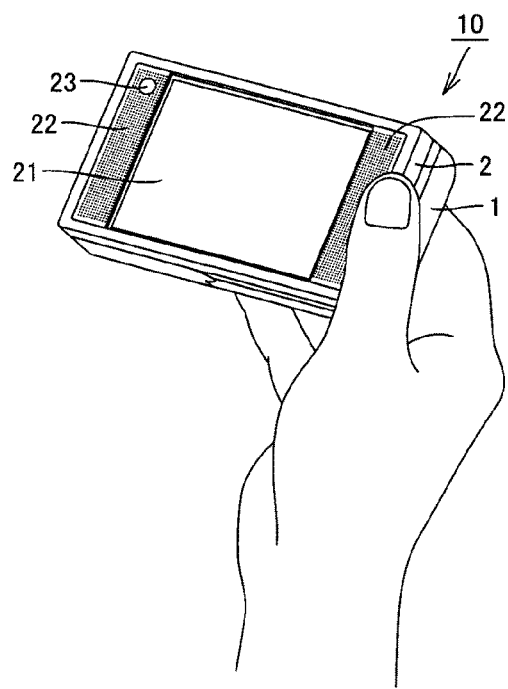
FIG. 117 is a perspective view illustrating a usage manner of the mobile information terminal in the fourth embodiment of the present invention in the closed state with display portion 21 exposed.

In the closed state shown in FIG. 117, mail operations, television viewing, and the like are possible in a compact state. In addition, the operator can use camera 23 provided on the front surface of second casing 2 to take an image of himself as a subject while seeing the subject and the shot composition on display portion 21. Moreover, a videophone is also realized in which the operator talks to the party on the other end while taking an image of himself by camera 23.

In the state in which the mobile information terminal is placed on a table or the like in the closed state shown in FIG. 112 and FIG. 113, the operator can watch television on display portion 21 without holding the mobile information terminal in hand. Furthermore, since the angle of inclination of second casing 2 can be adjusted by stand 18, the angle of display portion 21 can be adjusted for the operator to see more easily. Therefore, the operator can watch television comfortably even under the circumstances in which the mobile information terminal is placed on a table or the like in a room.

In the state shown in FIG. 112 and FIG. 113, usability can be further improved by automatically setting (switching) to a mode of giving top priority to television viewing.

In the case where a touch panel is employed in display portion 21, a variety of operations can be performed by operating the touch panel.

Now, the opening/closing operation of mobile information terminal 10 in the present embodiment will be described.

Figure 119:
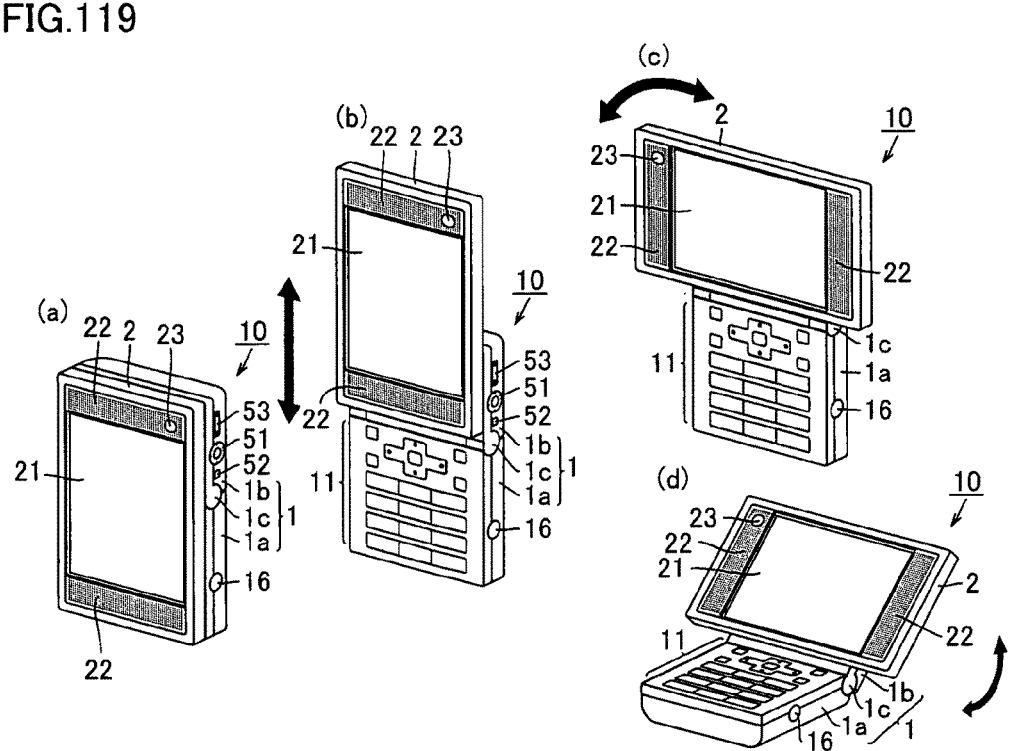
FIG. 119 is a perspective view illustrating the opening/closing operation of the mobile information terminal in the fourth embodiment of the present invention.

FIG. 118 is an illustration showing an engagement state between two pins and a cam hole of the joint mechanism in the opening/closing operation of the mobile information terminal in the fourth embodiment of the present embodiment. FIG. 119 is a perspective view illustrating the opening/closing operation of the mobile information terminal in the fourth embodiment of the present invention. FIG. 119(a) shows a perspective view in the closed state, FIG. 119(b) shows a perspective view in the open, vertically long state, FIG. 119(c) shows a perspective view in the open, horizontally long state, and FIG. 119(d) shows a perspective view in the open, horizontally long state in which the mobile information terminal is placed on a table or the like.

In the closed state in FIG. 119(a), both two pins 3a and 3b are positioned in cam hole 2b as shown in FIG. 118(a), and in particular, pin 3a is positioned at the upper end of cam hole 2b in the figure.

From this closed state, the operator slides second casing 2 with respect to first casing 1 to bring about the open, vertically long state shown in FIG. 19(b). Here, as shown in FIG. 118(b), both of two pins 3a and 3b are positioned in cam hole 2b, and in particular, pin 3b is positioned at the lower end of cam hole 2b in the figure.

From this open, vertically long state, as shown in FIG. 118(c), the operator first slides second casing 2 downward in the figure with respect to first casing 1, and then, when pin 3b reaches the branch point of cam hole 2c, rotates second casing 2 clockwise in the figure with respect to first casing 1, thereby bringing about the open, horizontally long state shown in FIG. 19(c). In this rotation of second casing 2, the position of pin 3a is the center of rotation.

In this open, horizontally long state, as shown in FIG. 118(d), pin 3a is positioned approximately at the center of the length of linear cam hole 2b, and pin 3b is positioned at a terminal end of arc-like cam hole 2c.

From this open, horizontally long state shown in FIG. 119(c), bending at second portion 1b around rotation shaft 1c with respect to first portion 1a brings about the state that allows placement on a table or the like with the open, horizontally long state kept as shown in FIG. 119(d).

The operation from the state that allows placement on a table or the like with the horizontally long state kept as shown in FIG. 119(d) to the closed state shown in FIG. 119(a) is performed by reversing the operation as described above.

In accordance with the present embodiment, it is possible to make a choice between the vertically long state and the horizontally long state in the open state as described above. Furthermore, in the horizontally long state, second casing 2 has left-right symmetry with respect to the center line of first casing 1, and mobile information terminal 10 has a "T"-shaped contour as viewed from the front. Therefore, in the horizontally long state, the operator can view television and the like comfortably on display portion 21. In addition, the body size can be reduced when display portion 21 is set in the horizontally long state.

Furthermore, second casing 2 can be laid over first casing 1 with display portion 21 facing up (the state in FIG. 117) for use in a compact state.

In addition, bending at second portion 1b with respect to first portion 1a causes display portion 21 of second casing 2 coupled to second portion 1b to be inclined with respect to the front surface of first portion 1a. Since display portion 21 can be visually recognized in such an inclined state, comfortable viewing of television or the like on display portion 21 is achieved in a state in which the back surface of first portion 1a is placed on a table or the like.

In watching television on the landscape screen, depending on a situation, a selection can be made from three different viewing manner, namely the state shown in FIG. 115, the state shown in FIG. 116 and the state shown in FIG. 117.

Since the screen always appears face up, a display content can readily be checked with one hand without moving display portion 21 and the main body. It is possible to make a call or receive a call in a similar manner.

Here, in the present embodiment, similar to the first embodiment, an electric circuit portion shown in FIG. 30 may be provided. Furthermore, the switching between the portrait and landscape angles, the speaker switching according to the switching between the vertically long state and the horizontally long state of the second casing, and the speaker switching at the time of an incoming call during reproduction of AV contents as illustrated in the first and second embodiments can also be applied to the present embodiment, similarly.

Fifth Embodiment

Referring to FIG. 120-FIG. 127, mobile information terminal 10 in the present embodiment has first casing 1, second casing 2, and a joint mechanism.

Figure 120:
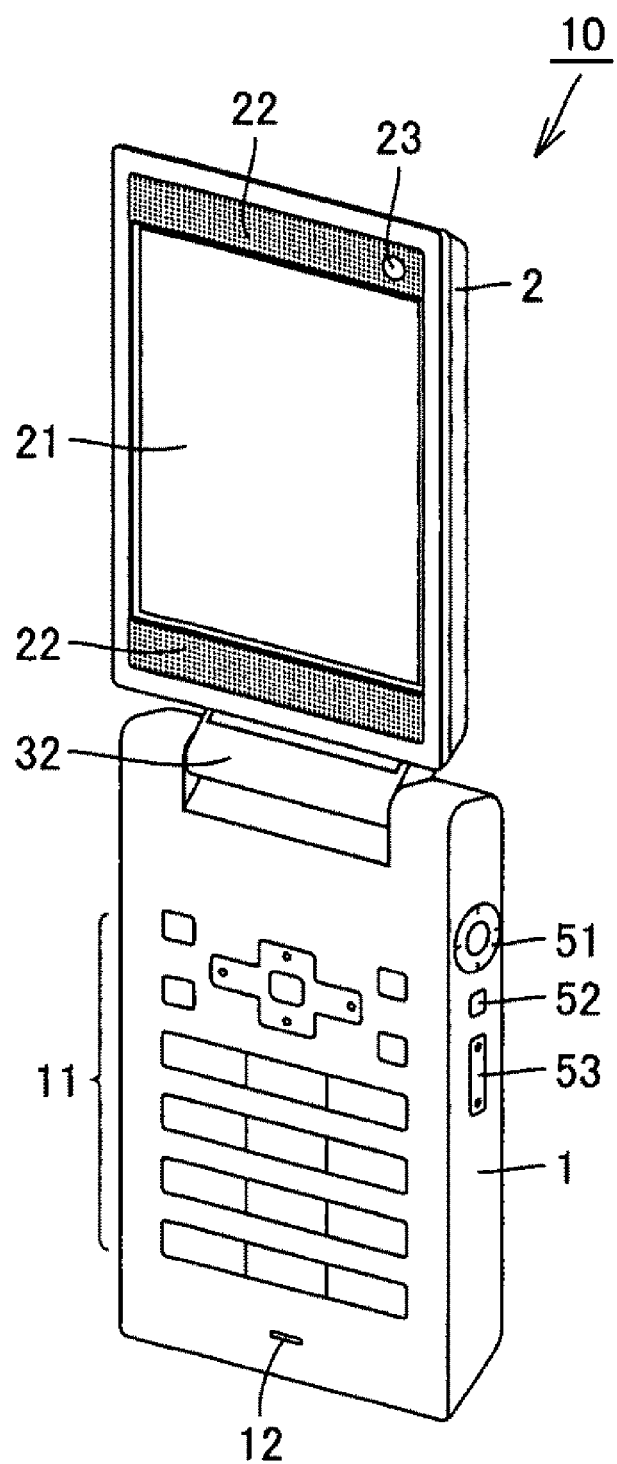
Figure 121:
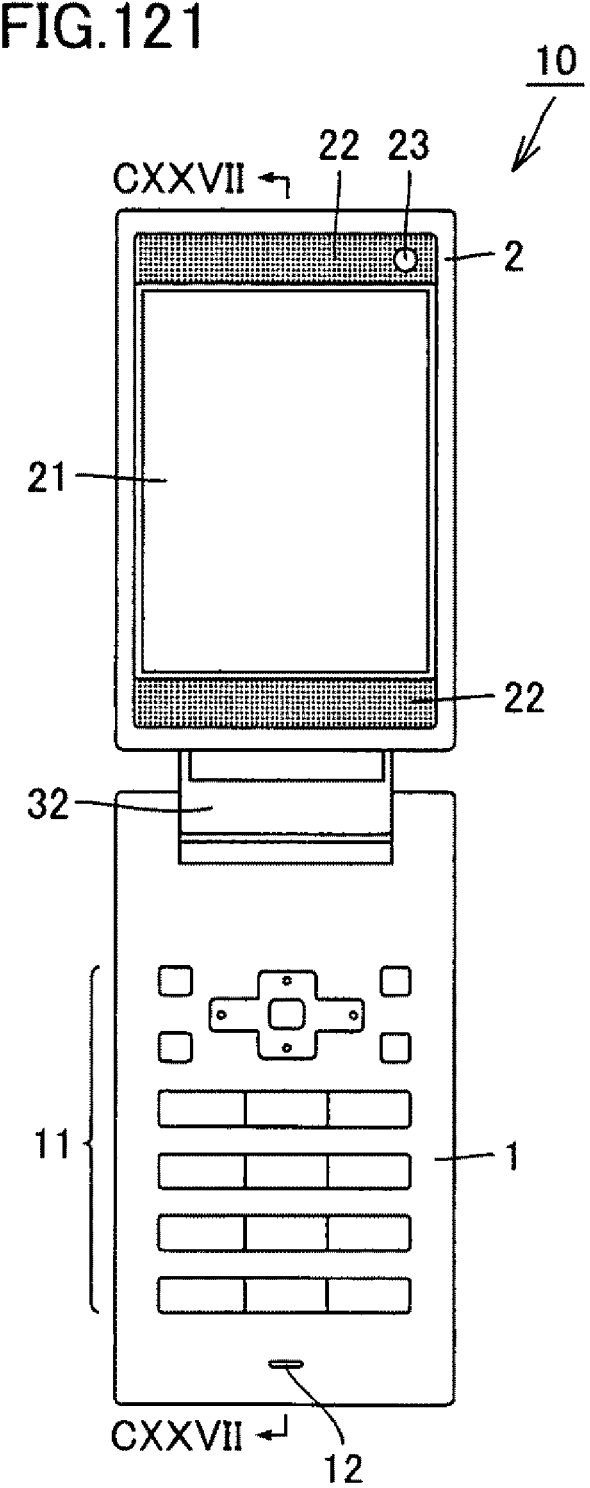

Mainly referring to FIG. 120 and FIG. 121, arranged on the front surface of first casing 1 is operation portion 11 comprised of a ten-key pad, a function key for performing a shutter operation and the like, a menu selection key for performing menu selection and the like, a character switch key for switching characters, and the like, and microphone 12 for telephone call. Arranged on the front surface of second casing 2 are display portion 21 having, for example, a liquid crystal display, speaker 22 arranged on opposite sides in the longitudinal direction of display portion 21, and camera 23. Display portion 21 may be used as a finder of camera 23.

Figure 122:
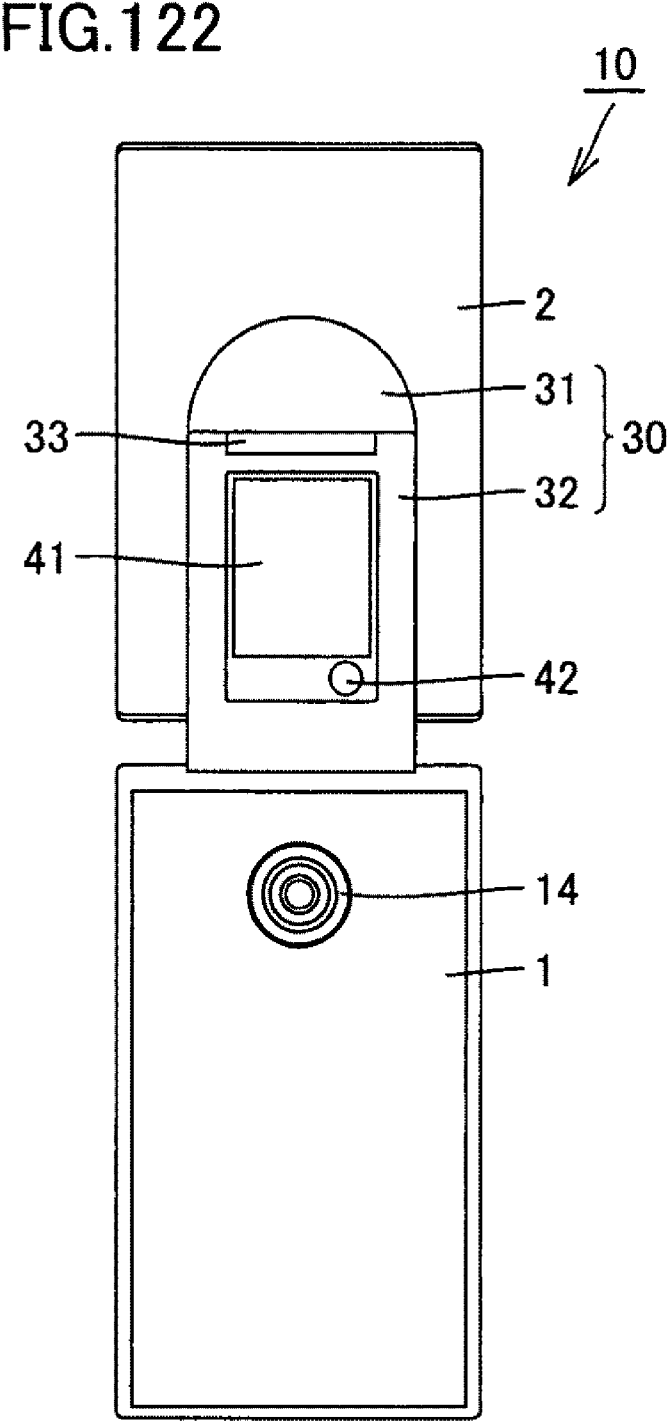

Mainly referring to FIG. 122, camera 14 is arranged on the back surface of first casing 1. In this case, display portion 21 may be used as a finder of camera 14. Cameras (image pickup device, for example, CCD) 14, 23 may also be rotated according to the rotation of display portion 21 so that an image picked up by cameras 14, 23 (an image displayed on display portion 21) can be displayed in a normal state whether display portion 21 is a portrait type (the state in FIG. 120) or a landscape type (the state in FIG. 131). A flash lamp (not shown) may be arranged in vicinity of camera 14.

Figure 123:
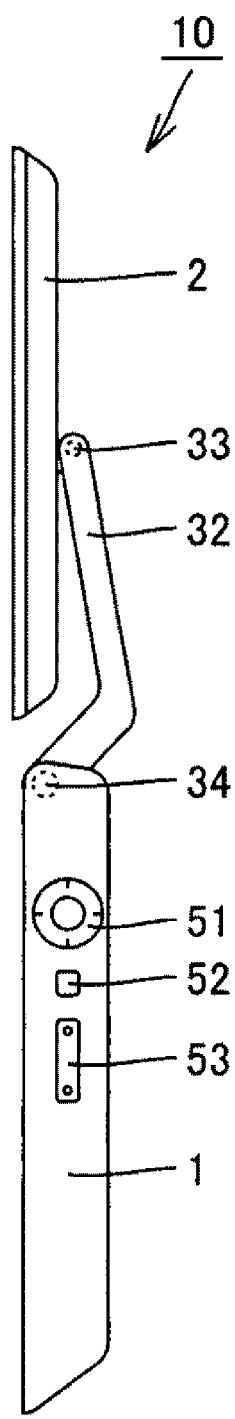
Figure 124:
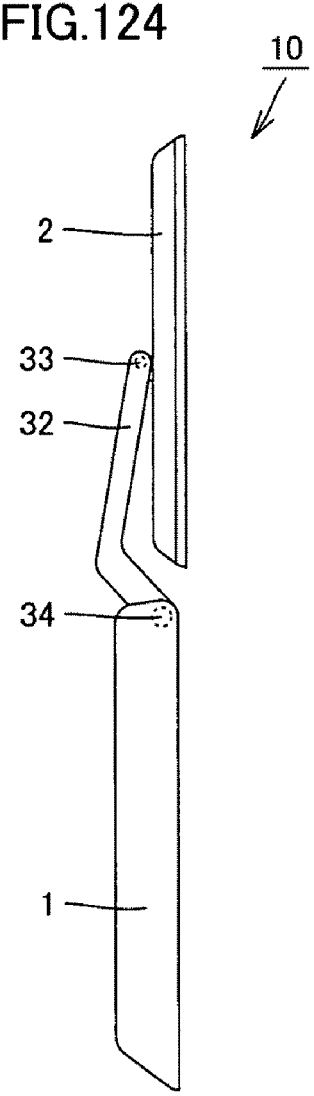
Figure 125:
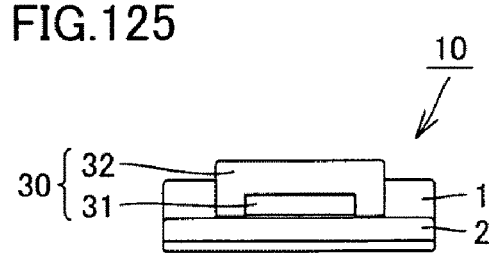
Figure 126:
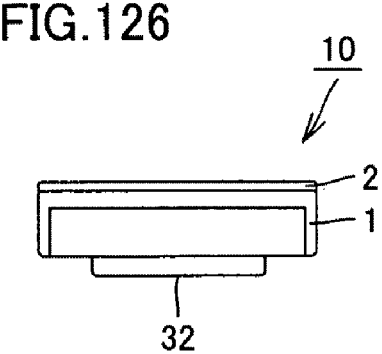

Mainly referring to FIG. 123 and FIG. 124, arranged on the right side surface of first casing 1 are key 51 comprised of an annular search key and a decision key at the center, function keys 52, 53, and shutter button 16.

A slot for inserting/removing an external memory such as a memory card into/from first casing 1 may be arranged on a side surface (one of the right side surface and the left side surface) of first casing 1. In this case, when an image from camera 14 or camera 23 is stored in an external memory, a flag may also be input which allows recognition of the storage (recording) state of an image depending on whether camera 14 or camera 23 is used in the portrait type or in the landscape type (the usage in the portrait type or the landscape type is sensed by an acceleration sensor), whereby a reproduction image can be obtained in a normal state at the time of reproduction. Then, a television broadcast may be recorded in an external memory. In addition, another external memory having a television broadcast or music recorded therein may be inserted into the slot so that the image or sound recorded in another external memory is reproduced in the mobile phone.

Figure 127:
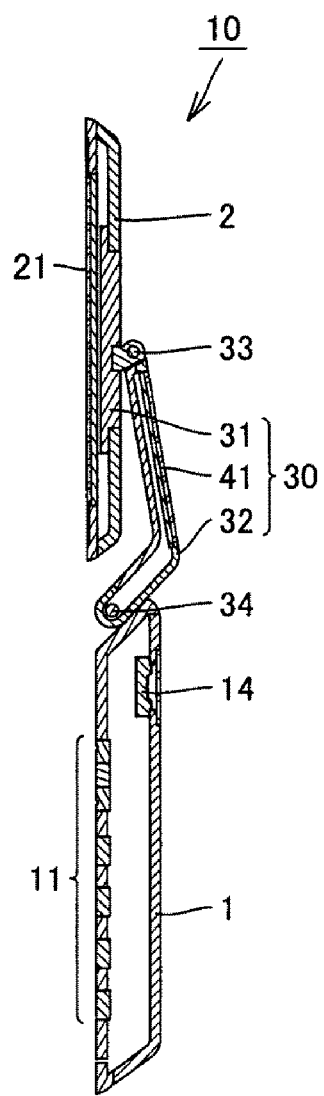

Mainly referring to FIG. 127, the joint mechanism has hinge portion 30 and rotation shaft 34. Hinge portion 30 is comprised of two joint members 31 and 32 which are rotatably joined to each other by rotation shaft 33. Joint member 31 has a circular shape and is coupled to second casing 2 such that it can rotate around the center of this circular shape with respect to second casing 2. Joint member 32 is shaped like an "angle bracket" as viewed from the side. This joint member 32 is coupled to first casing 1 by rotation shaft 34 rotatably with respect to first casing 1 and is coupled to joint member 31 by rotation shaft 33 rotatably with respect to joint member 31.

Mainly referring to FIG. 122, sub-display portion 41 and flash lamp 42 are provided to joint member 32.

Figure 128:
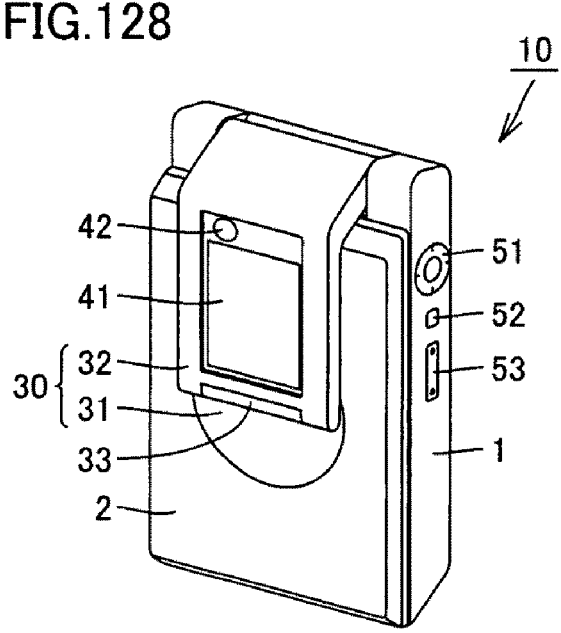
Figure 129:
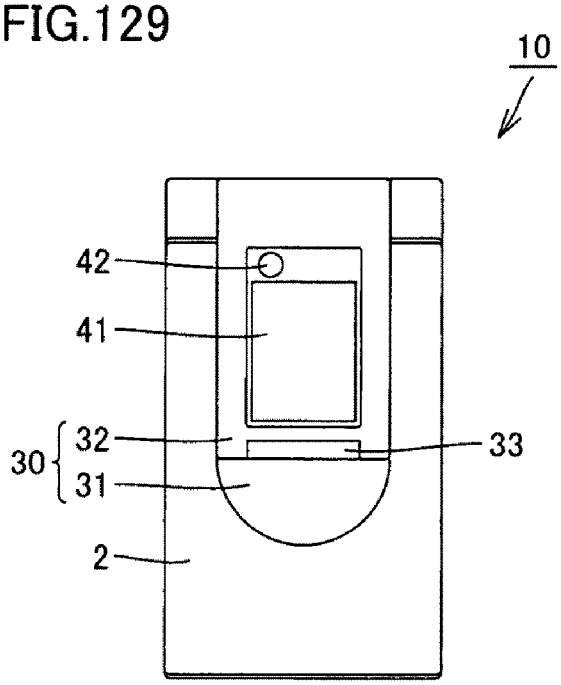
Figure 130:
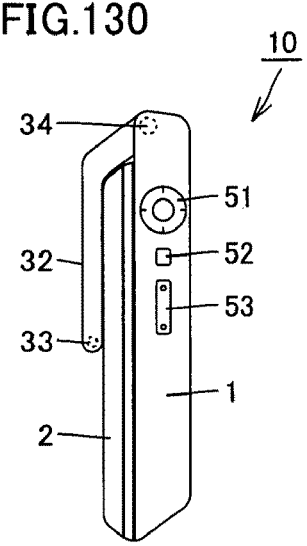

Referring to FIG. 128-FIG. 130, in this closed state, the front surface of first casing 1 and the front surface of second casing 2 are opposed to each other, operation portion 11 provided on the front surface of first casing 1 is entirely covered with second casing 2, and display portion 21 provided on the front surface of second casing 2 is entirely covered with first casing 1. Accordingly, display portion 21 is not visually recognized from the outside of mobile information terminal 10 and protected. In addition, an operating error of operation portion 11 can also be prevented.

Mainly referring to FIG. 128, in the closed state, sub-display portion 41 and flash lamp 42 provided to hinge portion 30 (provided on the back surface of second casing 2) are exposed outside of mobile information terminal 10. Accordingly, when an image is taken using camera 14 provided on the back surface of first casing 2, an image can be taken by pressing shutter button 16 while a subject is viewed on sub-display portion 41. Thus, image capturing in a digital camera manner becomes possible. In addition, even in the closed state, an incoming call or the like can be checked on sub-display portion 41.

Figure 131:
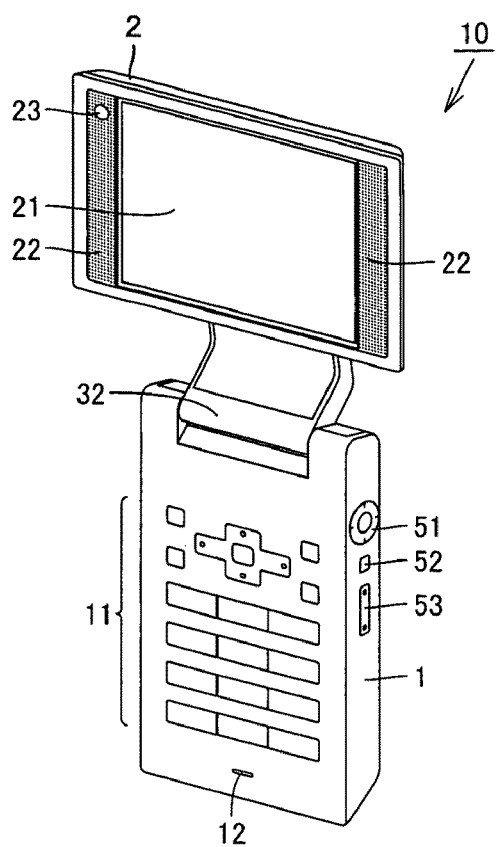

Referring to FIG. 131-FIG. 133, in the open, horizontally long state, both of operation portion 11 and display portion 21 are exposed outside. Second casing 2 has left-right symmetry with respect to the center line C-C of first casing 1, and mobile information terminal 10 has a "T"-shaped contour as viewed from the front.

Referring to FIG. 134-FIG. 136, in this closed state, the front surface of first casing 1 and the back surface of second casing 2 are opposed to each other, operation portion 11 provided on the front surface of first casing 1 is entirely covered with second casing 2, and sub-display portion 41 and flash lamp 42 provided in hinge portion 30 on the back surface side of second casing 2 are entirely covered with first casing 1. On the other hand, display portion 21 provided on the front surface of second casing 2 is exposed outside. Accordingly, in a compact state with operation portion 11 protected, when an image is taken by camera 14 provided on the back surface of first casing 1, an image can be taken by pressing a key while a subject is viewed on display portion 21. Thus, image capturing in a digital camera manner becomes possible. In addition, even in the closed state, an incoming call or the like can be checked on display portion 21. Furthermore, a variety of keys 51-53 provided on the side surface of first casing 1 can be operated for mail transmission, television viewing, and the like.

FIG. 137 and FIG. 138 are a perspective view and a right side view showing that the mobile information terminal in the fifth embodiment of the present invention is placed in the open, horizontally long state on a table or the like. Referring to FIG. 137 and FIG. 138, when mobile information terminal 10 in the present embodiment is placed on a table or the like in the open, horizontally long state, the back surface of first casing 1 is in contact with the surface of the table or the like, and second casing 2 is inclined with respect to the front surface of first casing 1. Accordingly, the operator can easily see display portion 21 of second casing 2 even in the state in which mobile information terminal 10 is placed on a table or the like. The angle of inclination of second casing 2 can be adjusted by adjusting the joint angle between joint members 31 and 32 and the joint angle between joint member 32 and first casing 1. Accordingly, display portion 21 can be inclined to be more easily viewable for the operator. In addition, the lower end portion (the lower side in the figure) of the inclined second casing 2 may be brought into abutment with the front surface of first casing 1. Accordingly, the inclined state of the second casing can be held securely. Moreover, television can be watched with the hands free.

Now, the opening/closing operation of mobile information terminal 10 in the present embodiment will be described.

FIG. 139 is a perspective view illustrating the opening/closing operation of the mobile information terminal in the fifth embodiment of the present invention. FIG. 139(a) shows a perspective view in the closed state (the state in which display portion 21 is not exposed), FIG. 139(b) shows a perspective view in the open, vertically long state, FIG. 139(c) shows a perspective view in the open, horizontally long state, FIG. 139(d) shows a perspective view in the closed state (the state in which display portion 21 is exposed), and FIG. 139(e) shows a perspective view in the state of placement on a table or the like in the open, horizontally long state.

Referring to FIG. 139(a), in the closed state (the state in which display portion 21 is not exposed), the operator rotates joint member 32 with respect to first casing 1 around rotation shaft 34 with first casing 1 grasped in hand thereby to bring about the open, vertically long state shown in FIG. 139(b). Then, operation portion 11 and display portion 21 are exposed outside.

In the open, vertically long state shown in FIG. 139(b), second casing 2 is rotated by 90° with respect to joint member 31, thereby bringing about the open, horizontally long state shown in FIG. 139(c). In this state, mobile information terminal 10 has a "T"-shaped contour as viewed from the front. Also in this state, operation portion 11 and display portion 21 are exposed outside.

Further, from the open, vertically long state shown in FIG. 139(b), joint member 31 is rotated around rotation shaft 33 with respect to joint member 32, and joint member 32 is rotated around rotation shaft 34 with respect to first casing 1, thereby bringing about the closed state shown in FIG. 139(d) (the state in which display portion 21 is exposed). Then, display portion 21 can be exposed without exposing operation portion 11.

From the open, horizontally long state shown in FIG. 139(c), joint member 31 is rotated around rotation shaft 33 with respect to joint member 32, and joint member 32 is rotated around rotation shaft 34 with respect to first casing 1, thereby bringing about the state of placement on a table or the like in the open, horizontally long state shown in FIG. 139(e).

On the other hand, the operation from the closed state (the state in which display portion 21 is exposed) shown in FIG. 139(d) to the closed state (the state in which display portion 21 is not exposed) shown in FIG. 139(a) is performed by reversing the operation as described above. The operation from the state of placement on a table or the like in the open, horizontally long state shown in FIG. 139(e) to the closed state (the state in which display portion 21 is not exposed) shown in FIG. 139(a) is performed by reversing the operation as described above.

Now, the usage of the mobile information terminal in the present embodiment will be described.

In the horizontally long state shown in FIG. 140, the operator can view display portion 21 in the horizontally long display with first casing 1 grasped in hand. Therefore, with mobile information terminal 10 held in hand, the operator can watch television (terrestrial digital broadcast, terrestrial analog broadcast, digital radio broadcast with image, and the like) on display portion 21. In addition, in the open, horizontally long state, display portion 21 has left-right symmetry with respect to the center line of first casing 1, thereby achieving comfortable television viewing. Therefore, the operator can watch television comfortably even under the circumstances in which mobile information terminal 10 cannot be laid as in a train on the move or the like.

Furthermore, each key on operation portion 11 can be operated by thumb for mail or calling operations and the like with first casing 1 grasped.

In the open, vertically long state shown in FIG. 141, the operator can perform mail or calling operations and the like, for example, while viewing display portion 21 with first casing 1 grasped in hand. Here, a variety of operations are performed by operating operation portion 24.

When the operator holds mobile information terminal 10 with the back surfaces of first and second casings 1, 2 facing the operator, the operator can take an image of himself by camera 14 provided on the back surface of first casing 1 while viewing himself as a subject on sub-display portion 41 arranged on the back surface of second casing 2. Here, in the case of image capturing in a dark place, the operator can use flash lamp 42 to illuminate himself as a subject for image capturing.

In either state in FIG. 140 and FIG. 141, an image of a subject can be taken by pointing camera 14 provided on the back surface of first casing 1 to the subject and seeing the subject and the shot composition on display portion 21 (namely, using display portion 21 as a finder). In addition, the operator can use camera 23 provided on the front surface of second casing 2 to take an image of himself as a subject while seeing the subject and the shot composition on display portion 21. Moreover, a videophone is also realized in which the operator talks to the party on the other end while taking an image of himself by camera 23.

In the state in which the mobile information terminal is placed on a table or the like in the open, horizontally long state shown in FIG. 142, the operator can watch television on display portion 21 without holding the mobile information terminal in hand. Moreover, the angle of inclination of second casing 2 can be adjusted by stand 18, so that the angle of display portion 21 can be adjusted such that the operator can easily see. Therefore, the operator can watch television comfortably even under the circumstances in which the mobile information terminal is placed on a table or the like in a room.

In the state in FIG. 142, usability can be further improved by automatically setting (switching) to a mode of giving top priority to television viewing.

In the closed state shown in FIG. 143, mail operations, television viewing and the like are possible in a compact state. Furthermore, the operator can use camera 23 provided on the front surface of second casing 2 to take an image of himself as a subject while seeing the subject and the shot composition on display portion 21. Moreover, a videophone is also realized in which the operator talks to the party on the other end while taking an image of himself by camera 23.

In the closed state shown in FIG. 128-FIG. 130, display portion 21 and operation portion 11 are not exposed outside. This eliminates the likelihood of damaging display portion 21 and prevents an operating error of the operation portion, and thus this state is convenient for carrying mobile information terminal 10.

In the case where a touch panel is employed in display portion 21, a variety of operations can be performed by operating the touch panel.

In accordance with the present embodiment, it is possible to make a choice between the vertically long state and the horizontally long state in the open state as described above. Therefore, in the horizontally long state, the operator can view television and the like comfortably on the display portion. In addition, the body size can be reduced when the display portion is set in the horizontally long state.

In addition, in the closed state, it is possible to make a choice between the state in which display portion 21 is exposed and the state in which it is not exposed. Therefore, in the state in which display portion 21 is exposed, a variety of operations can be performed with the body portion in a compact state, while in the state in which display portion 21 is not exposed, display portion 21 can be protected.

Further, since sub-display portion 41 is provided to hinge portion 30, sub-display portion 41 can be checked even in the state in which display portion 21 is not exposed in the closed state.

Here, in the present embodiment, similar to the first embodiment, an electric circuit portion shown in FIG. 30 may be provided, an antenna (for example, a diversity antenna) may be provided in joint member 31 or 32 of hinge portion 30, and second casing 2 may be slidably rotated 360° with respect to joint member 31. Furthermore, the switching between the portrait and landscape angles, the speaker switching according to the switching between the vertically long state and the horizontally long state of the second casing, and the speaker switching at the time of an incoming call during reproduction of AV contents as illustrated in the first and second embodiments can also be applied to the present embodiment, similarly.

(Others)

In the first to fifth embodiments, in the case where a flash lamp (for example, flash lamp 15) is provided, the flash lamp may be a light emitting diode or a stroboscope using xenon.

The dimensional ratio between the longer side and the shorter side of display portion 21 may be 16:9 or may be 4:3.

Display portion 21 may be a touch panel, and this touch panel may be used to perform television operations (channel switching, volume, screen contrast, switching of screens, switching of screen sound) and/or telephone operations. The surface may be covered with any tempered glass such as sapphire glass. Display portion 21 may allow multi-screen display (split screen display, for example, two-screen, three-screen, four-screen, and the like), in addition to single-screen display. In the case of multi-screen display, on one display portion 21, a television screen, an Electronic Program Guide (EPG) screen, a game screen, a mail screen, and the like are combined as appropriate to be displayed in multi-screen. Therefore, the operator can read a mail, create a mail, reply to a mail, reserve a program, play a game while watching television and thus can process a plurality of information simultaneously.

Mobile information terminal 10 may additionally have a function of recording a television program and may have a non-contact electronic payment function or a personal authentication function. Particularly, when a non-contact electronic payment function is used, it is preferable that a variety of complicated information required for electronic payment (ride zone, ticket information, fare, barcode, and the like) can be checked on the display portion in the state in which mobile information terminal 10 is closed. Thus, mobile information terminal 10 in this embodiment is particularly suitable for this application. When the non-contact electronic payment function and the personal authentication function are included, mobile information terminal 10 is preferably configured to allow an SIM (Subscriber Identity Module) card or an IC (Integrated Circuit) card to be inserted therein.

Further, the width (the dimension of the short side direction of each of first casing 1 and second casing 2) of mobile information terminal 10 is preferably 50 mm±10 mm or less. Mobile information terminal 10 is in the shape of a letter "T" in the open state, so that the center of gravity of mobile information terminal 10 is located at a relatively upper portion and the upper portion tends to swing from side to side, thereby requiring a firm grasp. With the width in this range, even a woman or the like having a small hand can grasp first casing 1 firmly in the open state.

Here, the mobile information terminal is, for example, a mobile phone. However, the present invention is not limited thereto and may be a personal data assistant (PDA), a notebook-type personal computer, a communicable digital camera, or the like. Preferably, the mobile information terminal has a communication function.

The embodiments disclosed here should be taken by way of illustration not by way of limitation. The scope of the present invention is shown not in the foregoing description but in the claims, and it is intended that all changes within the meaning and range of equivalency of the claims should be embraced therein.

INDUSTRIAL APPLICABILITY

The present invention is advantageously applied in particular to a mobile information terminal having a display portion changed from vertically long display to horizontally long display, an opening/closing operation method thereof, and a display method thereof.

The invention claimed is:

1. A mobile information terminal comprising:
   a first casing having an operation portion on a front surface thereof;
   a second casing having a display portion on a front surface thereof; and
   a joint mechanism coupling said first casing and said second casing in an openable/closable manner and coupling said first casing and said second casing such that said display portion can make a transition between a horizontally long state and a vertically long state with respect to said first casing in an open state, characterized in that
   a first rotation shaft for coupling said first casing and said second casing in an openable/closable manner is located above said second casing with respect to the front surface of said first casing in a closed state, and
   said joint mechanism includes a rotation mechanism having a second rotation shaft, and
   characterized by being configured such that a transition from said vertically long state to said horizontally long state can be realized by one said rotation mechanism including said second rotation shaft arranged at a position shifted from a center line that is common to said first and second casings in said horizontally long state.

2. The mobile information terminal according to claim 1, characterized in that a shape of said front surface of said second casing is a rectangular shape.

3. The mobile information terminal according to claim 1, characterized in that
   said joint mechanism has a joint member,
   said joint member is joined to said first casing by said first rotation shaft for coupling said first casing and said second casing in an openable/closable manner and joined to said second casing by said second rotation shaft coupling such that said display portion can make a transition between a horizontally long state and a vertically long state with respect to said first casing in an open state, and
   said joint member contains a diversity antenna.

4. The mobile information terminal according to claim 1: characterized in that
   said second casing is configured such that one side of said second casing can be brought into abutment with the front surface of said first casing without covering said operation portion, when said display portion is in a horizontally long state in said open state.

5. The mobile information terminal according to claim 1 characterized by being configured such that a transition from said closed state to said vertically long state in said open state and a transition from said vertically long state to said horizontally long state can be completed in two actions.

6. The mobile information terminal according to claim 1, characterized in that
   said joint mechanism joins said first casing and said second casing such that said second casing relatively slidably rotates with respect to said first casing, and
   said second casing has a rectangular shape, and a rotation center of said joint mechanism is arranged on a phantom line which passes through a point away from a corner portion of said second casing along a longer side thereof by a distance x obtained by an equation $x=(b-a)/2$, where a length of a shorter side of said second casing is a and a length of a longer side of said second casing is b, and which intersects said longer side at an angle of 45°.

7. The mobile information terminal according to claim 1, characterized by further comprising a pair of speakers arranged to sandwich said display portion on the front surface of said second casing.

* * * * *